(12) United States Patent
Poisner et al.

(10) Patent No.: US 10,328,342 B2
(45) Date of Patent: Jun. 25, 2019

(54) MAGIC WAND METHODS, APPARATUSES AND SYSTEMS FOR DEFINING, INITIATING, AND CONDUCTING QUESTS

(71) Applicant: Intel Corporation, Santa Clara, CA (US)

(72) Inventors: David I. Poisner, Carmichael, CA (US); Gregory A. Peek, North Plains, OR (US); Blanka Vlasak, Beaverton, OR (US); Yevgeniy Y. Yarmosh, Portland, OR (US); Mark R. Francis, Portland, OR (US); Ravishankar Iyer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 680 days.

(21) Appl. No.: 14/864,445

(22) Filed: Sep. 24, 2015

(65) Prior Publication Data

US 2017/0087453 A1    Mar. 30, 2017

(51) Int. Cl.
*A63F 13/23* (2014.01)
*A63F 13/211* (2014.01)
(Continued)

(52) U.S. Cl.
CPC ............ *A63F 13/23* (2014.09); *A63F 13/211* (2014.09); *A63F 13/215* (2014.09); *A63F 13/35* (2014.09);
(Continued)

(58) Field of Classification Search
CPC ...... A63F 13/23; A63F 13/211; A63F 13/215; A63F 13/35; A63F 13/792; A63F 13/92;
(Continued)

(56) References Cited

U.S. PATENT DOCUMENTS 7,076,767 B1    7/2006 Williams
7,445,550 B2 *  11/2008 Barney ................. A63F 13/428
                                                   463/37
(Continued)

FOREIGN PATENT DOCUMENTS

WO    2014185861 A1    11/2014

OTHER PUBLICATIONS

Kymera Magic Wand Library—Kymera Wand Manual, http://www.kymera-wand.com/kymera-wand-manua, 15 pages, Apr. 29, 2015.
(Continued)

*Primary Examiner* — Allen Chan
(74) *Attorney, Agent, or Firm* — Schwabe, Williamson & Wyatt, P.C.

(57) ABSTRACT

Methods, apparatuses, systems, and storage media for creating, discovering, and/or resolving spells using a wand are provided. In embodiments, a computing device or a wand may detect one or more gestures and sensors in the wand may generate sensor data representative of the one or more gestures. The one or more gestures may be movements performed using the wand. The sensor data representative of the one or more gestures may be converted into a spell sequence. The wand may transmit the spell sequence to a computing device, and receive, from the computing device, a spell output based on the spell sequence, a wand position, and a quest. The quest may indicate an order in which one or more second devices are to be activated and one or more spells to activate each of the one or more second devices. Other embodiments may be described and/or claimed.

21 Claims, 17 Drawing Sheets

(51) Int. Cl.

| | | |
|---|---|---|
| *A63F 13/215* | (2014.01) | |
| *A63F 13/92* | (2014.01) | |
| *G06F 3/01* | (2006.01) | |
| *G06F 3/0346* | (2013.01) | |
| *H04L 29/08* | (2006.01) | |
| *A63F 13/35* | (2014.01) | |
| *A63F 13/792* | (2014.01) | |
| *H04L 29/06* | (2006.01) | |

(52) U.S. Cl.
CPC ............ *A63F 13/792* (2014.09); *A63F 13/92* (2014.09); *G06F 3/017* (2013.01); *G06F 3/0346* (2013.01); *H04L 67/12* (2013.01); *H04L 67/38* (2013.01)

(58) Field of Classification Search
CPC ....... G06F 3/017; G06F 3/0346; H04L 67/12; H04L 67/38
USPC .......................................................... 463/37
See application file for complete search history.

(56) References Cited

U.S. PATENT DOCUMENTS

| | | | |
|---|---|---|---|
| 7,500,917 B2 | 3/2009 | Barney et al. | |
| 7,896,742 B2 | 3/2011 | Weston et al. | |
| 8,790,180 B2 * | 7/2014 | Barney ................... | A63F 13/08 463/39 |
| 8,961,312 B2 * | 2/2015 | Barney ................... | A63F 13/10 345/158 |
| 2002/0058459 A1 | 5/2002 | Holt | |
| 2003/0069077 A1 | 4/2003 | Korienek | |
| 2006/0040720 A1 * | 2/2006 | Harrison, Jr. ............. | A63F 9/24 463/9 |
| 2006/0046606 A1 | 3/2006 | Martin et al. | |
| 2007/0066395 A1 | 3/2007 | Harris et al. | |
| 2008/0009345 A1 | 1/2008 | Bailey et al. | |
| 2008/0039204 A1 | 2/2008 | Ackley et al. | |
| 2008/0238937 A1 | 10/2008 | Muraki | |
| 2009/0083847 A1 | 3/2009 | Fadell et al. | |
| 2009/0191968 A1 * | 7/2009 | Johnson ................... | A63F 13/10 463/37 |
| 2012/0178529 A1 | 7/2012 | Collard et al. | |
| 2013/0010207 A1 | 1/2013 | Valik et al. | |
| 2013/0084979 A1 | 4/2013 | Casino et al. | |
| 2013/0116051 A1 | 5/2013 | Barney et al. | |
| 2014/0235341 A1 | 8/2014 | Barney et al. | |
| 2015/0099585 A1 | 4/2015 | Barney et al. | |

OTHER PUBLICATIONS

Mark Ladd, "LyteShot: A Sensor-Based Mobile Gaming Platform (Canceled)—Kickstarter", https://www.kickstarter.com/projects/1450125572/lyteshot-a-sensor-based-mobile-gaming-platform, 16 pages, Apr. 29, 2015.

Lyteshot Main Page and Developers Page, http://lyteshot.com, 8 pages, May 4, 2015.

Harry Potter Control Want at noblecollection.com, http://www.noblecollection.com/Item-i.PRP-HP-8050, 1 page, May 5, 2015.

Harry Potter Remote Control Wand, http://www.wbshop.com/product/harry+potter+remote+control+wand+hpnbwandlurc.do, 4 pages, May 5, 2015.

International Search Report and Written Opinion dated Jun. 22, 2016 for International Application No. PCT/US2016/021365, 18 pages.

Office Action dated May 11, 2017 for U.S. Appl. No. 14/697,343, 40 pages.

International Search Report and Written Opinion dated Dec. 22, 2016, for International Application No. PCT/US2016/048216, 13 pages.

International Search Report and Written Opinion dated Dec. 27, 2016, for International Application No. PCT/US2016/048488, 19 pages.

International Search Report and Written Opinion dated Nov. 30, 2016, for International Application No. PCT/PCT/US2016/048481, 18 pages.

Non-Final Office action dated Jan. 11, 2017, issued in corresponding U.S. Appl. No. 14/697,343, 39 pages.

Office Action dated Oct. 25, 2017 for U.S. Appl. No. 14/863,101, 36 pages.

Final Office Action dated Jul. 24, 2018 for U.S. Appl. No. 14/863,101, 22 pages.

International Preliminary Report on Patentability dated Apr. 5, 2018 for International Patent Application No. PCT/US2016/048216, 9 pages.

* cited by examiner

MAGIC WAND METHODS, APPARATUSES AND SYSTEMS FOR DEFINING, INITIATING, AND CONDUCTING QUESTS

RELATED APPLICATIONS

This application is related to U.S. application Ser. No. 14/697,343 filed on Apr. 27, 2015 entitled "MAGIC WAND METHODS, APPARATUSES AND SYSTEMS."

FIELD

The present disclosure relates to the field of interactive computing, and in particular, to apparatuses, methods, storage media, and systems utilizing a wand in interactive games.

BACKGROUND

Entertainment systems, video game consoles, and/or other like gaming devices typically provide interactive gaming experiences wherein users interact with a game and/or other users by providing one or more inputs and receiving feedback in response to the provided inputs. The inputs may be provided using an input device or controller, such as joysticks, keyboards, computer mice, touchscreens, motion sensing devices, and the like. The feedback may be received using one or more output devices, such as through display devices, audio devices, haptic feedback devices, and the like.

Gaming devices and their controllers may provide some interactive gaming experiences. However, many of these gaming devices are limited to proprietary platforms, which often require the use of platform-specific controllers. The term "platform" may refer to the specific electronic components and software that provide a gaming experience. Furthermore, many of these gaming devices and gaming experiences may be limited to specific physical and/or virtual environments. Moreover, many of these gaming devices do not provide users with the ability to interact with other devices, such as non-proprietary gaming devices and/or non-gaming devices. Therefore, typical gaming devices and/or platforms may be limited in their ability to offer an immersive gaming experience.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
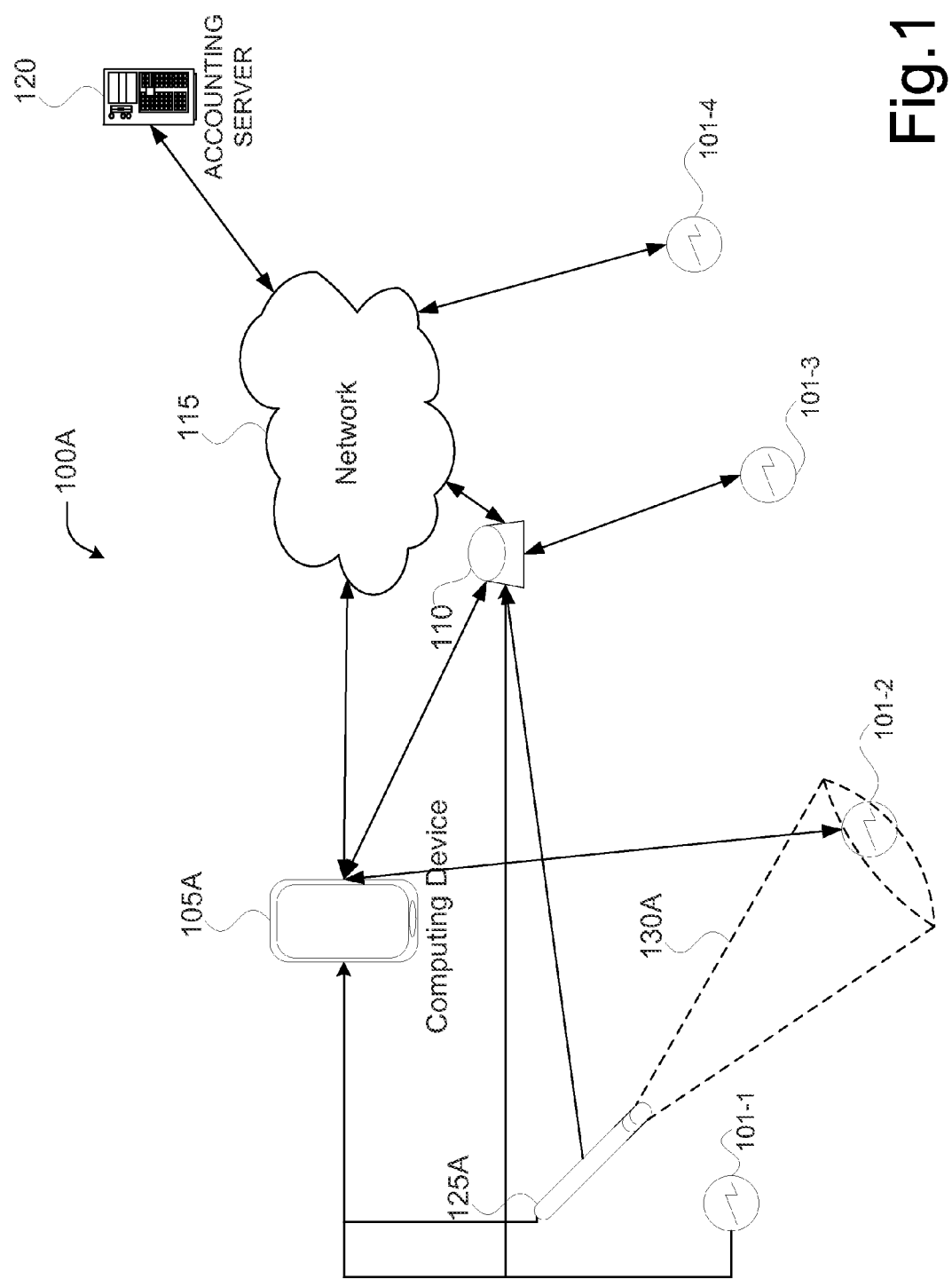
FIGS. 1-4 illustrate various gaming environments in which various example embodiments described in the present disclosure may be implemented.

In the following detailed description, reference is made to the accompanying drawings which form a part hereof wherein like numerals designate like parts throughout, and in which is shown by way of illustrated embodiments that may be practiced. It is to be understood that other embodiments may be utilized and structural and/or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions and/or operations in turn, in a manner that is most helpful in understanding the claimed subject matter. However, the order of description should not be construed to imply that the various operations are necessarily order dependent. In particular, these operations may not be performed in the order of presentation. Operations described may be performed in a different order than the described embodiments. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). For the purposes of the present disclosure, the phrase "at least one of A and B" means (A), (B), or (A and B).

The description may use the phrases "in an embodiment", or "in embodiments", which may each refer to one or more of the same or different embodiments. Furthermore, the terms "comprising," "including," "having," and the like, as used with respect to embodiments of the present disclosure, are synonymous.

As used herein, the term "logic", "module", and/or "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. In some embodiments, the modules and/or circuitry may be implemented in, or functions associated with the modules and/or circuitry may be implemented by, one or more software or firmware modules in combination with one or more hardware devices.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

As disclosed herein, the term "memory" may represent one or more hardware devices for storing data, including random access memory (RAM), magnetic RAM, core memory, read only memory (ROM), magnetic disk storage mediums, optical storage mediums, flash memory devices and/or other machine readable mediums for storing data. The term "computer-readable medium" may include, but is not limited to, memory, portable or fixed storage devices, optical storage devices, wireless channels, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. A code segment may represent a procedure, a function, a subprogram, a program, a routine, a subroutine, a module, program code, a software package, a class, or any combination of instructions, data structures, program statements, and the like.

As used herein, the term "computing device" may be considered synonymous to, and may hereafter be occasionally referred to, as a client, client device, mobile, mobile unit, mobile device, mobile terminal, mobile station, mobile user, user equipment (UE), user terminal, subscriber, user, remote station, access agent, user agent, receiver, etc., and may describe a remote user of network resources in a communications network. Furthermore, the term "computing device" may include any type of wired and/or wireless device such as consumer electronics devices, desktop personal computers (PCs), laptop PCs, smart phones, tablet PCs, wearable computing devices, personal digital assistants (PDAs), and/or any other like physical computing device that is able to connect to a communications network.

As used herein, the term "network element", may be considered synonymous to and/or referred to as a networked computer, networking hardware, network equipment, router, switch, hub, bridge, gateway, and/or other like device. The term "network element" may describe a physical computing device of a wired or wireless communication network that is configured to host a client device and the like. Furthermore, the term "network element" may describe equipment that provides radio baseband functions for data and/or voice connectivity between a network and one or more users.

As used herein, the term "game" may considered synonymous to and/or referred to as a quest, sport, event, activity, role-playing games (RPG), simulation, duel, etc. A game may be any sequence of events with or without a defined set of rules, wherein the sequence of events and/or rules may be defined by a game operator, game creator, and/or other like entity. Typically games have a beginning and a conclusion, but in some embodiments, a game may not have either a beginning or an ending.

Example embodiments disclosed herein provide apparatuses, systems, and methods for providing immersive interactive gaming experiences. Example embodiments introduce a "magic" wand that may be used for interacting with a game or immersing oneself within a gaming environment. Example embodiments also utilize already existing output devices and/or already existing gaming platforms to provide gaming feedback to a user. The example embodiments differ from typical gaming platforms or systems that provide interactive gaming experiences because the typical gaming platforms are usually tied to a specific proprietary platform, and/or tied to a specific physical or virtual environment. For example, video game platforms require proprietary video game consoles, which often require proprietary video game controllers, video game motion detectors, and video game software to run on the video game console. Additionally, most video game platforms do not provide for interoperability with or between competing platforms. By way of another example, laser tag, which is a recreational activity where players attempt to score points by tagging targets, typically requires a hand-held infrared (IR)-emitting targeting device to be used within a defined physical environment, such as an indoor or outdoor arena. Many laser tag systems use IR-sensitive targets are commonly worn by each player and may be integrated within the arena in which the game is played, which may allow laser tag participants to interact with one another and their defined environment. However, typical laser tag systems are limited to their specific physical environment and usually require users to employ the same or similar IR-emitting targeting devices. Additionally, although many laser tag systems and devices use hardware and embedded software to alter game parameters and/or provided varied game play, these typical laser tag systems usually only provide a single method for tagging targets, such as by pulling a trigger on a laser tag gun. Moreover, due at least in part to the aforementioned limitations, most laser tag systems do not typically include quest type games, such as geocaching, scavenger hunt games, and/or the like.

In many quest type games, such as scavenger hunts, a game creator may prepare a list of specific items to be discovered by individual participants or teams, wherein the game participants seek to gather each item on the list, perform tasks at a geolocation of the items on the list, or take photographs of the items on the list. The aforementioned activities may be required in order to prove that a participant did in fact discover/gather each item on the list. In some cases, a game creator may devise riddles, puzzles, or other challenges that may indicate the items on the list. Additionally or alternatively, each item, once discovered, may provide a riddle, puzzle, challenge, or clue indicating a location of a next item to be discovered. Furthermore, some scavenger hunt games may also be a race wherein a participant may win a prize if that participant discovers/collects each item on the list before any other participant. In typical geocaching games, a geocache creator may create a cache comprising a container containing a log book with writing implement, trade items, and the like. The geocache creator may record the cache's coordinates with other details describing the cache's location, and post the cache's location on a listing site, such as a geocaching-related website. Geocache searchers obtain the coordinates from that listing site and search out the cache using a Global Positioning System (GPS) handheld receiver, a mobile phone including GPS circuitry, or other like devices. Geocachers may also take objects from the cache in exchange for leaving something of similar or higher value. The geocache searchers typically record their exploits in the logbook and/or on the listing site, and return the cache to the same coordinates so that other geocache searchers may find the cache. The geocache searchers may record their exploits on the listing site by tacking a photo of the cache, scanning a quick response (QR) code located on or near the cache, recording GPS coordinates at the location where the cache was discovered, typing a word into a geocaching application, and the like. Additionally, a geocaching game may be a form of scavenger hunt, wherein a geocache creator defines a list indicating a plurality of caches to be discovered. Such a list could be posted on the aforementioned listing site. In some cases, each cache may provide a riddle, puzzle, challenge, or clue indicating a location of a next cache to be discovered. However, these typical quest games are limited in their ability to provide an immersive gaming experience, such as providing a dynamic quest wherein an order of the items or caches to be discovered may change, providing interactive devices or caches, providing handicapping for the quest, and the like.

Example embodiments discussed herein provide methods, apparatuses, and systems for initiating and conducting one or more quests using at least one wand. Example embodiments also provide methods, apparatuses, and systems for defining a quest. Such quests may be individualized quests wherein a single wand user searches for one or more devices delineated by a quest or order of devices, and performs one or more gestures to access or activate each discovered device. Example embodiments also provide that a quest may take place between teams of one or more wands wherein a plurality of wand users search for one or more items or caches delineated by a wand quest and at least one of the plurality of wand users performs one or more gestures to access or activate each discovered item or cache. As opposed to typical quest games, such as scavenger hunts and geocaching discussed above, at least some example embodiments provide that the performance of one or more gestures may be used to discover, acquire, or access one or more devices located at a cache. Furthermore, example embodiments provide that caches may include a variety of devices, such as internet of things (IoT) devices, each of which may provide a different service. Moreover, example embodiments provide that a geocache creator or other like game creator may define a quest by performing one or more gestures at a cache geolocation or IoT device deployment area instead of merely placing the a container at a desired geolocation. Other embodiments are also described.

The example embodiments disclosed herein refer to a user interface device/controller as a "wand", which may refer to the general shape and/or form of the user interface device. However, it should be noted that the term "wand" is not meant to limit the user interface device disclosed herein to a specific shape or form. Indeed, other forms, shapes, and/or artistic representations of the user interface device may be used. For example, the user interface device may be shaped, formed, or otherwise implemented as a scepter, a staff, a baton, a rod, a pen, a sword, a sabre, a screwdriver, a glove, a ring, a bracelet, stuffed or plush toy, a baseball bat, a lacrosse stick, and/or any other like device that may impart directionality. Furthermore, the example embodiments disclosed herein refer to the environment in which the wand or user interface device is used as a "gaming environment" or "environment". It should be noted that the user interface devices disclosed herein may be used for various activities other than games. For example, the user interface device may be implemented in toy guns, training guns, and the like for use in police and/or military training environments, such as urban operations (UO) exercises, military operations in urban terrain (MOUT) exercises, and the like. By way of another example, the user interface device may be implemented in a wearable device for use in commercial environments, such as a shopping mall, a city's downtown region, or specific shops/stores. Moreover, the user interface device described herein may be used for home automation, such as controlling one or more services associated with one or more smart objects or IoT devices.

In various embodiments, the wand is a user interface that allows a user to initiate specific "spells", which, according to various embodiments, may be triggers to one or more sequences, operations, and/or actions by internal feedback/output devices and/or external feedback/output devices. For example, a user may perform an "unlock" spell by manipulating a wand using various motions and/or gestures, which may be converted into a spell sequence. The spell sequence may then be used to determine that a smart lock is to unlocked, and state-change instructions (or "unlock" instructions in this example) may be sent to the smart lock. In various embodiments, the wand may use one or more built-in or associated sensors to collect data about an intended spell, spell direction, and/or spell intensity. In various embodiments, the collected data may include spatial coordinates of the wand and/or changes in the spatial coordinates captured by the one or more sensors, position information of the wand relative to one or more external devices (including other wands), and/or voice commands issued by a user of the wand. Examples of the one or more sensors include accelerometers, gyroscopes, magnetometers, gravimeters, temperature sensors, pressure sensors, humidity sensors, electromagnetic energy (ultraviolet, visible light, IR, etc.) sensors, GPS sensors, microphones, and the like. In various embodiments, the wand may also include a communications module, transmission circuitry, and/or other means of device communications so that the wand may communicate the collected sensor data to a computing device, a gaming system, external output/feedback devices, and the like. The communications between the wand and the other devices may be by way of radio-frequency (RF) communications methods, such as Bluetooth low energy (BLE) signaling, RF identification (RFID) signaling, IR signaling, WiFi signaling, and the like. In some embodiments, the wand may send the data to an application running on a paired computing device, such as a smartphone, a desktop PC, a home/arena server, or any other like dedicated device. The computing device, by way of the application, may analyze the data, determine the spell type, spell direction, and/or spell intensity. The computing device, by way of the application, may then communicate with, or otherwise instruct one or more feedback/output devices in the vicinity of the wand and/or computing device to activate in accordance with the determined spell. Furthermore, the computing device may also send information indicative of the determined spell to a game accounting server or other like back-end service to track a user's progress in an interactive game and/or quest. In some embodiments, the computing device may include the capabilities and/or functions of the back-end service. In some embodiments, the wand itself may include the capabilities and/or functions of the computing device, such that the wand itself may determine the spell type, spell direction, and spell intensity and instruct one or more feedback/output devices in the vicinity of the wand to activate in accordance with the determined spell. In various embodiments, the electronic components and software components of the wand may be housed in a "wand module", which can be inserted in a larger housing, which may allow for a variety of artistic representations of the "wand". For example, the housing could be a hand-held device that is depicted in various movies, television series, books, etc.

Figure 2:
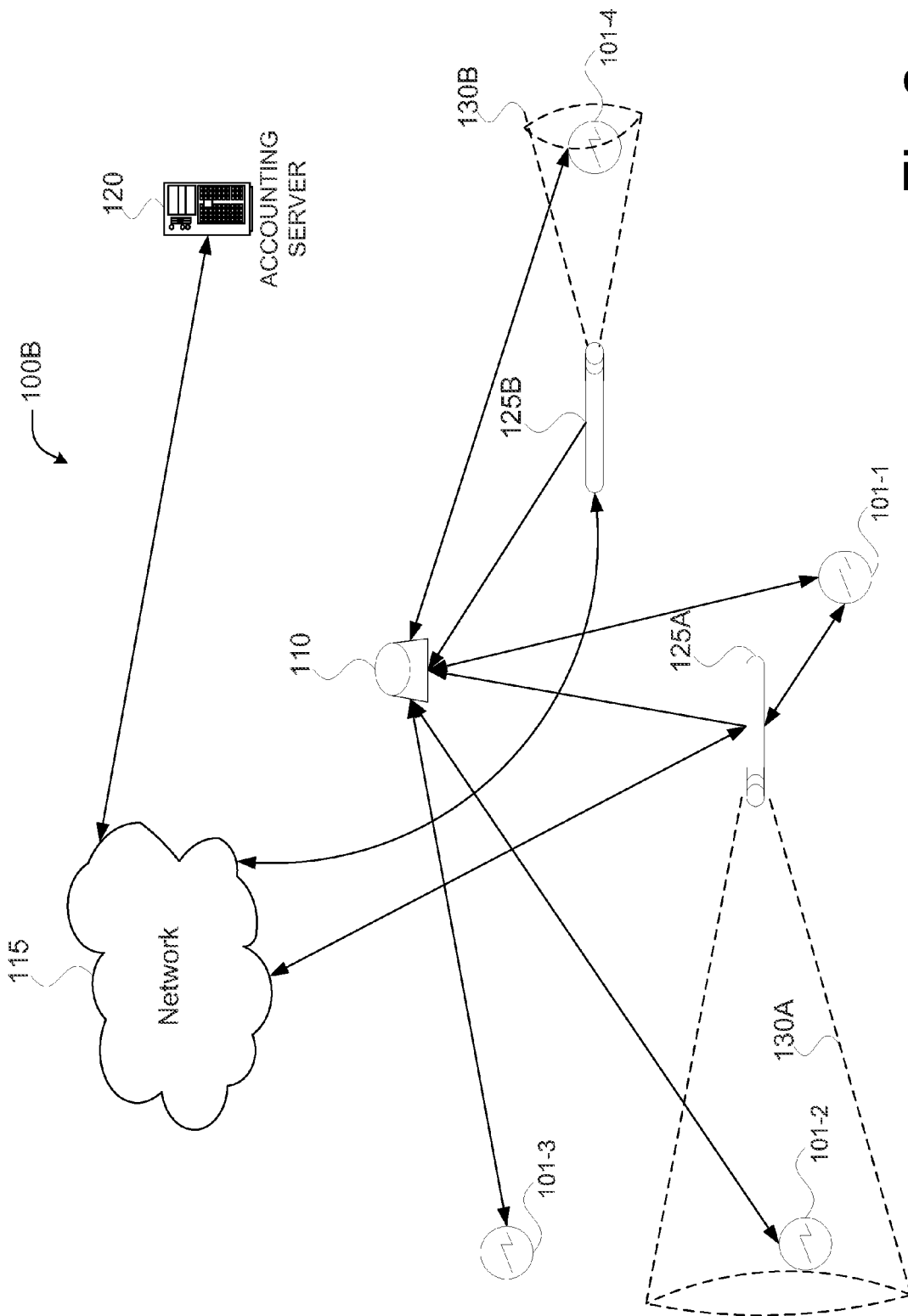
Figure 3:
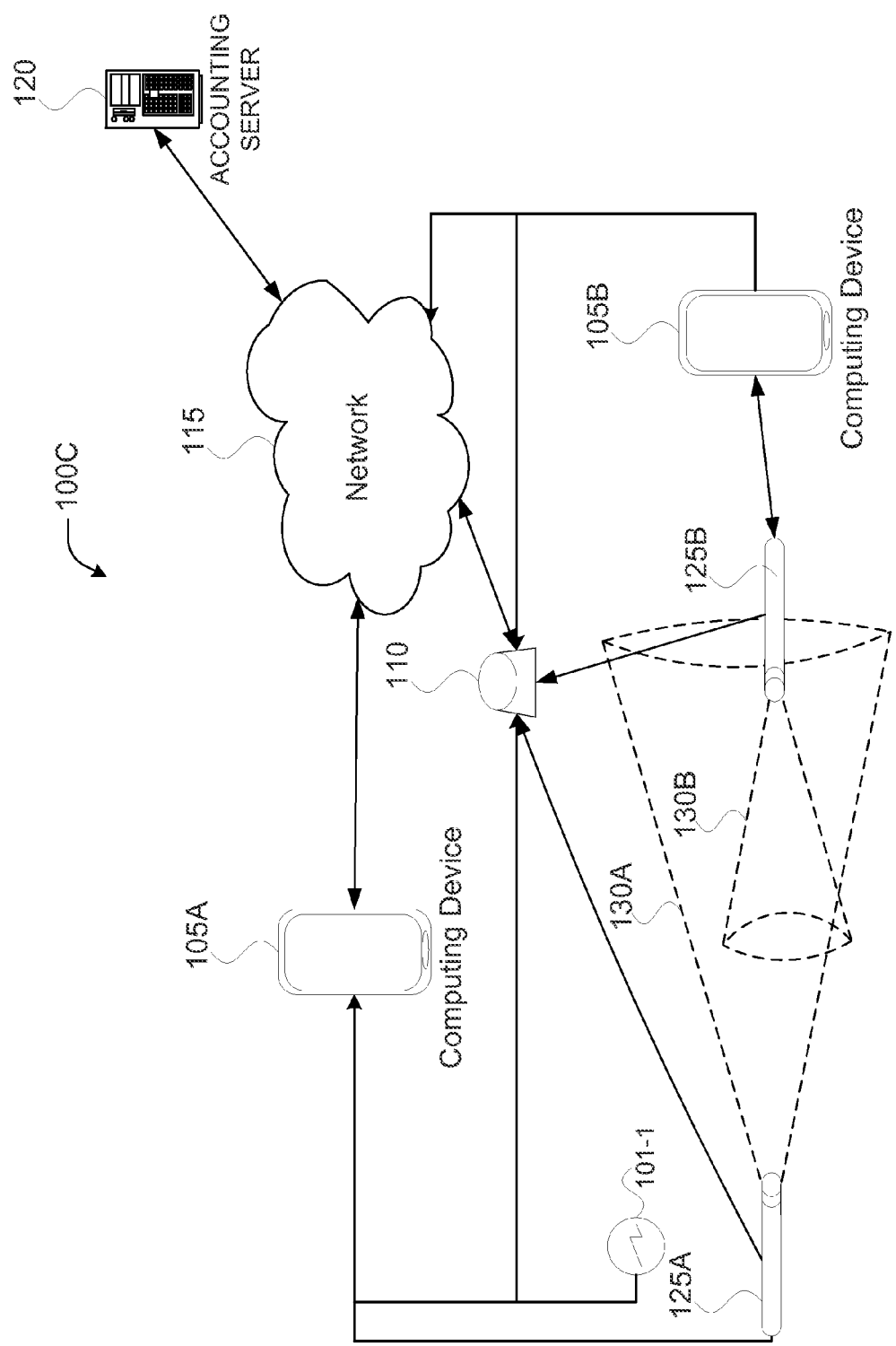

Referring now to the figures. FIGS. 1-3 show gaming environments 100A, 100B, and 100C (collectively referred to as "gaming environment 100"), respectively, in which a wand 125 may be used to activate one or more devices 101-1 to 101-4, in accordance with various embodiments. As shown in FIGS. 1A-1C, gaming environment 100 may include devices 101-1 to 101-4 (collectively referred to as "devices 101"), computing devices 105A and 105B (collectively referred to as "computing devices 105" or "computing device 105"), beacon 110, network 115, accounting server 120, and wand 125A and 125B (collectively referred to as "wand 125"). FIG. 1 illustrates an example embodiment of a single player gaming environment 100A in which the wand 125A is coupled with computing device 105A; FIG. 2 illustrates an example embodiment of a multiplayer gaming environment 100B in which the wand 125A and 125B operate without coupled computing devices 105A and 105B; and FIG. 3 illustrates an example embodiment of a multi-player gaming environment 100C in which a "wand duel" takes place between wand 125A and 125B coupled with computing devices 105A and 105B, respectively.

Figure 6:
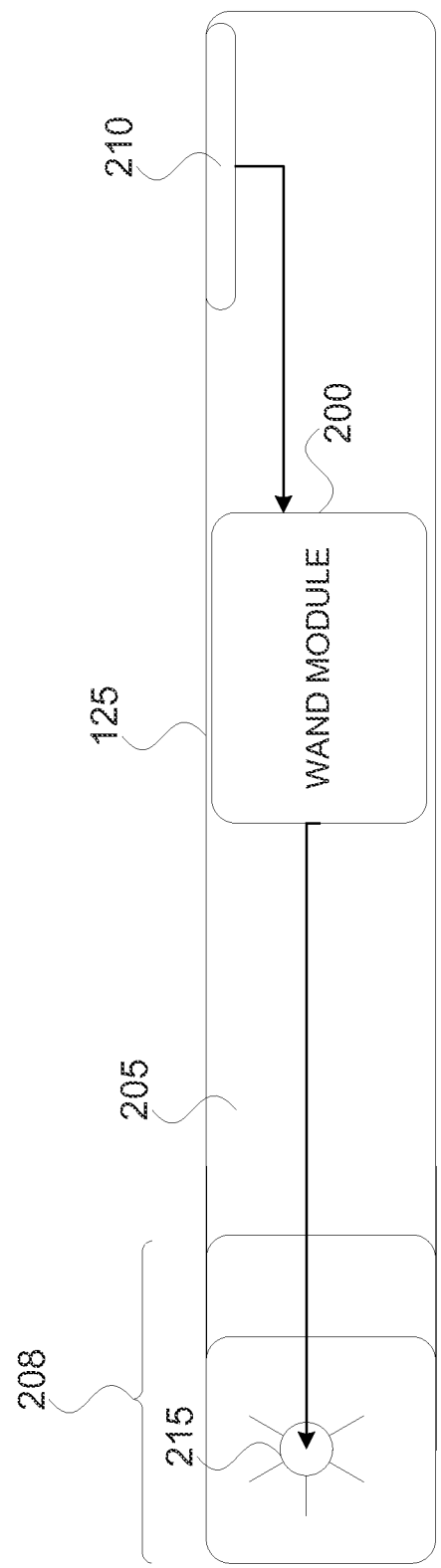
FIG. 6 illustrates the components of a wand, in accordance with various example embodiments.
Figure 7:
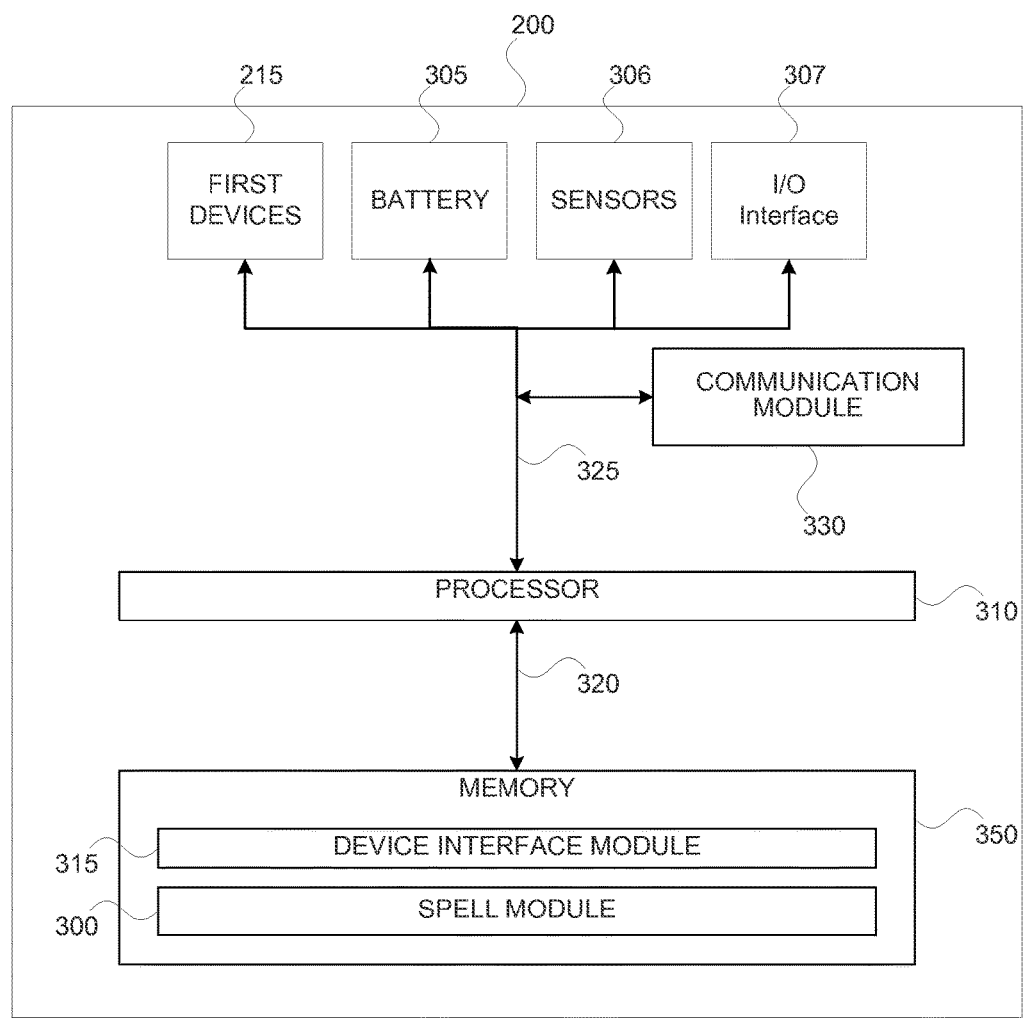
FIG. 7 illustrates the components of a wand module, in accordance with various example embodiments.
Figure 9:
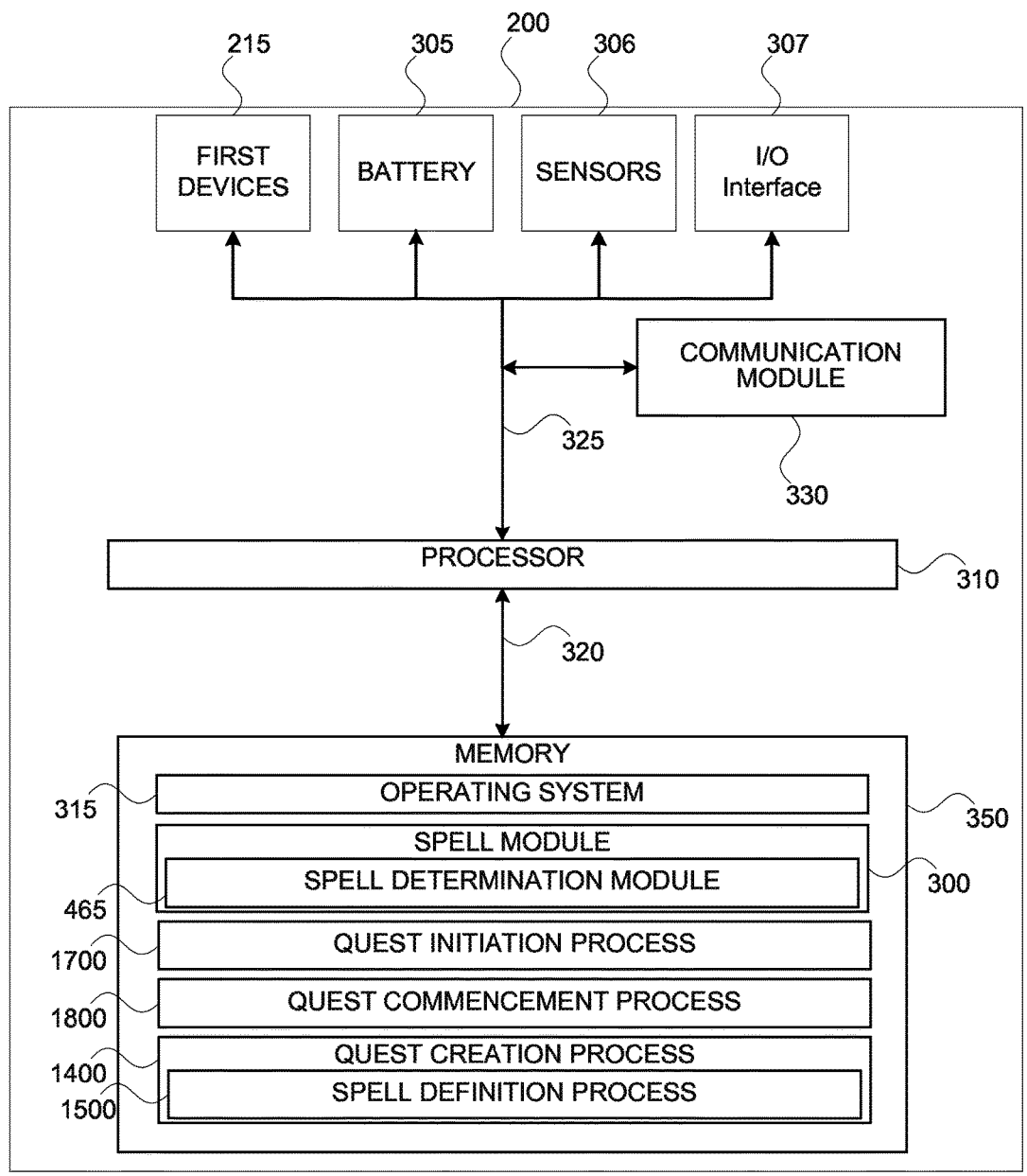
FIG. 9 illustrates the components of a wand module, in accordance with various example embodiments.

According to various embodiments, wand 125 may be any handheld device that provides a user with the ability to interact with one or more devices in the gaming environment 100, such as devices 101 and/or computing devices 105. The wand 125 may include a communication module (e.g., communications module 330 as shown in FIGS. 7 and 9), one or more memory devices (e.g., memory 350 as shown in FIGS. 7 and 9), one or more processors (e.g., processor 310 as shown in FIGS. 7 and 9), one or more sensors (e.g., sensors 306 as shown in FIGS. 7 and 9), one or more output/feedback devices (e.g., first devices 215 as shown in FIGS. 6, 7, and 9), and/or other like components (e.g., as shown in FIGS. 7 and 9). Wand 125 may be designed to sequentially and automatically carry out a sequence of arithmetic or logical operations; equipped to record/store digital data on a machine readable medium; and transmit and receive digital data.

Wand 125 may include one or more sensors, such as an accelerometer, gyroscope, gravimeter, magnetometer, and/or another like devices that are configured to measure and/or detect a motion, an acceleration, and/or an orientation of the wand 125. In such embodiments, wand 125 may be configured to determine a magnitude and direction of an acceleration and/or motion of the wand 125, and convert the acceleration and/or motion of the wand 125 into position and/or orientation information. The changes in the positions and/or orientations of the wand 125 may be indicative of one or more gestures performed by a user of the wand 125. The one or more sensors may be configured to detect the one or more gestures as sensor data. In various embodiments, the sensor data may include or otherwise indicate one or more spatial coordinates (or changes in spatial coordinates) for the positions and/or orientations of the wand 125. The sensor data may then be passed to a processor and/or spell module of the wand 125 to be converted into a spell sequence, or for any other type of analysis and/or filtering. In this way, the positions and/or orientations (or changes in the positions and/or orientations) may be used to determine a spell type, spell direction, spell intensity, etc. according to the various example embodiments described herein. In some embodiments, the one or more sensors may include a microphone configured to obtain one or more voice commands issued by a user of the wand 125. In such embodiments, the one or more voice commands may be recorded and included with the spell sequence for spell determination. In some embodiments, the one or more sensors may include one or more biometric sensors, such as an infrared heart rate monitoring device, a fingerprint or handprint scanning device, an eye scanning device, an electromyography (EMG) device for detecting electrical patterns associated with a user's muscular contractions, an electroencephalograph (EEG) device for measuring and/or recording electrical signals produced by a user's brain, and the like. In such embodiments, biometric data detected or sensed by the one or more biometric sensors may be included with the spell sequence for spell determination, such that the user's heart rate, finger/hand print, muscular contractions, brainwaves, and the like may be included with the spell sequence for spell determination.

Furthermore, in various embodiments, the wand 125 may track timing information associated with one or more performed gestures. Such timing information may be a time period in which the one or more gestures are required to be performed (within a certain margin of error) and/or a time period in which each of the one or more gestures are to be performed. For instance, a spell may require specific sequences or timing relationships in order to obtain a spell output. For example, a spell might require a button press followed by a bodily movement, followed by a voice command, etc., wherein all of the aforementioned gestures are required to be performed within a 30 second period of time. By way of another example, a spell may require that a bodily movement and a voice command start and complete within 200 milliseconds of each other. In some embodiments, the time period for performing the one or more gestures may be altered or adjusted according to a handicap value associated with a user of the wand 125. In such embodiments, adjusting the time period for performing one or more gestures may include increasing the time period or decreasing the time period. The handicap value and/or time period adjustments may be based on one or more game-related value/criteria/rules. Furthermore, in quest scenarios, the handicap value may be used to alter the time period for performing the one or more gestures. For example, a handicap value associated with a user of wand 125A may increase a first defined period of time for performing gestures according to the handicap value and/or may decrease a second defined period of time for performing gestures, which is associated with the other wand 125B. In some embodiments, the first defined period of time for performing gestures may stay the same while the second defined period of time is decreased.

In some embodiments, the one or more sensors may include one or more motion capture devices that may be configured to capture motion by detecting a change in position of a body relative to its surroundings, or by detecting a change in the surroundings relative to the body. In such embodiments, the motion capture devices may be configured to measure the strength and/or speed of a body's motion. In various embodiments, the one or more sensors may include one or more optical cameras and/or one or more thermographic (IR) cameras, which may be configured to form images using IR radiation. Such IR cameras may be similar to optical-lens cameras, which form images using visible light, but instead operate in wavelengths in the infrared range of the electromagnetic spectrum. In embodiments where the sensors include one or more IR cameras, the sensors may also include an IR projector and/or IR laser projector, which may be configured to project an IR beam at one or more targets and sense a reflection of the infrared beam being reflected off the one or more targets.

In some embodiments, the IR projector may be an IR LED that emits IR radiation as the IR beam or signal. The IR beam or signal may be a sequence of flashes or pulses that are emitted at a predefined frequency. In response to detection of an IR beam/reflection, in some embodiments the wand 125 may provide one or more first instructions to one or more first devices and/or provide one or more second instructions to one or more second devices according to the various example embodiments disclosed herein. Additionally, the IR camera may detect IR beams being emitted by other devices, such as other wands 125 and/or other computing devices 105. In various embodiments, the IR beams may include one or more messages described herein, such as quest initiation messages, spell messages, team forming messages, and the like. In such embodiments, the IR camera may sense or otherwise detect the sequence of flashes or pulses of the IR beam, which may then be converted into the aforementioned messages according to known methods. It should be noted that in some embodiments, the IR camera and the IR projector may be separate from the wand 125. For example, the IR camera and the IR projector may be included in an IR target that may be a device 101 (e.g., an auxiliary device) that is communicatively coupled to the computing device 105 and/or the wand 125. It should be noted that the aforementioned messages are not limited to being transmitted/received via IR beams, and in various embodiments, such messages may be communicated via other signals, such as Bluetooth or BLE signals, WiFi signals, and/or any other wireless signals discussed herein. Such messages may be communicated directly between wand 125 and/or computing devices 105, or such messages may be communicated by way of an intermediary device, such as via beacon 110, a home or local server, a WiFi router, or other like network device. Moreover, each of the aforementioned messages may be communicated by way of a different wireless signal, for example, quest initiation messages and/or team forming messages may be communicated via a WiFi signal, and spell messages may be communicated via one or more IR beams.

In various embodiments, in addition to determining the orientation of the wand 125, the one or more sensors may be used to determine the directionality of the wand 125. The orientation of the wand 125 may be an angle of the wand 125 relative one or more objects, such as a body part of the user of the wand 125. The directionality may indicate a direction in which the wand is directed and/or being pointed by the user. In this regard, the wand 125 may have a defined portion from which a spell output is to be applied (or a region of effect (ROE) is to be directed and/or focused). The defined portion may include, for example, a front portion or tip portion (e.g. tip portion 208 as shown in FIG. 6) from which the spell or "magic" is to emanate. Accordingly, in various embodiments, the wand 125 may use the position and/or orientation information from the one or more sensors to distinguish one portion of the wand 125 from other portions of the wand.

In some embodiments, the one or more sensors may sense environmental factors, which may be included with the spell sequence and used to determine a spell intensity and/or spell output. The environmental factors may include any information regarding an environment of the gaming environment 100, such as ambient lighting, surrounding electromagnetic fields, and/or any other like biotic or abiotic factors surrounding the wand 125.

As noted previously, the changes in the positions and/or orientations of the wand 125 may be indicative of one or more gestures performed by a user of the wand 125. The one or more gestures may include bodily movements, voice commands, and/or other like inputs, such as pressing a button 210 of the wand 125 and the like. The bodily movement gestures may include any action or movement of the wand 125 made by the user. The bodily movement gestures can originate from any bodily motion or state, but because the wand 125 is typically embodied as a handheld device, the one or more gestures may originate from a hand of a user. Additionally, the bodily movement gestures may be based on a height and/or body part lengths of the user, which may be based on the accuracy of the spatial coordinate data detected by the one or more sensors. For example, a first user that makes a circular motion with an extended arm may yield different spatial coordinate changes than a second user that makes a similar circular motion with an extended arm, such as when the height and and/or arm length of the first user are greater than the height and and/or arm length of the second user. In this instance, the circular movement made by the first user may produce a larger circumference than a circumference of the circular movement made by the second user. Additionally, a bodily movement gesture can include not only movement of the wand 125, but may also be based on a body position established by a user. Furthermore, in various embodiments, the voice command gestures may include specific sounds or words that are pronounced by the user of the wand 125. It should be noted that the sounds or words do not have to be previously known in any human language, but rather, the sounds or words may only be required to be repeatable by the user. In various embodiments, the wand 125 may be configured to record voice command gestures, and communicate those recordings to the computing device 105 for voice recognition. In other embodiments, the wand 125 may be configured to perform the voice recognition of the voice command gestures. The voice recognition methods and systems are known or commercially available, and are readily implemented by persons having ordinary skill in the art, particularly in light of the disclosure herein.

In various embodiments, wand 125 may include one or more feedback/output devices, which are internal to the wand 125, attached to a housing 205 of the wand 125, and/or communicatively coupled with the wand 125 and/or computing device 105. The devices that are internal, attached, and/or communicatively coupled with the wand 125 and/or computing device 105 may be referred to as "first devices". The one or more first devices may be used to provide feedback or other like indications as to whether a spell has been properly performed or not (within a certain margin of error). The first devices may include one or more audio devices, one or more light emitting diodes, one or more haptic feedback devices and/or one or more actuators, one or more heating elements, and the like. In some embodiments, the first devices may include a display device and/or a projector. The wand 125 may instruct or otherwise activate the one or more first devices by issuing one or more instructions or control signals to the one or more first devices, which are referred to herein as "first instructions". The first instructions may be defined by a spell output, which is associated with one or more spells, wherein the spell output indicates to issue the first instructions upon completion of an associated spell (within a certain margin of error). The spell output may also define or otherwise indicate a spell output intensity, which may be an intensity level at which to activate the one or more first devices. The first instructions and/or control signals may instruct and/or control the one or more first devices to output a desired audio output at a desired volume level and/or for a desired playback time when the one or more first devices include the one or more audio devices; emit a desired light sequence and/or illumination level/intensity when the one or more first devices include the one or more light emitting diodes; activate at least one of a vibration and a mechanical motion at a desired intensity and/or for a desired period of time when the one or more first devices include the one or more haptic feedback devices, one or more actuators, and/or one or more transcutaneous electrical nerve stimulation (TENS) devices; and heat the wand to a desired temperature when the one or more first devices include the one or more heating elements. Furthermore, in various embodiments, the first instructions may indicate to turn off or shut down various functions, such as shutting off one or more LEDs. In some embodiments, the first instructions may include sending (additional) game-related messages to other users in the gaming environment 100 (e.g., "fireball from user A exploded at position (X,Y,Z) including 10 points damage to players B and C and/or devices within 5 meters of position (X,Y,Z)").

As noted previously, the first devices may include devices that are communicatively coupled with the wand 125 and/or computing device 105. Such devices may include Bluetooth earpieces, headphones, and/or speakers; a head-mounted (or helmet-mounted) display device; a head-mounted (or helmet-mounted) augmented reality headset; and the like. In embodiments, where the first instructions indicate to play an audio output and/or a video output, the files associated with the audio output and/or video output may be stored in a computer-readable medium of the computing device 105, stored in a computer-readable medium of the wand 125, and/or the output files may be streamed or otherwise provided to the computing device 105 and/or the wand 125 from a content provider on-demand, which may then be output via the communicatively coupled output device. Additionally in various embodiments, an audio output or video output (e.g., a sound effect, etc.) may indicate the success or failure of the spell output. For example, one or more sound effects that vary in tone, sequence, and/or amplitude may be used to indicate the level of success of the spell output. In some embodiments, the audio/video output may include corresponding effects to indicate different amounts of spell output intensities, such as by using a fizzling sound and the like. In other embodiments, a sound effect may be a recorded or synthesized utterance, which may provide a message such as "Your spell has completed properly" or "Your spell has not completed properly". Furthermore, in various embodiments a haptic and/or visual response (e.g., vibration and/or LED illumination, etc.) may also be generated from the wand 125 to be used in combination with one or more sound effects. Moreover, the first instructions (and/or the second instructions described herein) may indicate that a gesture was incorrectly performed or missing from a spell sequence, the user has insufficient authorization to perform a spell (e.g., a wand 125 is not authorized to perform the spell or obtain the spell output), the performance of a spell was done at an unauthorized location and/or spatial coordinates, the user has insufficient game play property/points for performing the spell or obtaining the spell output, the performance of the spell is impossible (e.g., an "open door" spell is performed when there is no door proximate to the wand 125), a game play parameter item in the gaming environment 100 is interfering with the spell ("fireball inhibitor prevents fireball spells in a particular room"), and the like.

Wand 125 may be configured to send/receive data to/from a computing device 105, one or more devices 101, and/or a network element (e.g., accounting server 120, etc.) via a direct wireless connection and/or via a network connection (e.g., network 115). For example, the wand 125 may directly connect with one or more devices via the direct wireless connection by using, for example, Bluetooth and/or BLE protocols, WiFi protocols, Infrared Data Association (IrDA) protocols, ANT and/or ANT+ protocols, 3rd Generation Partnership Project (3GPP) Long Term Evolution (LTE) Proximity Services (ProSe) protocols, and the like. In some embodiments, wand 125 may connect with one or more devices (e.g., devices 101 and/or computing device 105) via network 115 in accordance with one or more wireless communications protocols and/or one or more cellular phone communications protocols. In such embodiments, wand 125 may be configured to operate in accordance with the Global System for Mobile Communications (GSM), Enhanced Data GSM Environment (EDGE), wideband code division multiple access (WCDMA), code division multiple access (CDMA), time division multiple access (TDMA), Bluetooth, Wireless Fidelity (Wi-Fi) such as the Institute of Electrical and Electronics Engineers (IEEE) 802.11a, IEEE 802.11b, IEEE 802.11g, IEEE 802.11ac, and/or IEEE 802.11n, voice over Internet Protocol (VoIP), Wi-MAX, LTE, and/or any other wireless communication protocols.

In various embodiments, by utilizing a direct wireless connection or a network connection, wand 125 may operate, control, or otherwise activate one or more external feedback/output devices (also referred to as "second devices" herein). Referring to FIGS. 1-3, the one or more external feedback/output devices may include the devices 101 and/or the computing device 105. The one or more second devices may be used to provide feedback or another like indication as to whether a spell has been properly performed or not (within a certain margin of error). The second devices may include one or more components of computing devices 105 and/or other computing devices, one or more auxiliary devices, one or more IoT devices, one or more audio devices, one or more display devices, one or more other wands 125, and the like. It should be noted that in various embodiments, an IoT device may include one or more display devices and/or one or more audio devices. The wand 125 may instruct or otherwise activate the one or more second devices by communicating one or more instructions or control signals over the direct wireless connection or via the network connection to the one or more second devices (also referred to as "second instructions" herein). The second instructions may be defined by a spell output, which is associated with one or more spells, wherein the spell output indicates to issue the second instructions upon completion of an associated spell. The second instructions and/or control signals may instruct and/or control the one or more second devices to execute desired program code when one or more second devices include the computing device 105 and/or one or more other computing devices; access one or more services associated with one or more IoT devices when the one or more second devices include one or more IoT devices; output a desired audio output when the one or more second devices include one or more audio devices; output a desired video output when the one or more second devices include one or more display devices; move to another location, change a position, or otherwise activate one or more electromechanical components when the one or more second devices includes a robot, a robotic vehicle, an unmanned aerial vehicle (UAV), a drone, and/or the like; and/or record a spell output when the one or more second devices include one or more other wands 125 and/or one or more other computing devices 105. Furthermore, in various embodiments, the second instructions may indicate to turn off or shut down various functions, such as shutting off a video display, etc. In some embodiments, the second instructions may include sending (additional) game-related messages to other users in the gaming environment 100 (e.g., "fireball from user A exploded at position (X,Y,Z) including 10 points damage to players and/or devices within 5 meters of position (X,Y,Z)"). Moreover, the second instructions may indicate that a gesture was incorrectly performed or missing from a spell sequence, the user has insufficient authorization to perform a spell (e.g., a wand 125 is not authorized to perform the spell or obtain the spell output), the performance of a spell was done at an unauthorized location and/or spatial coordinates, the user has insufficient game play property/points for performing the spell or obtaining the spell output, the performance of the spell is impossible (e.g., an "open door" spell is performed when there is no door proximate to the wand 125), a game play parameter item in the gaming environment 100 is interfering with the spell ("fireball inhibitor prevents fireball spells in a particular room"), and the like.

In various embodiments, the second instructions may indicate that a wand quest has been initiated, such as when a wand user performs a quest initiation spell as disclosed herein, and/or the second instructions may indicate that one or more wand users have accepted or otherwise formed a team of wands to participate in a wand quest, such as when a wand user performs a quest initiation spell and/or a teammate participation spell as disclosed herein. In such embodiments, the wand 125 and/or the associated computing device 105 may receive an message or indication that may indicate whether the wand 125 is to be included in a wand quest with another wand 125. Such a message may include one or more first instructions and/or one or more second instructions, which activate one or more second devices communicatively coupled with the wand 125 and/or the computing device 105 to indicate that a quest is to commence and/or indicate that a team has been formed. For example, such second instructions may emit a predefined quest initiation tone or tones in a predefined sequence when the one or more second devices include a speaker or other like audio devices communicatively coupled with the computing device 105; output a predefined quest initiation video output when the one or more second devices include one or more display devices; and/or produce any other type of output according to any other example embodiment disclosed herein.

According to various embodiments, wand 125A may include or otherwise be associated with a region of effect (ROE) 130A and wand 125B may include or otherwise be associated with a region of effect (ROE) 130B (collectively referred to as "region of effect 130" or "ROE 130"). ROE 130 defines an area in which a spell output is to be applied such that one or more devices 101 within the ROE 130 are activated when a spell is performed using the wand 125. In various embodiments, the ROE 130 is determined by the computing device 105 coupled with the wand 125 (e.g., computing device 105A coupled with wand 125A as shown in FIGS. 1-3). In such embodiments, the computing device 105 may determine a shape and/or size of the ROE 130, and determine whether one or more devices 101 and/or other wands 125 are within the ROE 130 based on a position of the devices 101 and/or other wands 125. The positions of the one or more other devices 101 and/or other wands 125 may be indicated by an identifier or other like signal being broadcast by a device 101 and/or wand 125, and/or based on a position of the wand 125 relative to the position of a device 101 and/or other wand 125. In other embodiments, the wand 125 may determine the shape and/or size of the ROE 130, and determine whether one or more devices 101 and/or other wands are within the ROE 130. In some embodiments, when multiple devices 101 and/or other wands 125 are within the ROE 130, the computing device 105 and/or wand 125 may activate issue second instructions to each device within the ROE 130. In various embodiments, when multiple devices 101 and/or other wands 125 are within the ROE 130, the computing device 105 and/or wand 125 may determine a spell output target device based on a position of the wand 125 and/or an orientation of the wand 125. The spell output target device may be a device to which the wand 125 is directed by the user, which may be indicated by a portion from which the ROE 130 emanates. Furthermore, in some embodiments, the spell output target device may include multiple second devices while excluding other second devices within the ROE 130.

In various embodiments, the spell output intensity may be based on a distance between the wand 125 and a position of the spell output target device, and/or the spell output intensity may be based on a position of the spell output target device within the ROE 130. The spell output intensity may indicate an intensity at which the one or more second devices within the ROE 130 are to be activated. For instance, a device that is located relatively far from the wand 125 may be activated at a lower intensity than a device that is located relatively close to the wand 125. By way of example, an audio device that is relatively far from the wand 125 may play a desired audio output at a lower volume and/or decrease the volume over time, whereas when the audio device is relatively close to the wand 125, the audio device may play the desired audio output at a higher volume. In various embodiments, spell output intensity may also indicate a brightness level for a display device and/or a device including LEDs, may indicate a termination point of an audio and/or video output that is before the audio and/or video output's prescribed ending, may specify an amount to move an electro-mechanical device, may indicate a game play properties/effects (e.g., damage amounts, health restoration amount, a virtual or physical on/off, open/close, and/or lock/unlock indication, physical dispense amount (vending machines, etc.) a virtual dispense amount for virtual property (points, health, damage loss, gold count, etc.)), and/or the like. In this way, the spell output may have an appearance of attenuation based on the user's position within the gaming environment 100.

In some embodiments, device attributes may be used to determine a spell output and/or spell output intensity. The device attributes may indicate a device type and/or status of one or more peripheral devices and/or internal components (e.g., processor speed, memory utilization, battery charge amounts, etc.) of the wand 125. For example, the wand 125 and/or the computing device 105 may determine that an amount of charge remaining in a battery of the wand 125 is 50%, and the wand 125 and/or the computing device 105 may then reduce the spell intensity output by 50%.

Figure 4:
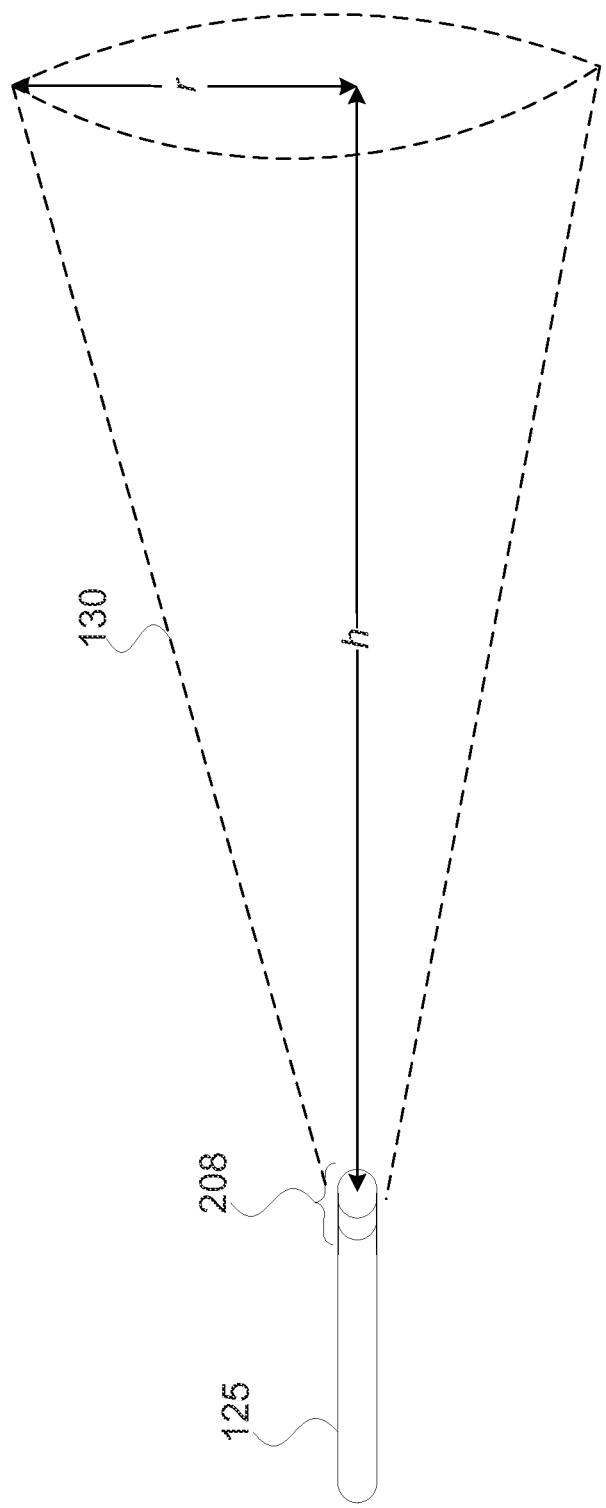

Referring now also to FIG. 4, the ROE 130 is defined by or otherwise has a shape of a cone. In various embodiments, the cone may have an area that is defined by a height h and a base radius r. In various embodiments, the base may be in the shape of a circle or an ellipsis having a radius r. However, in some embodiments, the ROE 130 may be in a pyramidal shape such that the base is a square, rectangular or any other quadrilateral shape. Additionally, although ROE 130 is shown by FIGS. 1-4 as having a conical shape, in various embodiments, ROE 130 may have a cylindrical shape or may have any other type of shape. As shown, an apex of the cone originates from a tip 208, but in some embodiments, the apex could originate from any other like portion of the wand 125. The area of the cone may be calculated using known equations or algorithms for calculating the area and/or volume of a cone. However, it should be noted that the height h, the radius r, and/or the shape of the base may be based on a specific game being played, a specific gaming environment, a spell intensity associated with a user of the wand 125, and the like. For example, the height h and/or the radius r of the ROE 130 may be predefined according to one or more game design criteria, and when the spell intensity is determined to be reduced by 50% due to a battery of the wand 125 having a 50% charge capacity, the values of the height h and/or the radius r of the ROE 130 may be reduced by 50% or may be reduced or otherwise adjusted according to some other game-related value/criteria/rules. By way of another example, the height h and/or the radius r of the ROE 130 may be predefined according to one or more game design criteria, and when the spell intensity is determined to be increased by 50% due to an auxiliary device being proximate to the wand 125, the values of the height h and/or the radius r of the ROE 130 may be increased by an amount indicated by an auxiliary device identifier and/or may be increased or otherwise adjusted according to some other game-related value/criteria/rules. Furthermore, in some embodiments, a shape of the ROE 130 may change due to an auxiliary device being proximate to the wand 125. For example, a wand 125 may be associated with a conical shaped ROE 130 according to one or more game design criteria, and when the ROE 130 may change to a pyramidal shape due to an auxiliary device being proximate to the wand 125, wherein the shape of the ROE 130 may be indicated by an auxiliary device identifier and/or indicated according to some other game-related value/criteria/rules. Moreover, in some embodiments, the size and/or shape of the ROE 130 may be altered or adjusted according to a handicap value associated with a user of the wand 125. In such embodiments, adjusting a size or shape of the ROE 130 may include increasing the size and/or the shape of the ROE 130 or decreasing the size and/or the shape of the ROE 130. The handicap value and/or ROE 130 shape adjustments may be based on one or more game-related value/criteria/rules. In quest scenarios, the handicap value may be used to alter the ROE 130 of one or more of the quest participants. For example, a handicap value associated with a user of wand 125A may increase the size and/or shape of ROE 130A according to the handicap value and/or may decrease a size and/or shape of ROE 130B, which is associated with the other wand 125B. In some embodiments, the size and/or shape of ROE 130A may stay the same while the size and/or shape of ROE 130B is decreased.

In various embodiments, the ROE 130 may be used to indicate an amount of game play properties/points to be used and/or applied against other users, etc. In such embodiments, the ROE 130 may define a desired distance and/or angle relative to the wand 125 in which to apply the defined spell output. In various embodiments, different spell intensities may be defined to correspond with various spatial coordinates, such as Cartesian coordinates, geographic coordinates (e.g., latitude and longitude), GPS coordinates, and/or other like points within the ROE 130. For example, the ROE 130 of wand 125 for a spell may be defined as a cone having a height of 5 feet, wherein a maximum spell intensity may be applied to devices 101 and/or other wands 125 that are within 3 feet from the wand 125. In such embodiments, a reduced or attenuated spell intensity may be defined for devices 101 and/or other wands 125 that are greater than 3 feet from the wand 125. In some embodiments, an attenuation factor or attenuation algorithm may be used to calculate how much the spell output intensity is to be reduced or attenuated for devices 101 and/or other wands 125 that are greater than defined distance from the wand 125 (e.g., greater than 3 feet in the example).

According to various embodiments, computing devices 105 may be a physical hardware computing device capable of communicating with a one or more other hardware computing devices (e.g., wand 125, devices 101, accounting server 120, one or more associated databases (not shown), and the like) via a communications interface, such that computing device 105 is able to receive one or more signals and/or data streams from the other devices in the gaming environment 100. Computing devices 105 may include a transmitter/receiver (or alternatively, a transceiver), one or more memory devices, one or more processors, one or more sensors, and/or other like components. Computing devices 105 may be designed to sequentially and automatically carry out a sequence of arithmetic or logical operations; equipped to record/store digital data on a machine readable medium; and transmit and receive digital data via one or more network devices. Computing devices 105 may include devices such as desktop computers, laptop computers, mobile computing devices (e.g., smart phones, tablet personal computers, wearable computing devices, a handheld messaging device, a personal data assistant, an electronic book reader, and the like), a home or local server, and/or any other physical or logical device capable of recording, storing, and/or transferring digital data via a connection to a network device.

It should be noted that for the purposes set forth herein, when the computing device 105, such as the computing device 105B, is referred to as "another computing device", "the other computing device", etc., such other computing device 105 may include a robot, a robotic vehicle, a UAV, a drone, and/or other like devices (collectively referred to as "a drone" or "drones"). Additionally, when the wand 125, such as the wand 125B, is referred to as "another wand", "the other wand", etc., such other wand 125 may also be included with or otherwise be associated with such drones. Such drones may comprise one or more electro-mechanical components that may allow the drone to change a position and/or orientation of the drone. These electro-mechanical components may include one or more motors, wheels, thrusters, propellers, claws, clamps, hooks, and/or any other like propulsion devices. The drone may be able to change its position and/or orientation based on a desired (or alternatively "predetermined") trajectory. In some embodiments, such a trajectory may be determined or otherwise defined by a program code stored on a computer-readable medium of the drone (or transmitted to the drone from a network element such as the accounting server 120, a wand 125, or a computing device 105), which when executed by a processor of the drone, determines where and how the drone is to reach various positions and/or orientations, and initiates movement of the one or more electro-mechanical components. In some embodiments, the drone may include an autonomous position and/or orientation changing mechanism, which allows the drone to change its position and/or orientation based on knowledge of its current position and/or current orientation. Knowledge of the current position and/or current orientation may be calculated by one or more sensors, such motor encoders, image sensors, accelerometers, gyroscopes, gravimeters, GPS circuitry, and/or the like. Knowledge of the current position and/or current orientation may also be transmitted to the drone by another device (e.g., an associated computing device 105, the accounting server 120, a wand 125, beacon 110, etc.), where the other device may determine the current position and/or current orientation according to the various methods for determining position and orientation disclosed herein.

In various embodiments, computing devices 105 may include a network interface (e.g., network interface 430 described with regard to FIG. 8) configured to connect computing device 105 to one or more other devices wirelessly via a transmitter and a receiver (or optionally a transceiver) and/or via a wired connection using a communications port. Computing devices 105 may be configured to send/receive data to/from one or more other hardware computing devices, and/or network devices, such as a router, switch, hub, or other like network devices, via the network interface using the wired connection and/or the wireless connection. Computing devices 105 may be configured to obtain a data (in the form of a data stream, data packets, and/or other like messages) from a network element (e.g., accounting server 120) via the network interface, and utilize the data according to the various example embodiments described herein. Computing devices 105 may communicate over the network 115 in accordance with one or more wireless communications protocols and/or one or more cellular phone communications protocols. For example, computing device 105 may be configured to operate in accordance with the GSM, EDGE, WCDMA, CDMA, TDMA, Bluetooth, Wi-Fi such as IEEE 802.11a, IEEE 802.11b, IEEE 802.11g, IEEE 802.11 ac, and/or IEEE 802.11n, VoIP, Wi-MAX, LTE, and/or any other "wireless" communication protocols, including RF-based, optical, and so forth.

Computing devices 105 may include or be otherwise associated with various input and output/feedback devices to enable user interaction with the computing device 105 and/or peripheral components or devices associated with the computing device 105 by way of one or more user interfaces or peripheral component interfaces. The user interfaces may include, but are not limited to a physical keyboard or keypad, a touchpad or touchscreen, display device(s), speakers, microphones, image sensors, haptic feedback devices and/or one or more actuators, and the like. Peripheral component interfaces may include, but are not limited to, a non-volatile memory port, a universal serial bus (USB) port, an audio jack, and a power supply interface. Furthermore, the computing device may to enable user interaction with peripheral or other like external devices utilizing one or more wireless communications protocols, such as Bluetooth protocols, WiFi protocols, IrDA protocols, ANT and/or ANT+ protocols, 3GPP LTE ProSe protocols, etc. Using the one or more wireless communications protocols, the computing devices 105 may connect with, or otherwise utilize devices 101. The devices 101 may be output/feedback devices, such as display devices (e.g., TVs or "smart TVs", a computing device and associated displays, augmented reality head-mounted (or helmet-mounted) devices, projectors, etc.) and/or audio devices (e.g., Bluetooth earpiece or headphones, speakers, etc.), IoT devices (e.g., automated sensors, motors, etc.), and/or auxiliary devices (which are described in detail elsewhere). Furthermore, the computing devices 105 may connect or otherwise couple with the wand 125 by way of the one or more wireless communications protocols. In some embodiments, the computing device 105 may be associated with an IR target, which may receive an IR signal from a wand 125. In some embodiments, the associated IR target may be attached to the computing device 105, while in other embodiments the IR target may not be connected to the computing device 105. In some embodiments, the IR target may be a device 101 that is communicatively coupled to the computing device 105 and/or the wand 125, or the IR target may be affixed to a wall or other like stationary object. The IR target may include an IR camera and/or an IR emitting device that operate in a same or similar fashion as discussed previously with regard to the wand 125. In response to receiving an IR signal or beam, the computing device 105 may carry out a sequence of arithmetic or logical operations; activate one or more associated output devices; provide one or more first instructions to the wand 125 for activation of one or more first devices and/or provide one or more second instructions to one or more second devices according to the various example embodiments disclosed herein; activate one or more electro-mechanical components; project an image and/ or animation; and/or perform any other function as described herein, such as communicating quest initiation messages, team forming messages, and/or spell messages as described herein. It should be noted that the aforementioned messages are not limited to being transmitted/received via IR beams, and in various embodiments, such messages may be communicated via other signals, such as Bluetooth or BLE signals, WiFi signals, and/or any other wireless signals discussed herein. Such messages may be communicated directly between computing devices 105 and/or wands 125, or such messages may be communicated by way of an intermediary device, such as via beacon 110, a home or local server, a WiFi router, or other like network device. Moreover, each of the aforementioned messages may be communicated by way of a different wireless signal, for example, quest initiation messages and/or team forming messages may be communicated via a WiFi signal, and spell messages may be communicated via one or more IR beams, or vice versa.

Computing device 105 may be equipped with location (or alternatively "geolocation"), positioning, and/or navigation circuitry, such as a GPS receiver, as well as software to convert received GPS signals into a location and/or position (within some margin of error). In various embodiments, alternate positioning systems may be employed, such as wireless network signal-strength-based indoor positioning system (IPS), hybrid systems combining global and local positioning systems, and/or other like positioning and/or location detection systems. However, in various embodiments, geolocation and/or positioning information may come from other sources including an IP address, Wi-Fi and/or Bluetooth MAC address, radio-frequency identification (RFID), WiFi connection location, GSM/CDMA cell IDs, and the like. Computing devices 105 may include one or more sensors, such as an accelerometer, gyroscope, gravimeter, magnetometer, and/or another like devices that are configured to measure and/or detect a motion, an acceleration, and/or an orientation of the computing devices 105. In such embodiments, the computing devices 105 may be configured to determine a magnitude and direction of an acceleration and/or motion of the computing device 105, and convert the acceleration and/or motion of the computing device 105 into position and/or orientation information. The positions and/or orientations (or changes in the positions and/or orientations) may be used to determine a spell type, spell direction, spell intensity, etc. according to the various example embodiments described herein. For example, the computing device 105 may use its own position and/or orientation data, position and/or orientation data of one or more devices 101 that the computing device 105 has determined, in combination with any position and/or orientation data included with a spell sequence in order to determine a spell type, spell direction, spell intensity, etc.

Computing devices 105 may be configured to run, execute, or otherwise operate one or more applications. The applications may include native applications, web applications, and hybrid applications. The native applications may be used for operating the computing device 105, such as using a camera or other like sensor of the computing device 105, GPS functionality of the computing device 105, an accelerometer of the computing device 105, cellular phone functionality of the computing device 105, and other like functions of the computing device 105. Native applications may be platform or operating system (OS) specific. Native applications may be developed for a specific platform using platform-specific development tools, programming languages, and the like. Such platform-specific development tools and/or programming languages may be provided by a platform vendor. Native applications may be pre-installed on computing devices 105 during manufacturing, or provided to the computing device 105 by an application server (e.g., accounting server 120) via a network (e.g. network 115). Web applications are applications that load into a web browser of the computing device 105 in response to requesting the web application from a service provider (e.g., a web server that may be associated with accounting server 120). The web applications may be websites that are designed or customized to run on a mobile device by taking into account various mobile device parameters, such as resource availability, display size, touchscreen input, and the like. In this way, web applications may provide an experience that is similar to a native application within a web browser. Web applications may be any server-side application that is developed with any server-side development tools and/or programming languages, such as PHP, Node.js, ASP.NET, and/or any other like technology that renders HTML. Hybrid applications may be a hybrid between native applications and web applications. Hybrid applications may be a stand-alone, skeletons, or other like application containers that may load a website within the application container. Hybrid applications may be written using website development tools and/or programming languages, such as HTML5, CSS, JavaScript, and the like. Hybrid applications use browser engine of the computing device 105, without using a web browser of the computing device 105, to render a website's services locally. Hybrid applications may also access mobile device capabilities that are not accessible in web applications, such as the accelerometer, camera, local storage, and the like. The various example embodiments for defining, initiating and commencing a quest performed by the wand 125 and/or the computing device 105 as described herein, such as the processes 1400, 1500, and 1700-1800, may be implemented as a native application, a web application, and/or a hybrid application. Such an application may be included in the wand 125 and/or the computing device 105 according to various example embodiments.

Additionally, in some embodiments, the applications for initiating and commencing a wand quest as discussed herein may also interact with one or more other applications via an application programming interface (API). An API may be a defined as a set of HTTP request messages and response messages that allow applications to obtain third-party services. Such request messages and response messages are usually in an XML and/or JavaScript Object Notation (JSON) format. In most embodiments, the applications for initiating and commencing a quest as discussed herein may use an API to access third-party services, such as social networking service, a blog, and/or any other like communication platform. By utilizing an API for such services, a user of the wand 125 may broadcast, to their social network contacts, one or more spells which they have cast using the wand 125, one or more second devices accessed using the wand 125, a time at which the one or more second devices are accessed, quest invitations and/or team forming messages, game-play or geocaching check-in messages for a game in which they are participating, and/or other game-related information. In some embodiments, the user of a wand 125 may be able to customize which game-related information to broadcast. The third-party service may be capable of receiving, from the computing device 105, positioning information (e.g., a geolocation of the computing device 105 and/or the wand 125) and spell-related data and may broadcast the positioning information and spell-related data on an associated communication platform. The third-party service may be capable of managing various settings associated with a user of the wand 125 and/or computing device 105, and may post, reformat or adapt the positioning information and spell-related data, as necessary, to the communication platform.

According to various embodiments, devices 101 may be any object, device, sensor, or "thing" that is embedded with hardware and/or software components that enable the object, device, sensor, or "thing" to communicate with another device (e.g., computing devices 105, accounting server 120, another device 101, etc.) over a network (e.g., network 115). The devices 101 may be the same or similar to the "second devices" as described herein, and the devices 101 may also be referred to as "second devices 101". In some embodiments, the device 101 may communicate with other devices with little or no user or human intervention, such as when the device 101 is an IoT device. In this regard, devices 101 may include a transmitter/receiver (or alternatively, a transceiver), one or more memory devices, and/or one or more processors. Furthermore, devices 101 may be embedded with or otherwise include a transmitter or other like device that broadcasts an identification signal. In various embodiments, the identification signal may be a radio-based signal, such as a Wi-Fi signal, BLE signal, an active RFID signal, an infrared signal, and the like. According to various embodiments, the identification signal may comprise one or more data packets or data frames, where the data packets or data frames include a unique identifier associated with the device 101 transmitting the identification signal. In various embodiments, the unique identifier (or alternatively, "identifier" or "identification information") may include a universally unique identifier (UUID), an electronic product code (EPC), a media access control address (MAC address), an Internet Protocol (IP) address, an Apache QPID address, and/or any other like identification information. It should be noted that one or more of the devices 101 may be manufacturer, developed, and/or deployed in the gaming environment 100 by different device manufacturers.

In various embodiments, devices 101 may be output/feedback devices, such as display devices, audio devices, IoT devices, and the like. Devices 101 that are IoT devices may include any type of sensor, meter, or other like device that can capture and/or record data associated with an event. For instance, in various embodiments, IoT devices may be biotic sensors and/or devices, such as monitoring implants, biosensors, biochips, and the like. Additionally, IoT devices may be abiotic sensors and/or devices, such as autonomous sensors and/or meters, Machine Type Communications (MTC) devices, machine to machine (M2M) devices, and the like. An event may be any occurrence of an action, such as a temperature change, a change in data such as reaching a data threshold, a game-play point/property/inventory level/amount change, a heart rate, a state/position/orientation change of a device, and the like. In various embodiments, an event may be detected by one or more IoT devices based on sensor outputs, timer values, user actions, messages from an a computing device, and the like. Once data associated with an event is captured and recorded by the IoT device or other like device 101, the captured data may be relayed through the network 115 and reported to a service provider (e.g., an operator of the accounting server 120), computing device 105, and/or another one of the devices 101. The service provider and/or game operator (e.g., the accounting server 120), a user of the computing device 105A and/or the wand 125A, a user of the computing device 105B and/or the wand 125B, and/or another device 101 may take an appropriate action based on a notification of the event (e.g., calculate a score with respect to a game or quest, and the like, perform a spell, activate/deactivate a device and/or component of a device, etc.). In various embodiments, devices 101 may connect with or otherwise communicate with the computing device 105 and/or accounting server 120 via a direct wireless connection and/or via network 115. In such embodiments, the data associated with an event may be reported to the computing device 105 and/or accounting server 120 for the purposes of spell determination and/or immersive game play as described herein. It should be noted that the devices 101 may be configured to report data/events on a period or cyclical basis, and/or based on a desired event that is captured and recorded by a device 101.

In various embodiments, the computing device 105 and/or wand 125 may receive from one or more devices 101 data associated with a captured event and the computing device 105 and/or wand 125 may physically control the devices 101 by transmitting instructions or other like control signals to the device 101. The instructions and/or control signals may instruct and/or control the devices 101 to execute desired program code when one or more of the devices 101 include one or more other computing devices; access one or more services associated with one or more IoT devices when one or more of the devices 101 include one or more IoT devices; output a desired audio output when one or more of the devices 101 include one or more audio devices; output a desired video output when one or more of the devices 101 include one or more display devices; and/or record a spell output when one or more of the devices 101 include one or more other wands 125 and/or one or more other computing devices 105.

In various embodiments, such as when the second devices 101 are IoT devices, the second devices 101 may include one or more electro-mechanical components which allow the second device 101 to change its state, position, and/or orientation. These electro-mechanical components may include one or more motors, step motors, actuators, wheels, thrusters, propellers, claws, clamps, hooks, and/or other like electro-mechanical components. In such embodiments, the second devices 101 may be configured to change its state, position, and/or orientation based on one or more captured events and/or instructions or control signals received from the computing device 105 and/or wand 125. For example, in embodiments where a second device 101 is an actuator that opens/closes a window, the actuator may change its state (e.g., fully open, fully closed, or partially open/closed) based on instructions from the computing device 105, wand 125, and/or accounting server 120. In such embodiments, the instructions to change the state of the actuator may be issued from the computing device 105, wand 125, and/or accounting server 120 based on whether or not a spell was determined to have been performed correctly or not. In some embodiments, proximity of the wand 125 to an associated device 101 may be required in order for the spell to have an effect. For example, an "open door" spell may have no effect unless the wand 125 is within desired distance from the door to be opened. It should be noted that a performance of one or more actions (e.g., the collection/reporting of data, altering a state, position, and/or orientation, etc.) by one or more devices 101 may be referred to as a "service". The devices 101 may be grouped according to functions that they may perform, where one or more of the functions are associated with one or more services. Furthermore, in various embodiments, the devices 101 may also communicate data associated with one or more events to the accounting server 120 via a network connection, wherein the accounting server 120 may track the progress of a game or otherwise adjust a user's profile according to spell outputs performed by the devices 101.

In various embodiments, one or more of the second devices 101 may be "auxiliary devices". The auxiliary devices may include the same or similar components as the IoT devices discussed herein (e.g., transmitter/receiver, processor(s), memory device(s), etc.). However, in various embodiments the auxiliary devices serve to alter, adjust, or otherwise modify a spell and/or spell intensity. For example, in some embodiments, the auxiliary device may amplify, diminish, or delay an effect of one or more spell outputs. Additionally, the auxiliary device may alter a spell output to include one or more additional first instructions and/or second instructions, such as obtaining and playing an audio output when a spell for illuminating an LED is performed. It should be noted that in some embodiments, an auxiliary device may amplify a spell intensity of a first spell while diminishing the effect of a second spell. In various embodiments, a spell and/or spell intensity may be modified or adjusted when an auxiliary device is within a desired region surrounding the wand 125, or when the auxiliary device is otherwise proximate to the wand 125. In this regard, in various embodiments, the auxiliary devices may be in the form of a wearable device, such as a bracelet, ring, medallion, hat, glove, and the like, while in some embodiments, the auxiliary devices may have a form that allows the auxiliary device to attach itself to a housing 205 of the wand 125. However, the form and/or shape of the auxiliary devices may be based on one or more design choices.

In various embodiments, the proximity of an auxiliary device to the wand 125 may be based on position information contained in an auxiliary device identifier or other like signal that is broadcast by the auxiliary device, which may be obtained by the computing device 105 and/or the wand 125 by scanning of a region surrounding the wand 125 for an auxiliary device signal that is broadcast by the auxiliary device. The auxiliary device identifier may be obtained by the computing device 105 and/or the wand 125, which may then determine the position of the auxiliary device relative to the wand 125 in a similar manner as discussed herein, such as by using IPS and/or triangulation methods.

The auxiliary device identifier may also indicate a desired alteration for a spell output and/or a desired alteration or adjustment to a spell output intensity. For example, the auxiliary device identifier may indicate an amount to increase/decrease area of the ROE 130, such as by adjusting the height h and/or the radius r, etc. By way of another example, the auxiliary device identifier may indicate that a spell output may include additional audio and/or video outputs to be played/displayed with an audio and/or video output associated with a given spell and/or a location from which the additional audio/video outputs may be obtained, such as a webpage address, a memory location, and/or other like location information. By way of yet another example, the auxiliary device identifier may indicate that a spell output may yield additional game related points/property within a game, or may decrease another player's points/property by a specified amount when a spell is performed in the presence of another user (see e.g., FIG. 3). In some embodiments, the desired alteration to the spell output or spell output intensity may be based on a number of times that a spell has been cast using the auxiliary device, and/or based on any other like indication indicating a number of times that the auxiliary device has been used. The number of times that the auxiliary device has been used may be factored into a game or quest, wherein a game operator (e.g., an operator of accounting server 120) or other like entity may limit the number of times that an auxiliary device may be used and/or may diminish the effect that an auxiliary device has based on the amount of usage of the auxiliary device. To this end, in various embodiments, the auxiliary device may include a counter, which indicates a number of uses or a number of spell alterations, and the auxiliary device may provide the counter value in the auxiliary device identifier. In such embodiments, the auxiliary device may increment or decrement the counter each time a spell is cast (i.e., after execution of a spell output). The computing device 105 and/or the wand 125 may then determine whether the spell output may be altered using the auxiliary device based on the auxiliary device counter value, such that, when the auxiliary device counter value has reached an alteration threshold, the alteration to the spell output may be deemed to have expired. In some embodiments, the auxiliary device counter may be loaded with a (or alternatively "predefined") value, and the counter may be decremented each time a spell is cast with the auxiliary device. In such embodiments, the alteration threshold may be zero. In other embodiments, the auxiliary device counter may be set at zero and incremented each time a spell is cast with the auxiliary device. In such embodiments, the alteration threshold may be a desired (or alternatively "predefined") integer that is greater than zero, and the alteration may be diminished or otherwise adjusted based on the integer value. For example, the counter value may be set at 10, the spell output intensity may be increased by 100% when the auxiliary device is used a first time (counter vale of 10), and the spell output intensity may be increased by 90% when the auxiliary device is used a second time (counter vale of 9), and so forth. Moreover, in some embodiments, a determined distance or proximity of the auxiliary device may be used to alter the spell output and/or spell output intensity. For example, in some embodiments, an auxiliary device may increase a size and/or shape of the ROE 130 by a first factor when the auxiliary device is attached to the wand 125, and the auxiliary device may increase a size and/or shape of the ROE 130 by a second factor when the auxiliary device is at a specified distance from the wand 125, wherein the first factor is greater than the second factor.

It should be noted that in various embodiments, the auxiliary devices may not include the auxiliary counter. In such embodiments, the accounting server 120, the computing device 105, and/or the wand 125 may include auxiliary device counters, or similar functionality, to track the usage of corresponding auxiliary devices. In such embodiments, the accounting server 120, the computing device 105, and/or the wand 125 may obtain the auxiliary device identifier via a direct wireless connection or a network connection, and may adjust a user profile and/or increment/decrement an auxiliary device counter accordingly.

In some embodiments, an auxiliary device or other like devices 101 may include an IR target including an IR emitting device and/or IR camera that may operate in a same or similar fashion as discussed previously with regard to the wand 125. In such embodiments, the auxiliary device or device 101 may detect an IR beam transmitted from the wand 125 and/or the computing device 105, and in response to detection of such a beam, the auxiliary device and/or devices 101 may perform various functions, such as adjust the auxiliary counter values (e.g., increase or decrease the auxiliary counter values), etc., relay or otherwise communicate various messages as described herein, and the like. It should be noted that the performance of the aforementioned functions are not limited to transmitted/received via IR beams, and in various embodiments, such functions may be performed based on the reception/detection of other signals, such as BLE signals, WiFi signals, and/or any other wireless signals discussed herein. Such messages may be communicated directly between an auxiliary device 101 or other device 101 and an associated computing device 105 and/or wand 125, or such messages may be communicated by way of an intermediary device, such as via beacon 110, a home or local server, a WiFi router, or other like network device.

According to various embodiments, beacon 110 may be a network element or a transmitting/receiving device configured to provide communication services and positioning services to various devices (e.g., devices 101, computing device 105, and/or wand 125) operating within a gaming environment 100 or a communications network (e.g., an enterprise private network, virtual private network, local area network (LAN), a virtual LAN (VLAN), and/or any other like computer network). The beacon 110 may be a wired or wireless access point, a router, a switch, a hub, and/or any other like network device that allows computing devices to connect to a network. In some embodiments, the beacon 110 may include one or more processors, a network interface, one or more transmitters/receivers connected to one or more antennas, and computer readable media. The one or more transmitters/receivers may be configured to transmit/receive data signals to/from one or more devices 101 and/or computing devices 105. The beacon 110 may process and/or route data packets according to one or more communications protocols, such as Ethernet, Point-to-Point Protocol (PPP), High Level Data Link Control (HDLC), Internet Protocol version 4 (IPv4), Internet Protocol version 6 (IPv6), and/or any other like protocols. The beacon 110 may employ one or more network interfaces in order to allow devices 101 and/or computing devices 105 to connect to network 110, such as Ethernet, Fibre Channel, G.hn or ITU-T, 802.11 or Wi-Fi, Bluetooth, and/or any other like network connection interfaces. In various embodiments, beacon 110 may be a low-powered transmitter/receiver that may be used to notify various devices of their position relative to one or more other devices. In such embodiments, the beacon 110 may utilize BLE proximity sensing methods to transmit an identifier to devices within a vicinity of the beacon 110.

In various embodiments, the beacon 110 may provide the wand 125, computing devices 105, and/or devices 101 with a position of the beacon 110 such that the wand 125, computing devices 105, and/or devices 101 may determine their own position relative to one or more other devices by way of triangulation. In such embodiments, an exact geolocation or position may not be necessary for the performance of a spell output as long as the various devices in the gaming environment 100 may determine their own position relative to one or more other devices in the gaming environment 100. One method of triangulation may include the computing device 105A performing a received signal strength indication (RSSI) calculation of one or more signals generated by one or more other devices (e.g., the computing device 105B and/or other computing devices 105, one or more devices 101, etc.) and a RSSI calculation of one or more signals generated by the beacon 110. Another method of triangulation may include the computing device 105A and/or the wand 125A obtaining a RSSI calculation performed by computing device 105B and/or wand 125B of one or more signals generated by another device and/or a RSSI calculation of one or more signals generated by the beacon 110, which may then be shared with the computing device 105A. Another method of triangulation may include the beacon 110 performing a RSSI calculation of one or more signals generated by multiple devices in the gaming environment 100, which may then be shared with the computing devices 105 and/or the wands 125 in the gaming environment 100. The aforementioned RSSI calculations may be performed by the beacon 110, the wands 125, and/or the computing devices 105 according to know methods. Additionally, instead of, or in addition to using the RSSI of the signals generated by the various devices in the gaming environment 100, example embodiments may also utilize other information associated with the one or more signals, such as a path loss measurement, packet delay time, a signal to noise ratio, a measure of throughput, a jitter, latency, a round trip time (RTT), a number of interrupts, an out-of-order delivery of data packets, and/or other like parameters. Furthermore, any of the aforementioned triangulation methods may be combined to determine a device's position relative to one or more other devices in the gaming environment 100. As such, in various embodiments, more position and/or orientation information may become available as a number of devices in a gaming environment 100 increases. In some embodiments, only the RSSI of a proximate device is used instead of one or more of the aforementioned triangulation methods, such as by defining that a signal strength of a second device 101 must be greater than a threshold to indicate that the computing device 105 and/or the wand 125 is within some desired distance from the second device 101. Moreover, directional signal reception or/and transmission of one or more directional antennas may be also used to determine orientation of the various devices in gaming environment 100. As discussed previously, one or more gestures may be performed to obtain one or more spell outputs. In some embodiments, one or more gestures may be designed to facilitate the orientation calculation, such as when a user is required to manipulate the wand 125 in a defined manner and/or at a defined position in order to obtain the spell output. For example, a quest or game may be defined such that a player is required to move a wand from side-to-side so in or around a geocaching device wherein the side-to-side motion would place the wand in the middle of a coverage sector of a directional antenna of the geocaching device. In this case, directional antenna of the wand 125 and/or a directional antenna of the geocaching device may estimate an approximate wand orientation relative to the geocaching device.

In some embodiments, voice commands issued by one or more users may be used to determine a position of one or more device. For example, in a gaming environment 100 that has an electronically controlled window, which may be configured to turn opaque or transparent based on applied electrical charge. A "Transparency" spell might be used to make the window transparent, wherein a user pointing the wand 125 at the window and issuing a voice command of "Transparify" or other such utterance. Because the utterance relates to windows, as opposed to door locks, etc., the voice command may provide additional information or another like indication of a region in which a wand 125 is located. In some embodiments, dead reckoning may be used to maintain orientation and/or position of the wand 125 and/or computing device 105. Dead reckoning may include a process of calculating a device's current position by using a previously determined position (or fix), and adjusting that position based on known and/or estimated speeds over elapsed time and a projected movement pattern. Dead reckoning methods may be used to estimate a rough or general region in which one or more devices are location. It should be noted that relatively low accuracy of the orientation and position may be needed, for example, to indicate that dueling wands 125 (as shown in FIG. 3) may each be pointing in each other's direction. Additionally, since the dead reckoning may provide relatively low accuracy, the dead reckoning calculations may be used to complement and/or to periodically adjust the other positioning and/or triangulation methods described herein.

It should also be noted that, in addition to the various position determination methods and/or triangulation methods discussed above, when the gaming environment 100 is an arena or other like defined region or venue, additional mechanisms may be added to the gaming environment 100 for position determination, such as one or more cameras or other like sensors, one or more stationary targets, and/or floor-mounted pressure sensors. The cameras and/or sensors (optical and infra-red) may be used in combination with known vision recognition algorithms, which may determine a relative distance of the user (either the user's body or the computing device 105) to a known position within the field of view. In various embodiments, simplified processing may be achieved using one or more targets, such as UV fluorescent or IR-reflecting "dots". In some embodiments, a relative position may be based on a round trip time (RTT) including a time a signal (e.g., an IR signal) is emitted from a device (e.g., an IR signal generator of the wand 125 and/or computing device 105), reflected off a target, and captured or detected by the same or another device (e.g., an IR capture device or camera of the wand 125 and/or computing device 105). In such embodiments, the RTT may be used to determine a distance between a wand 125 and a spell output target device (e.g., a second device 101, another wand 125, etc.). The one or more targets may be stationary landmarks, or wands 125, computing device 105, and/or the user may include easily identifiable visual or non-visible markers. In some embodiments, Real-Sense Technology® developed by Intel® may be employed to further enhance position and/or orientation determination.

According to various embodiments, network 115 may be any network that allows computers to exchange data. Network 115 may include one or more network elements (not shown) capable of physically or logically connecting computers. The network 115 may include any appropriate network, including an intranet, the Internet, a cellular network, a local area network (LAN), a personal network or any other such network or combination thereof. Components used for such a system can depend at least in part upon the type of network and/or environment selected. Protocols and components for communicating via such a network are well known and will not be discussed herein in detail. Communication over the network 115 may be enabled by wired or wireless connections, and combinations thereof.

According to various embodiments, accounting server 120 may be one or more hardware computing devices that may include one or more systems and/or applications for providing one or more services. The accounting server 120 may include one or more processors, one or more memory devices and/or computer readable storage medium, and one or more network interfaces. In order to provide the one or more services, the accounting server 120 may be capable of communicating with a one or more other hardware computing devices (e.g., wands 125, devices 101, computing devices 105, one or more associated remote and/or local databases (not shown), and the like) via the communications interface, such that the other hardware computing device(s) is able to receive and provide signals and/or data streams from the other devices in the gaming environment 100. Additionally, accounting server 120 may be a single physical hardware device, or may be physically or logically connected with other network devices, such that the accounting server 120 may reside on one or more physical hardware devices. Moreover, accounting server 120 may be connected to, or otherwise associated with one or more data storage devices (not shown).

The accounting server 120 may be any device capable of receiving and responding to requests from one or more client devices (e.g., computing devices 105, wand 125, and/or devices 101) across a computer network (e.g., network 115) to provide one or more services. In various embodiments, the services may include accounting for, or otherwise operating an immersive gaming experience. In such embodiments, the accounting server 120 may alter or adjust a user profile associated with a user of the wand 125. The user profile may indicate game criteria or parameters associated with the user in connection with a game or quest, or in relation to multiple users playing one or more games or quests. The accounting server 120 may account for or otherwise track game play points/property and/or game play effects, such as virtual property/points tallies (including points, health, damage loss, gold count, power levels, "magical power", etc.), a virtual or physical on/off, open/close, and/or lock/unlock indication, physical dispense amounts, virtual dispense amounts, and/or the like. In some embodiments, the casting of a spell may decrease the casting user's game play points/property by a desired amount of game play points/property and/or may decrease another user's game play points/property by a desired amount of game play points/property. In some embodiments, one or more spells may be defined by a game operator to require a desired amount of game play points/property (e.g., "magical power", points, and/or the like) in order to cast the one or more spells or perform the spell outputs associated with those spells. In various embodiments, the game play properties may be represented as a numerical value that is accounted for by the accounting server 120. The user's magical power value may increase or decrease based on other factors, such has the passage of time, completing quests, proximity of devices 101, etc. Additionally, in some embodiments, a game operator may specify spells that may be used during a game and/or exclude other spells from being used during that game. In various embodiments, the accounting server 120 may track time-based conditions, such as the number of times during a time period that a spell has been performed, restricting a spell performance to a desired number of time or during desired times of a day, etc. In various embodiments, the accounting server 120 may track and/or account for multiplayer conditions, such as determining whether a spell is properly performed, which may require the performance of one or more gestures by one or more other users. For example, a spell may require a first user to perform a first bodily movement and utter a first voice command, followed by a second user performing a second bodily movement and uttering a second voice command. In other embodiments, the user may be required to perform their gestures concurrently.

Furthermore, in various embodiments, the accounting server 120 may also track prerequisite conditions defined by a game. For example, a game operator may define that a user must complete some prerequisite task in order to perform one or more spells and/or obtain one or more spell outputs. In some embodiments, the prerequisite task may include activating one or more second devices 101. In such embodiments, the accounting server 120 may communicate with the one or more second devices 101 to obtain event data recorded by the one or more second devices 101 to determine whether the prerequisite task has been completed by the wand 125 and/or computing device 105. For example, the prerequisite task may indicate that the user must complete some physical exercise or submit information via a web based user interface. Furthermore, the accounting server 120 may account for third party (e.g., parent, commercial entity, etc.) controls, wherein a third party may be required to authorize a spell to be used. In some embodiments, restrictions to spell usage may further modify the various conditions listed above. Additionally, in some embodiments, a spell may be restricted to be performed only on specific wands 125, such as a premium upgraded wand 125, a user's wand 125 that is associated with a service or gaming subscription, and the like. In some cases, a game operator and/or an authorized third party may nullify a spell and/or a spell output, which may result in a loss of points, status, or other game/quest progress.

It should be noted that in various embodiments, one or more spell may require coordination among the multiple users in a gaming environment 100. For example, in a wand duel (as illustrated by FIG. 3), the two computing devices 105A and 105B may be required to coordinate with each other to determine a specific timing and/or order that spells are cast by each user. In some embodiments, the accounting server 120 may provide the spell coordination between the two computing devices 105A and 105B. If the accounting server 120 is not involved with the coordination between users, the accounting server 120 may be responsible for final spell processing and resolution. The spell processing and resolution may include decrementing a user's available power level (virtual and/or physical) and/or a power level amount required for a certain spell. In some embodiments, the computing devices 105 may perform the spell processing and resolution, and may report the results of the spell processing and resolution to the accounting server 120. However, in some embodiments, messages related to spell processing and resolution may be sent directly between the two computing devices 105A and 105B and/or sent indirectly between the two computing devices 105A and 105B via the back-end service (e.g., accounting server 120) and/or via a network connection.

For adjusting the user profile and/or operating a game or quest, the accounting server 120 may also perform or facilitate user setup and play registration, including associating a specific wand 125 with authorized users, initiate and control software and/or firmware updates of the elements or devices within the gaming environment 100, record the results associated with one or more games or quests, provide requested user authentication credentials, allow for recording new spells associated with the wand 125, provide content management, provide user interfaces and/or control elements for setting up new games/quests and/or modifying existing spells and/or games/quests, and (optionally) perform computationally intensive tasks.

As discussed previously, the accounting server 120 may be associated with one or more remote and/or local databases. In some embodiments, the accounting server 120 may be associated with a position information database (or a plurality of databases) that stores a list of venues or boundaries in association with positioning information (e.g., longitude/latitude coordinates, GPS coordinates, customized arena-based location information, and the like), a boundary size (e.g., radius information, boundary area information, and/or boundary volume information for three dimensional boundaries), and/or other like boundary-related information. In some embodiments, the boundary-related information may include an indication as to whether a venue or boundary includes one or more second devices, which may be associated with a cache. Such boundary-related information may be stored in association with one or more predefined quests according to any suitable method of associating such information. According to at least one example embodiment, each venue or boundary may be associated with a customized shape and size to more accurately represent the venue or boundary, for example, a polygon representation by way of a plurality of vertices. Alternatively and/or additionally, the boundaries or venues may be defined by the vertices of some polygon that has previously been manually placed around one or more geolocation coordinates by a user of the wand 125 and/or by other like wand users through performance of various gestures at the geolocation coordinates, using a game creation web application in conjunction with a digital map, and the like. Based on various game-play criteria, the computing device 105 may provide positioning information of the computing device 105 and/or an associated wand 125 to the accounting server 120, which may query the position information database to obtain a corresponding venue or boundary in which the computing device 105 and/or wand 125 is located. The returned venues or boundaries may correspond to the positioning information of the computing device 105 and/or wand 125 according to various degrees of precision. In some embodiments, such venue or boundary information may be provided to the computing device 105 to be published on a third-party communication platform, or the accounting server 120 may provide such information to the third-party communication platform for publication. In some embodiments, such venue or boundary information may be provided to one or more computing devices that are participating in a quest (e.g., quest competitors and the like) in order to inform the wand quest participants that a quest participant is located at a geocache location, accessed a cache within a boundary or venue, and/or the like. Furthermore, in some embodiments, the position information database may store second device information regarding second devices that are deployed at each venue (or within each boundary) in association with the boundary information and/or the positioning information. Such second device information may include a number of second devices deployed at each venue (or within each boundary), a device identifier associated with each second device, a device type of each second device, a service type of one or more services provided by each of the second devices, a manufacturer of each second device, and/or any other suitable information pertaining to the second devices.

In providing one or more game-related and/or non-game-related services, the accounting server 120 may be able to generate content such as text, graphics, audio, and/or video to be transferred to computing device 105, which may be served to the wand 125 and/or the one or more devices 101 by way of a web server (not shown) in the form of HTML, XML, MPEG-DASH, and/or any other appropriate structured language. The handling of all requests and responses, (e.g., requests for item information and the information provided in response) as well as the delivery of content between the computing devices 105 and/or wand 125 and the accounting server 120 may be handled by the web server. The accounting server 120 may include an operating system that may provide executable program instructions for the general administration and operation of accounting server 120, and may include a computer-readable medium storing instructions that, when executed by a processor of the application server 120, may allow the accounting server 120 to perform its intended functions. Suitable implementations for the operating system and general functionality of the servers are known or commercially available, and are readily implemented by persons having ordinary skill in the art, particularly in light of the disclosure herein. Furthermore, it should be understood that the accounting server 120 may not be required and the applications and software components discussed herein may be executed on any appropriate device or host machine.

As shown in FIGS. 1-4, only two computing devices 105A and 105B, two wands 125A and 125B, a single accounting server 120, and four devices 101 are present. However, according to various embodiments, any number of computing devices, any number of second devices, any number of servers, and/or any number of databases (not shown) may be present. Additionally, in some embodiments, accounting server 120 and/or one or more databases may be virtual machines and/or they may be provided as part of a cloud computing service. In various embodiments, accounting server 120 and one or more databases may reside on one physical hardware device, and/or may be otherwise fully integrated with one another. Thus, the depiction of the illustrative gaming environments 100 in FIGS. 1-4 should be taken as being illustrative in nature, and not limited to the scope of the disclosure.

Figure 5:
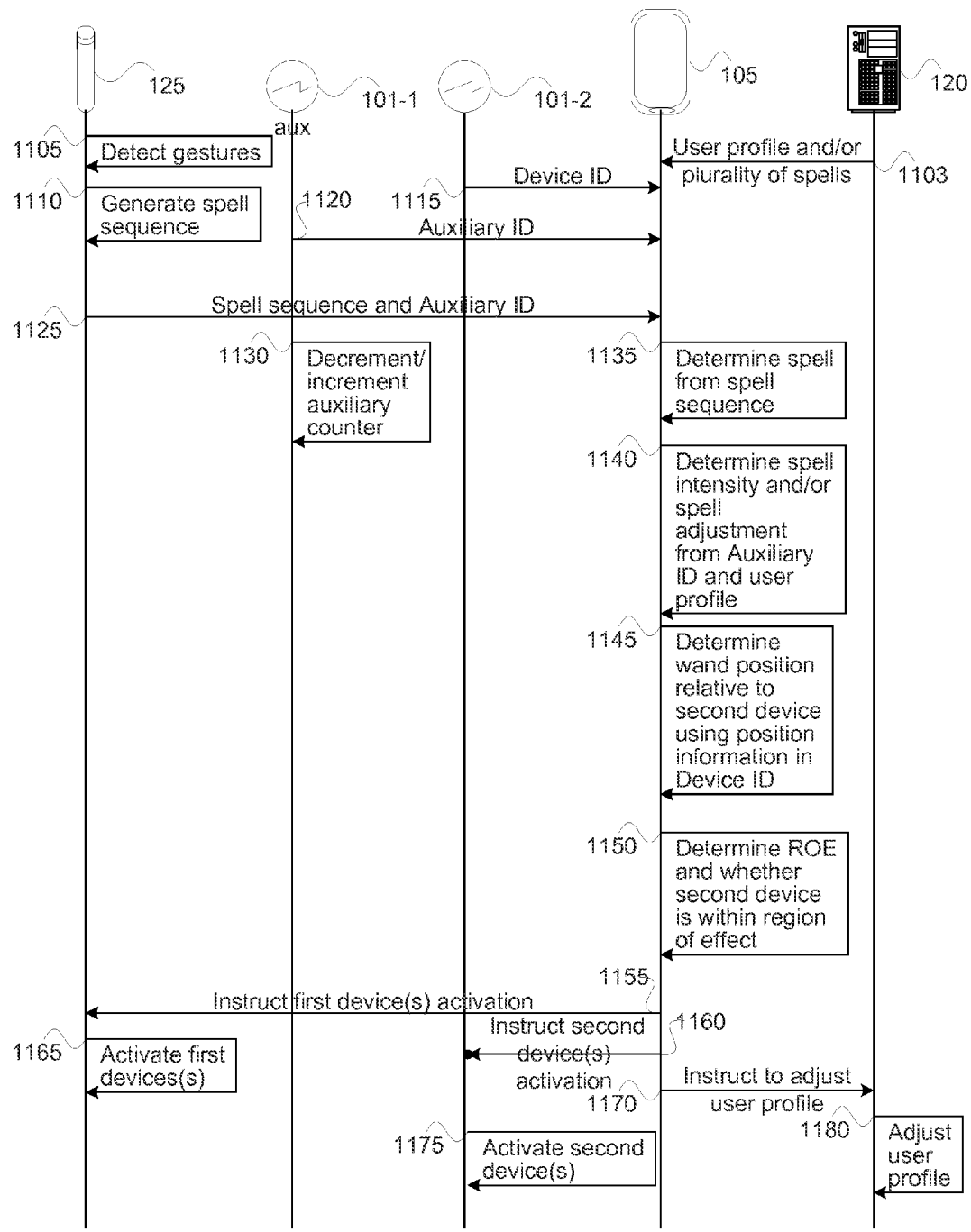
FIG. 5 illustrates a data flow diagram for devices operating in a gaming environment, in accordance with various example embodiments.

FIG. 5 illustrates a data flow diagram for the various devices operating in a gaming environments 100A-C, in accordance with various example embodiments. FIG. 5 illustrates the communications between the wand 125, an auxiliary device 101-1, a second device 101-2, the computing device 105, and the accounting server 120, as described with reference to FIGS. 1-3. It should be noted that in various embodiments the second device 101-2 may be replaced by another wand 125 (e.g., wand 125B).

Referring to FIG. 5, at operation 1103, the computing device 105 may obtain a user profile and/or a plurality of spells from the accounting server 120. The user profile and/or the plurality of spells may be indicative of a game that the user of the wand 125 is playing or desires to play. Each of the plurality of spells may be associated with a desired spell sequence and one or more spell outputs. In various embodiments, the plurality of spells may be stored as an indexed table or other like database structure in a memory device of the computing device 105 or in cloud storage associated with the computing device 105. Such a database may be queried by the computing device 105 according to known methods. Subsequently or simultaneously to operation 1103, at operation 1105 the wand 125 detects one or more gestures being performed by a user of the wand 125.

At operation 1105, the wand 125 may generate a spell sequence based on the detected one or more gestures. In various embodiments, the generated spell sequence may include converting sensor data indicative of the one or more performed gestures into a markup language, a hypertext language, a text file, firmware, middleware, microcode, hardware description languages, or any combination thereof that may be executed or otherwise interpreted by the computing device 105. At operation 1115, the computing device 105 may obtain a device identifier (ID) or other like signal from a device 101 within an ROE 130 of the wand 125. For example, as shown in FIG. 1, which shows an example of a quest gaming environment 100A, at operation 1115, the computing device 105 may obtain a device identifier from device 101-2. By way of another example, as shown in FIG. 2, which shows an example of a tagging gaming environment 100C, at operation 1115, the computing device 105A associated with wand 125A may obtain a device identifier from device 101-2, while the computing device 105B associated with wand 125B may obtain a device identifier from device 101-4. By way of yet another example, as shown in FIG. 3, which shows an example of a wand duel that may occur in either gaming environment 100A or 100B, at operation 1115, the computing device 105A associated with wand 125A may obtain a device identifier from wand 125B, while the computing device 105B associated with wand 125B may obtain a device identifier from wand 125A.

At operation 1120, the computing device 105 may obtain an auxiliary device identifier (ID) from an auxiliary device 101-1. According to various example embodiments, the auxiliary device ID may indicate to increase a size of the ROE 130. At operation 1125, the spell sequence generated at operation 1110 is sent to the computing device 105. It should be noted that in various embodiments, operations 1115, 1120, and 1125 may be performed in an alternate order than shown, and/or operations 1115, 1120, and 1125 may be performed substantially simultaneously. At operation 1130, the auxiliary device 101-1 may decrement/increment its auxiliary device counter. It should be noted that operation 1130 may be performed at any time after the auxiliary device ID is obtained by the computing device 105, such as after a spell output is performed at one of operations 1155, 1160, 1165, and/or 1175.

At operation 1135, the computing device 1135 may determine a spell based on the spell sequence. In various embodiments, the computing device 105 may compare the spell sequence with the defined spell sequences of the plurality of spells to find or otherwise determine a matching spell. Once the computing device 105 determines the matching spell, the computing device 105 may determine the spell output associated with the matching spell.

At operation 1140, the computing device 105 may determine a spell output intensity and/or spell output adjustment based on the auxiliary device ID and/or a user profile. In various embodiments, the spell output intensity may also be based on the information from the user profile and/or one or more game parameters associated with the game that the user is playing. For instance, in various embodiments, the user profile may include a handicap value, which may be used to alter or adjust the spell output intensity. In such embodiments, adjusting the spell output intensity may include increasing or decreasing the spell output intensity. The handicap value and/or spell output intensity adjustments may be based on one or more game-related value/criteria/rules. In quest scenarios, the handicap value may be used to alter the spell output intensity of one or more of the quest participants. For example, a handicap value associated with a user of wand 125A may increase the spell output intensity according to the handicap value and/or may decrease a spell output intensity, which is associated with another wand 125B who may be an opponent during a geocaching game. In some embodiments, the spell output intensity associated with the wand 125A may stay the same while the spell output intensity associated with the other wand 125B is decreased. The handicap value may be based on user demographics (e.g., age, gender, etc.), in-game virtual property/points/etc., and/or any other like criteria.

At operation 1145, the computing device 105 may determine a position of the wand 125 relative to one or more other devices. For example, the computing device 105 may scan the gaming environment 100A/B/C for signals that are broadcast by the devices 101, which may include one or more data packets, wherein the data packets may include an identifier or other like identifying information, such as a device name (e.g., serial number), device type, position information, and/or other like information. The computing device 105 may then extract the position information from the received data packets. In some embodiments, the computing device may obtain positioning information from the beacon 110, or may use one or more of the aforementioned triangulation methods to determine the positions of the devices 101 relative to the wand 125.

At operation 1150, computing device 105 may determine, based on the positions of the one or more devices relative to the wand 125, a size and/or area of the ROE 130 and whether one or more devices 101 are within the ROE 130. For example, as shown in FIGS. 1-2, device 101-2 is within the ROE 130A of wand 125A, which may be based on the auxiliary device 101-1 extending a range of the ROE 130A. By way of another example, as shown in FIG. 3, wand 125B is within the ROE 130A of wand 125A, which may be based on the auxiliary device 101-1 extending a range of the ROE 130A, whereas the wand 125A is not within the ROE 130B of wand 125B, which may be due to wand 125B not being coupled with an auxiliary device.

At operation 1155, the computing device 105 may instruct first device(s) of the wand 125 to activate in accordance with the defined spell output delineated by the matching spell. The instructions to the first devices may be referred to as first instructions. In various embodiments, the first instructions may indicate to activate one or more internal components of the wand 125, such as one or more LEDs, one or more audio devices, one or more haptic feedback devices, one or more heating elements, and the like. The first instructions may include the spell output intensity level determined at operation 1140. The spell output intensity level may indicate a LED brightness level, color scheme, and/or sequence; a haptic feedback vibration strength and/or duration; and audio output volume and/or duration; a desired temperature level and/or heating during, etc. At operation 1165, the wand 125 may activate the first devices according to the first instructions. The first instructions may activate according to the spell output intensity level included in the first instructions.

At operation 1160, the computing device 105 may instruct second device(s) associated with the wand 125 to activate in accordance with the defined spell output delineated by the matching spell. The instructions to the second devices may be referred to as second instructions. In various embodiments, the second instructions may indicate to activate one or more external feedback/output devices. For example, according to the example embodiment shown by FIG. 1, the second instructions may indicate to activate device 101-2, which is within the ROE 130A of wand 125A. By way of another example, according to the example embodiment shown by FIG. 3, the second instructions may indicate to one or more first devices of wand 125B because wand 125B is within the ROE 130A of wand 125A. From the perspective of the wand 125A, the wand 125B is treated as an external device. Thus, wand 125B and the internal components of the wand 125B may be considered to be second device(s) according to the perspective of wand 125A. Furthermore, in some embodiments, the second instructions may be "other second instructions," which may be used to activate external devices communicatively coupled with wand 125 or otherwise associated with the wand 125B. In each of the aforementioned embodiments, the computing device 105A may transmit the second instructions to the computing device 105B via a network connection and/or a direct wireless connection. The computing device 105B may then transmit the second instructions from computing device 105A to the wand 125B for activation. In some embodiments, the computing device 105B may convert the second instructions from computing device 105A into first instructions for wand 125B such that the second instructions from the computing device 105A appear to be first instructions from the computing device 105B. At operation 1175, the device 101-2 in FIG. 1 (or the wand 125B in FIG. 3) may be activated according to the second instructions. The second instructions may include the spell output intensity level determined at operation 1140. The spell output intensity level may indicate a desired audio output volume and/or duration, a desired video output volume, brightness, and/or duration, a state change level or amount, etc. When the second device 101 is another wand, such as the wand 125B shown in FIG. 3, the second instructions and the spell output intensity level may be the same or similar as the first instructions and spell output intensity level discussed above.

At operation 1170, the computing device 105 may transmit an instruction (also referred to as "third instructions") to adjust or otherwise alter the user profile. At operation 1180, the accounting server 1180 may adjust the user's profile in accordance with the third instructions. In some embodiments, the computing device 105 may update, adjust, and/or alter the user profile, and then transmit the updated user profile to the accounting server 120 to be applied against, or otherwise stored in association with, a game or quest.

It should be noted that according to various embodiments, the operations described above with respect to computing device 105 (e.g., spell determination, spell output intensity determination, position determination, etc.) may be performed by the wand 125, which is shown by the example embodiment of FIG. 1B and discussed in detail with regard to FIG. 9.

FIG. 6 illustrates the components of a wand 125, in accordance with various example embodiments. As shown, the wand 125 includes a wand module 200, a housing 205, and input device 210, and first device 215.

According to various embodiments, the wand module 200 may include the various modules and circuitry to perform various functions according to the example embodiments described herein (see the discussion with regard to FIGS. 1-5 and 7-9). To this end, the wand module 200 may include a communication module (e.g., communications module 330 as shown in FIGS. 7 and 9), one or more memory devices (e.g., memory 350 as shown in FIGS. 7 and 9), one or more processors (e.g., processor 310 as shown in FIGS. 7 and 9), one or more sensors (e.g., sensors 306 as shown in FIGS. 7 and 9), one or more output/feedback devices (e.g., first devices 215 as shown in FIGS. 2, 7, and 9), and/or other like components (e.g., as shown in FIGS. 7 and 9).

According to various embodiments, the housing 205 may be any device or apparatus that is used to physically contain or otherwise include the wand module 200, one or more components of the wand 125 (e.g., input device 210 and/or first device 215). Housing 205 may be manufactured out of various materials and/or fibers, including metal, plastic, glass, rubber, wood, and/or any other like materials that are natural and/or synthetic. In various embodiments, housing 205 may be formed into various sizes and/or shapes based on one or more game design criteria or other like design choices, such as a game type or style, gaming environment or location, user demographics (e.g., age, gender, etc.), environmental conditions in which the wand 125 may be located (e.g., outside vs. inside), and/or other like criterion.

The housing 205 may be shaped, formed, or otherwise implemented as a wand, a scepter, a staff, a baton, a rod, a pen, a sword, a sabre, a screwdriver, a glove, a ring, a bracelet, stuffed or plush toy, a baseball bat, a lacrosse stick, a gun, and/or any other like device that may impart directionality. As shown, housing 205 also includes tip portion 208. In various embodiments, the one or more sensors included in the wand module 200 may be used to determine the directionality of the wand 125 in order to distinguish the tip portion 208 from the other portions of the housing 205. In this way, a user of the wand 125 may experience that "magic" or a spell output may be applied to a device in which the wand is directed by the user (i.e., when the user points the tip portion 208 at the device 101 or other wand 125).

Furthermore, housing 205 may be formed such that one or more auxiliary devices may attach to the housing. In some embodiments, auxiliary devices may attach to housing 205 using one or more attachment components (not shown). The one or more attachment components may include a magnetic component (i.e., any material, or combinations of materials, that attracts other permanent magnetic materials and/or any ferromagnetic materials), an adhesive component (i.e., any substance applied to a surface of at least two materials that binds them together and resists separation), and the like. In various embodiments, the one or more one or more attachment components may include one or more implements, such as hooks, clamps, fasteners, and the like. Furthermore, in some embodiments, the housing 205 may include one or more openings (not shown) configured to receive one or more protrusions of an auxiliary device, or the housing 205 may include one or more protrusions (not shown) configured to be received by one or more openings of an auxiliary device.

According to various example embodiments, the input device 210 may be any physical device that enables a user of the wand 125 to interact with the wand 125. For example, the input device 210 may by a button, a touchscreen device, a biotic sensor, and the like. In some embodiments, the input device 210 may be a peripheral component interface designed to provide interaction between the computing device 105 and one or more peripheral components. User interfaces may include, but are not limited to a physical keyboard or keypad, a touchpad, a speaker, a microphone, infrared heart rate monitoring device, an eye scanning device, a fingerprint or handprint scanning device, an EEG device, haptic feedback devices including one or more actuators and/or one or more TENS devices, etc. Peripheral component interfaces may include, but are not limited to, a non-volatile memory port, a universal serial bus (USB) port, an audio jack, and a power supply interface. It should be noted that input device 210 may be optional, and in various embodiments, the input device 210 may be omitted from the wand 125.

According to various example embodiments, the first device 215 may be any physical device that provides an output or feedback in response to one or more first instructions issued by the wand module 200. The first device 215 may be used to provide feedback or another like indication as to whether a spell has been properly performed or not (within a certain margin of error). As shown, the first device 215 may be an array of LEDs or other like illumination device(s). Although FIG. 2 shows that the first device 215 is located in the tip portion 208, in some embodiments, other portions of the housing 205 may include glowing/illumination devices to provide visual feedback. Additionally, the first device 215 and/or other like illumination devices in housing 205 (not shown) may provide room-level illumination (e.g., a flashlight mode). Furthermore, in various embodiments, the wand module 200 and/or the housing 205 may include one or more first devices 215, such as one or more audio devices, one or more haptic feedback devices or one or more actuators, one or more heating elements, and the like. In some embodiments, the first devices 215 may include a display device and/or a projector.

FIG. 7 illustrates the components of wand module 200, in accordance with various example embodiments. As shown, wand module 200 may include first devices 215, battery 305, sensors 306, input/output (I/O) interface 307, processor 310, device interface module 315, bus 320, I/O bus 325, communication module 330, and memory 350. In some embodiments, computing devices 105 may include many more components than those shown in FIG. 7. However, it is not necessary that all of these generally conventional components be shown in order to disclose the example embodiments.

Memory 350 may be a hardware device configured to store an operating system 360 and program code for one or more software components, such as (optionally) an operating system (not shown), spell module 300, device interface module 315, and/or (optionally) one or more other applications (not shown). Memory 350 may be a computer readable storage medium that generally includes a random access memory (RAM), read only memory (ROM), a flash memory device, a solid state disk (SSD), a secure digital (SD) card, and/or other like storage media capable of storing and recording data. The program code, modules, and/or software components may also be loaded from a separate computer readable storage medium into memory 350 using a drive mechanism (not shown). Such separate computer readable storage medium may include a memory card, memory stick, removable flash drive, sim card, and/or other like computer readable storage medium (not shown).

During operation, memory 350 may include an (optionally) operating system, spell module 300, device interface module 315, and/or (optionally) one or more other applications (not shown). The operating system may manage computer hardware and software resources and provide common services for computer programs. The operating system may include one or more drivers, such as a first devices drivers, sensor drivers, battery drivers, and/or any other like drivers that provide an interface to hardware devices thereby enabling the spell module 300, the device interface module 315, and/or any other applications to access hardware functions without needing to know the details of the hardware itself. The operating system may be a general purpose operating system or an operating system specifically written for and tailored to the wand module 200. In embodiments where the operating system is not present, the device interface module 315 may provide the interface to the various hardware devices of wand module 200.

Device interface module 315 may be one or more software modules configured to interact with the various hardware components of the wand module 200 (e.g., first devices 215, battery 305, sensors 306, and input/output devices via I/O interface 307, etc.). In various embodiments, the device interface module 315 may obtain data from the one or more hardware components (e.g., sensor data), and provide the data to the spell module 300 and/or other applications (not shown) for processing. In various embodiments, the device interface module 315 may obtain first instructions via the communication module 330, and transmit or otherwise issue the first instructions the first instructions to output devices, such as the first devices 215, one or more first devices 215 communicatively connected via the I/O interface, one or more first devices 215 communicatively connected via the communications module 330.

Processor 310 may be configured to carry out instructions of a computer program by performing the basic arithmetical, logical, and input/output operations of the system. The processor 310 may include a single-core processor, a dual-core processor, a triple-core processor, a quad-core processor, one or more digital signal processors (DSPs), application-specific-integrated-circuits, field programmable gate arrays (FPGAs), and/or the like. The processor 310 may perform a variety of functions for the wand 125 and may process data by executing program code, one or more software modules, firmware, middleware, microcode, hardware description languages, and/or any other like set of instructions stored in the memory 350. The program code may be provided to processor 310 by memory 350 via bus 320, one or more drive mechanisms (not shown), and/or via communication module 330. In order to perform the variety of functions and data processing operations, the program code, modules, and/or software components may be executed by the processor 310. On execution by the processor 310, the processor 310 may cause wand module 200 to perform the various operations and functions delineated by the program code, modules, and/or software components.

For example, in various embodiments, the wand module 200 may include various modules configured to operate (through hardware and/or software) to obtain, from the sensors 306, sensor data that is indicative of one or more gestures performed using the wand 125, and generate or otherwise determine a spell sequence based on the sensor data as described herein. The one or more modules may include the spell module 300 and the device interface module 315. The various modules may be loaded into the memory 350 and executed by the processor 310. Once the various modules are loaded into memory 350 and executed by the processor 310, the processor 310 may be configured to cause wand module 200 to control the sensors 306 to determine or detect various gestures, wand positions and/or wand orientations, and the like; receive or obtain from the device interface module 315, via the sensors 306, the sensor data representative of the gestures; convert the sensor data representative of the one or more gestures into a spell sequence; provide the spell sequence to the communication module 330 to transmit the spell sequence to a computing device 105; and issue first instructions to the first devices 215 based on a spell output received from the computing device 105 via the communication module 330. In various embodiments, converting the sensor data into a spell sequence may include converting the one or more spatial coordinates (or spatial coordinate changes) into a markup language, a hypertext language, a text file, firmware, middleware, microcode, hardware description language, or any combination thereof that may be executed or otherwise interpreted by the processor 410 of the computing device 105 (see e.g., description of FIG. 8) or processor 310 of the wand module 200 (see e.g., description of FIG. 9). While specific modules are described herein, it should be recognized that, in various embodiments, various modules may be combined, separated into separate modules, and/or omitted.

Bus 320 may be configured to enable the communication and data transfer between the processor 310 and memory 350. Bus 320 may comprise a high-speed serial bus, parallel bus, internal universal serial bus (USB), Front-Side-Bus (FSB), and/or other suitable communication technology for transferring data between components within wand module 200 and/or between wand module 200 and other like devices. I/O bus 325 may be configured to enable the communication and data transfer between the components of wand module 200. In various embodiments, the I/O bus 325 may be the same or similar as bus 320, while in some embodiments, I/O bus 325 may comprise a PCI bus, a PCI-Express (PCI-e) bus, a Small Computer System Interface (SCSI) bus, and the like.

Communication module 330 may be a computer hardware component that connects wand module 200 to a computing device 105 via a direct wireless connection and/or via a computer network (e.g., network 115). Communication module 330 may connect with one or more devices via the direct wireless connection by using, for example, Bluetooth and/or BLE protocols, WiFi protocols, IrDA protocols, ANT and/or ANT+ protocols, 3GPP LTE ProSe protocols, and the like. In some embodiments, communication module 330 may connect the wand module 200 with one or more devices (e.g., devices 101 and/or computing device 105) via network 115 in accordance with one or more wireless communications protocols and/or one or more cellular phone communications protocols. In such embodiments, communication module 330 may be configured to operate in accordance with the (GSM, EDGE, WCDMA, CDMA, TDMA, Bluetooth, Wi-Fi such as IEEE 802.11a, IEEE 802.11b, IEEE 802.11g, IEEE 802.11ac, and/or IEEE 802.11n, VoIP, WiMAX, LTE, and/or any other "wireless" communication protocols. Communication module 330 may operate in conjunction with a wireless transmitter/receiver and/or transceiver (not shown) that is configured to operate in accordance with one or more wireless standards described above. The communication module 330 may also include one or more network interfaces, one or more virtual network interfaces configured to operate with spell module 300 and/or other like modules or applications.

First devices 215 may be physical hardware devices configured to provide feedback or another like indication as to whether a spell has been properly performed or not. As shown, the first device 215 may be one or more LEDs or other like illumination device. In various embodiments, the one or more first devices 215 may include one or more audio devices, one or more haptic feedback devices and/or one or more actuators, one or more heating elements, and the like. In some embodiments, the first devices 215 may include a display device and/or a projector.

I/O interface 307 may be a computer hardware component that provides communication between the wand module 200 and one or more other devices. The I/O interface 307 may include one or more user interfaces designed to enable user interaction with the wand module 200 and/or peripheral component interfaces designed to provide interaction between the computing device 105 and one or more peripheral components. User interfaces may include, but are not limited to a physical keyboard or keypad, a touchpad, a speaker, a microphone, infrared heart rate monitoring device, a fingerprint or handprint scanning device, an EEG device, haptic feedback devices including one or more actuators and/or one or more TENS devices, etc. Peripheral component interfaces may include, but are not limited to, a non-volatile memory port, a universal serial bus (USB) port, an audio jack, and a power supply interface. It should be noted that the I/O interface 307 may be an optional element, and thus, in some embodiments the I/O interface 307 may be omitted from the wand module 300.

Sensors 306 may include one or more sensing devices to determine position information (or alternatively "position data"), orientation information (or alternatively "orientation data"), environmental conditions, and/or like information related to the wand module 200. In some embodiments, the sensors 306 may include, but are not limited to, an accelerometer, gyroscope, gravimeter, magnetometer, proximity sensor, ambient light sensor, and a positioning unit, such as GPS circuitry, and the like.

Battery 305 may be a device configured to provide electrical power to the wand module 200 using one or more electrochemical cells including nickel-cadmium (NiCd), nickel-zinc (NiZn), nickel metal hydride (NiMH), and lithium-ion (Li-ion) cells. In some embodiments battery 305 may comprise a supercapacitor device and/or an ultracapacitor device, while in other embodiments, the battery 305 may comprise a fuel cell device. The battery 305 may communicate battery information to the device interface module 315 when queried by the device interface module 315. The battery information may indicate whether the wand module 200 is connected to a power source, whether the connected power sources is wired or wireless, whether the connected power sources is an alternating current charger or a USB charger, a current voltage of the battery, a remaining battery capacity as an integer percentage of total capacity (with or without a fractional part), a battery capacity in microampere-hours, an average battery current in microamperes, an instantaneous battery current in microamperes, a remaining energy in nanowatt-hours, whether the battery is overheated, cold, dead, or has an unspecified failure, and the like. The device interface module 315 may provide the battery information to the spell module 300 and/or the wand communication module 330 to provide the battery information to the computing device 105 to determine the spell output intensity based on the amount of charge indicated by the battery information.

Figure 8:
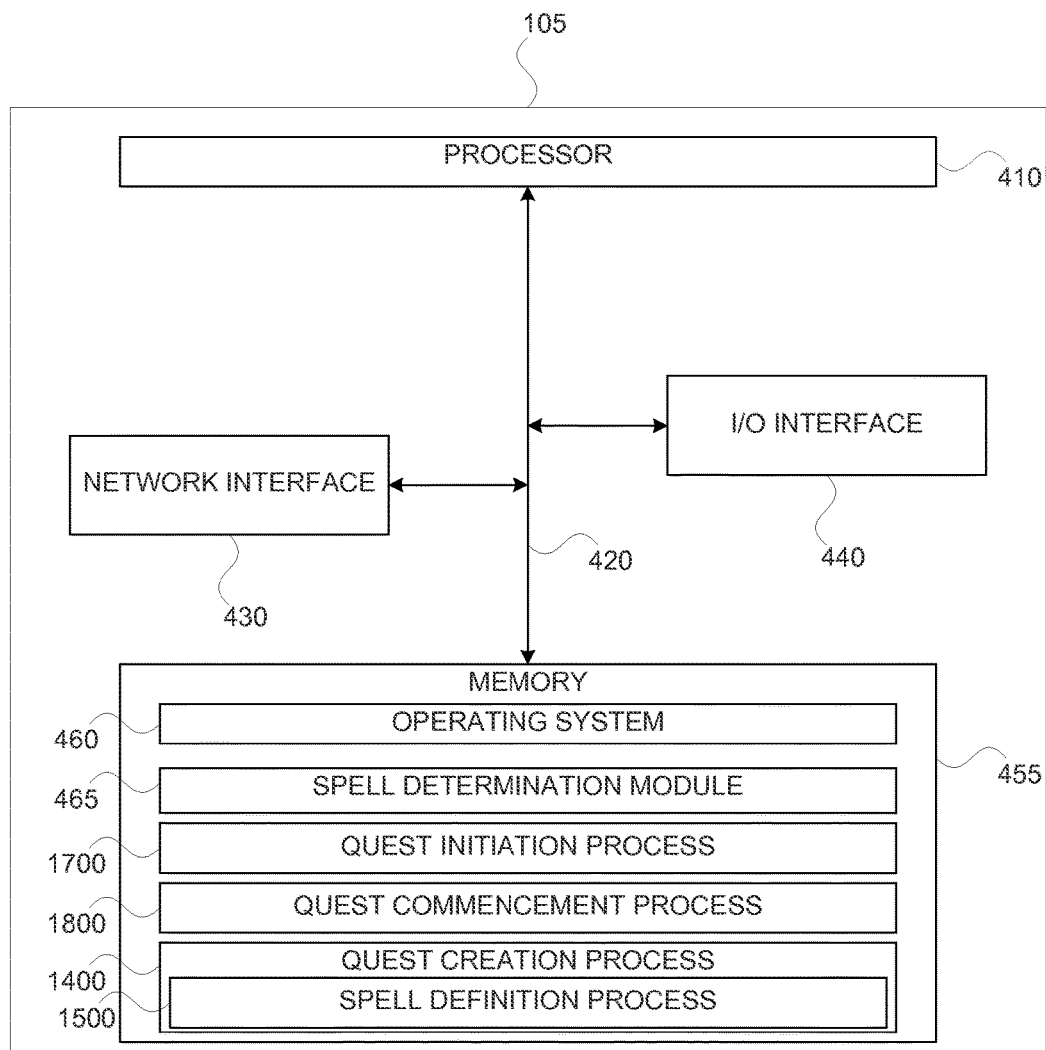
FIG. 8 illustrates the components of a computing device, in accordance with various example embodiments.

FIG. 8 illustrates the components of the computing devices 105, in accordance with various example embodiments. As shown, computing devices 105 may include processor 410, bus 420, network interface 430, input/output (I/O) interface 440, and memory 350. In some embodiments, computing devices 105 may include many more components than those shown in FIG. 8, such as a display device, an input device (e.g., a physical keyboard, a touch screen, etc.), one or more image sensors, a transmitter/receiver (or alternatively, a transceiver), a mobile video card and/or graphics processing unit (GPU), and other like components. However, it is not necessary that all of these generally conventional components be shown in order to disclose the example embodiments.

Memory 450 may be a hardware device configured to store an operating system 460 and program code for one or more software components, such as spell determination module 465 and/or one or more applications 465, 1400, 1500, 1700, and 1800. Memory 450 may be a computer readable storage medium that generally includes RAM, ROM, a flash memory device, a SSD, a SD card, and/or other like storage media capable of storing and recording data. The program code and/or software components may also be loaded from a separate computer readable storage medium into memory 450 using a drive mechanism (not shown). Such separate computer readable storage medium may include a memory card, memory stick, removable flash drive, sim card, and/or other like computer readable storage medium (not shown). In some embodiments, software components may be loaded into memory 450 via network interface 430, rather than via a computer readable storage medium.

During operation, memory 450 may include operating system 460, spell determination module 465, which includes quest creation process 1400 including spell definition process 1500, quest initiation process 1700, quest commencement process 1800, and/or any other like processes (not shown). Operating system 460 may manage computer hardware and software resources and provide common services for computer programs. Operating system 460 may include one or more drivers, such as a display driver, camera driver, audio drivers, and/or any other like drivers that provide an interface to hardware devices thereby enabling operating system 460, spell determination module 465, quest creation process 1400 including spell definition process 1500, quest initiation process 1700, quest commencement process 1800, etc. to access hardware functions without needing to know the details of the hardware itself. The operating system 460 may be a general purpose operating system or an operating system specifically written for and tailored to the computing device 105.

The spell determination module 465 may be a collection of software modules and/or program code that enables the computing devices 105 to define one or more spells with associated spell outputs, determine when a spell has been performed using the wand 125, and determine spell outputs associated with a performed spell. Spell determination module 465 may be a native application, a web application, or a hybrid application. In embodiments where the spell determination module 465 is a web or hybrid application, spell determination module 465 may be rendered in or otherwise executed using a web browser of the computing device 105. In various embodiments, a game operator may develop one or more other applications to interact with the spell determination module 465. The aforementioned processes may be a collection of software modules and/or program code that enables the computing device 105 to operate according to the various example embodiments as discussed with regard to FIGS. 10-17.

Processor 410 may be configured to carry out instructions of a computer program by performing the basic arithmetical, logical, and input/output operations of the system. The processor 410 may include a single-core processor, a dual-core processor, a triple-core processor, a quad-core processor, and/or the like. The processor 410 may perform a variety of functions for the computing devices 105 and may process data by executing program code, one or more software modules, firmware, middleware, microcode, hardware description languages, and/or any other like set of instructions stored in the memory 450. The program code may be provided to processor 410 by memory 450 via bus 420, one or more drive mechanisms (not shown), and/or via network interface 430. In order to perform the variety of functions and data processing operations, the program code and/or software components may be executed by the processor 410. On execution by the processor 410, the processor 410 may cause computing devices 105 to perform the various operations and functions delineated by the program code/modules, and/or software components.

For example, in various embodiments, the computing devices 105 may include various modules configured to operate (through hardware and/or software) to define one or more spells with associated spell outputs, and determine when a spell has been performed using the wand 125. The various modules may include the spell determination module 465 and modules corresponding to the processes 1400, 1500, 1700, and 1800 (described with regard to FIGS. 10-17). The various modules may be loaded into memory 450 and executed by the processor 410. Once the various modules are loaded into memory 450 and executed by the processor 410, the processor 310 may be configured to perform the processes 1400, 1500, 1700, and 1800 as discussed with regard to FIGS. 10-17. While specific modules are described herein, it should be recognized that, in various embodiments, various modules and/or processes may be combined, separated into separate modules and/or processes, and/or omitted. Additionally, in various embodiments, one or more modules and/or processes may be implemented on separate devices, in separate locations, or distributed, individually or in sets, across multiple processors, devices, locations, and/or in cloud-computing implementations.

Bus 420 may be configured to enable the communication and data transfer between the components of computing device 105. Bus 420 may comprise a high-speed serial bus, parallel bus, internal USB, FSB, and/or other suitable communication technology for transferring data between components within computing device 105 and/or between computing device 105 and other like devices. In some embodiments, the computing device 105 may include an I/O bus such as a PCI bus, a (PCI-e bus, a SCSI bus, and the like.

Network interface 430 may be a computer hardware component that connects computing device 105 to a computer network (e.g., network 115). Network interface 430 may connect computing device 105 to a computer network via a wired or wireless connection. Network interface 430 may operate in conjunction with a wireless transmitter/receiver and/or transceiver (not shown) that is configured to operate in accordance with one or more wireless standards. The wireless transmitter/receiver and/or transceiver may be configured to operate in accordance with a wireless communications standard, such as the IEEE 802.11-2007 standard (802.11), the Bluetooth standard, and/or any other like wireless standards. The communications port may be configured to operate in accordance with a wired communications protocol, such as a serial communications protocol (e.g., the USB, FireWire, SDI, and/or other like serial communications protocols), a parallel communications protocol (e.g., IEEE 1284, CAMAC, and/or other like parallel communications protocols), and/or a network communications protocol (e.g., Ethernet, token ring, (FDDI, and/or other like network communications protocols). The network interface 430 may also include one or more virtual network interfaces configured to operate with application 465 and/or other like applications.

I/O interface 440 may be a computer hardware component that provides communication between the computing device 105 and one or more other devices. The I/O interface 440 may include one or more user interfaces designed to enable user interaction with the computing device 105 and/or peripheral component interfaces designed to provide interaction between the computing device 105 and one or more peripheral components. User interfaces may include, but are not limited to a physical keyboard or keypad, a touchpad, a speaker, a microphone, etc. Peripheral component interfaces may include, but are not limited to, a non-volatile memory port, a USB port, an audio jack, and a power supply interface.

As discussed above, computing devices 105 may also include a transmitter and receiver or a transceiver (not shown). The transmitter may be any type of hardware device that generates or otherwise produces radio waves in order to communicate with one or more other devices. The transmitter may be coupled with an antenna (not shown) in order to transmit data to one or more other devices. The transmitter may be configured to receive digital data from one or more components of computing devices 105 via bus 420, and convert the received digital data into an analog signal for transmission over an air interface. The receiver may be any type of hardware device that can receive and convert a signal from a modulated radio wave into usable information, such as digital data. The receiver may be coupled with the antenna (not shown) in order to capture radio waves. The receiver may be configured to send digital data converted from a captured radio wave to one or more other components of computing device 105 via bus 420. In embodiments where a transceiver (not shown) is included with computing devices 105, the transceiver may be a single component configured to provide the functionality of a transmitter and a receiver as discussed above.

FIG. 9 illustrates the components of wand module 200, in accordance with other various example embodiments. As shown, wand module 200 may include first devices 215, battery 305, sensors 306, I/O interface 307, processor 310, device interface module 315, bus 320, I/O bus 325, communication module 330, and memory 350. Furthermore, during operation, the wand module 200 of FIG. 9 includes the device interface module 315 and spell module 300, which includes the spell determination module 465, which includes the processes 400-600. In some embodiments, wand module 200 may include many more components than those shown in FIG. 9. However, it is not necessary that all of these generally conventional components be shown in order to disclose the example embodiments. FIG. 9 illustrates the internal components of wand module 200 that is capable of performing the various spell definition and spell determination processes as described above as being performed by the computing device 105 (see e.g., the description of FIGS. 1-5). Thus, the various components as described above with regard to FIGS. 7-8 may be the same or similar to those shown in FIG. 9.

Figure 10:
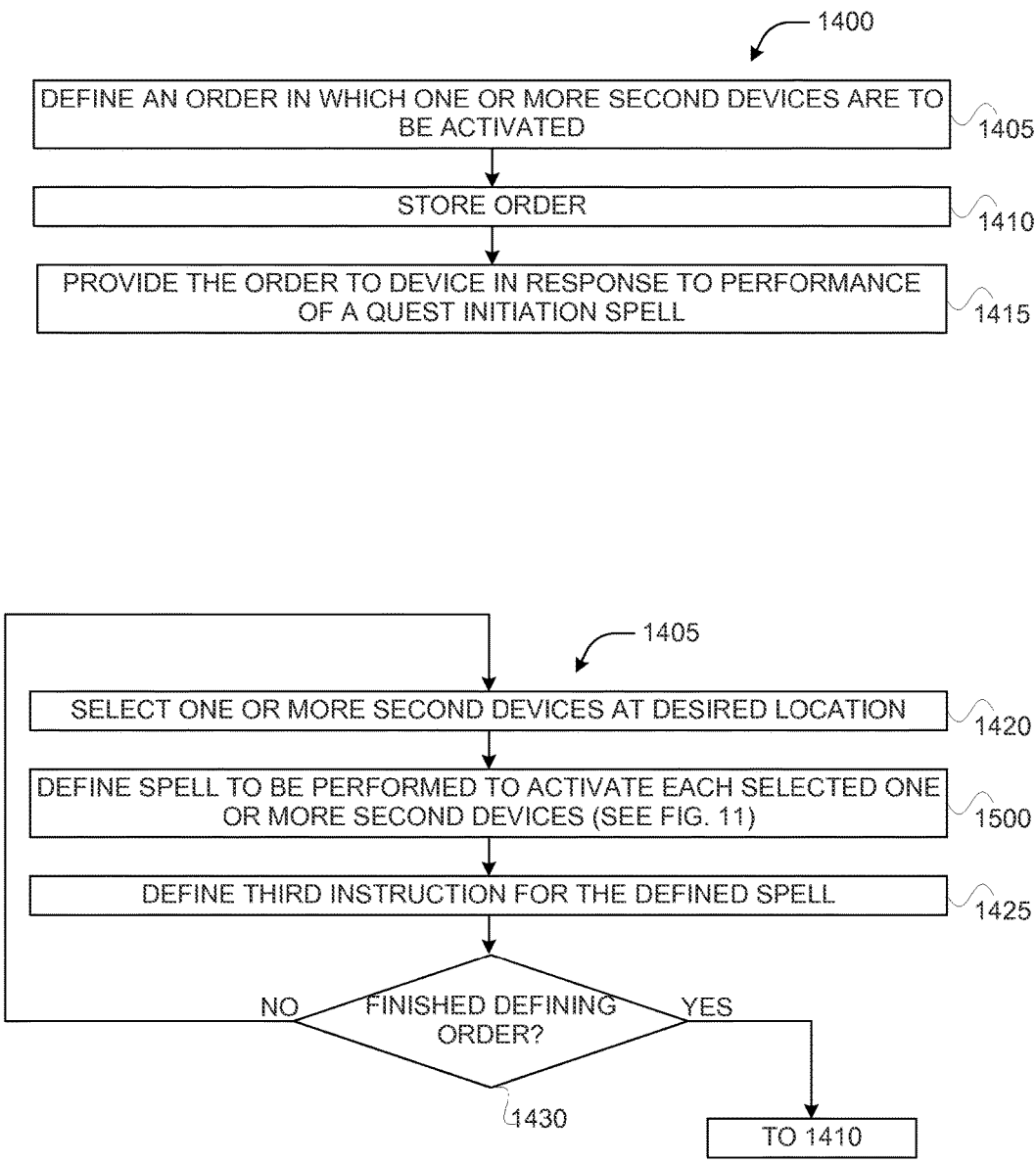
FIGS. 10-12 illustrates a process for quest creation, in accordance with various embodiments.
Figure 11:
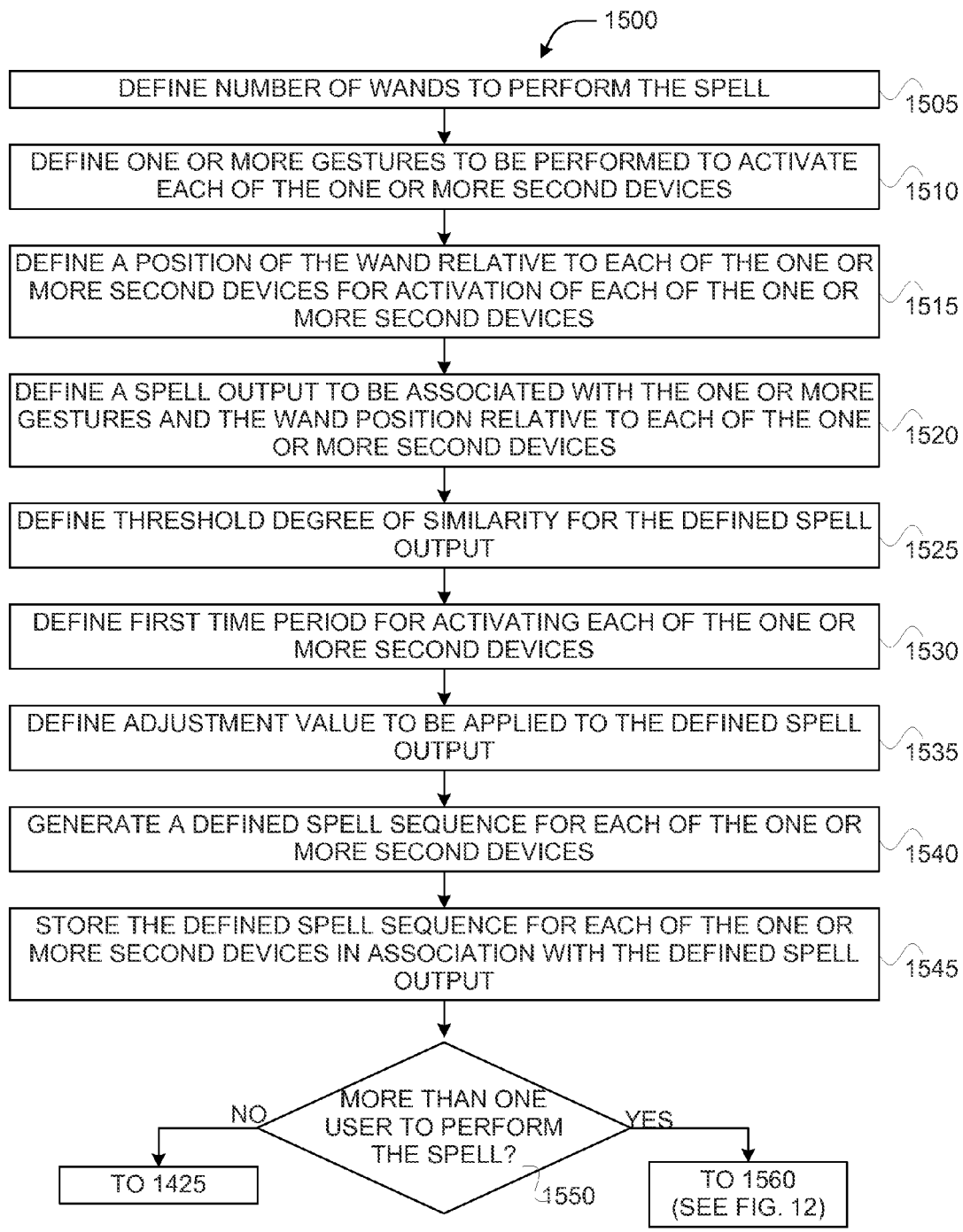
Figure 12:
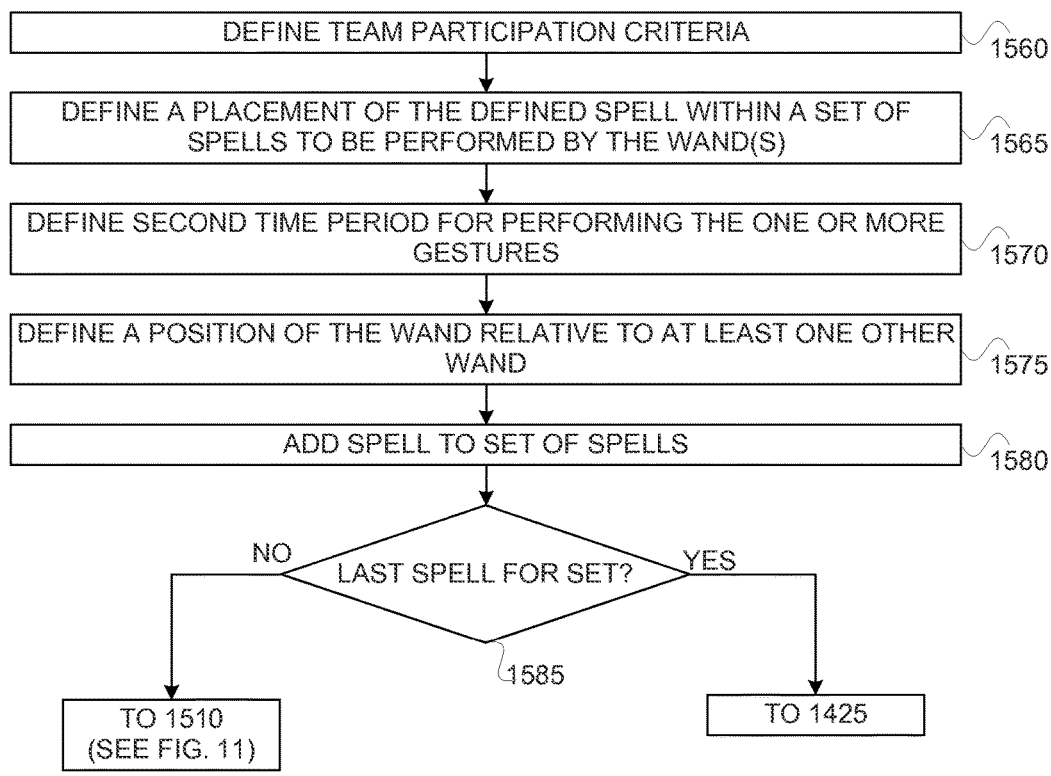

FIG. 10 illustrates a process 1400 for creating a quest in accordance with various embodiments. FIGS. 11-12 illustrate a process 1500 for defining spells for activating one or more second devices in accordance with various embodiments. Processes 1400-1500 may be used by a game creator, such as a geocacher creator, to define and generate a quest. The processes 1400-1500 may be implemented as part of wand module 200 or one or more applications including software modules or program code, which may be executed by a processor of computing device 105. For illustrative purposes, the operations of processes 1400-1500 will be described as being performed by a computing device 105 in conjunction with a wand 125 wherein a user of the computing device 105 and/or the wand 125 may be referred to as a "game creator." However, it should be noted that a wand 125 (e.g., the example embodiments shown and discussed with regard to FIG. 9) and/or any other similar devices may operate the process 1400 as described below. While particular examples and orders of operations are illustrated in FIGS. 10-12, in various embodiments, these operations may be re-ordered, broken into additional operations, combined, and/or omitted altogether.

At operation 1405, the computing device 105 may define an order in which one or more second devices are to be activated. Such an order may be indicative of one or more caches to be accessed by one or more geocacher searchers utilizing a wand 125. Each cache to be accessed may include one or more second devices to be activated. The process for defining the order may include operations 1420-1430, which is described in detail below. Once the computing device 105 defines the order, the computing device 105 may proceed to operation 1410 to store the order. At operation 1415, the computing device 105 may provide the order to a device, such as a computing device 105 or a wand 125 in response to a performance of a quest initiation spell, which is described in detail with regard to FIGS. 13-17.

Referring now to operation 1405, which is shown at a lower portion of FIG. 10, at operation 1420, the computing device 105 may select one or more second devices at a desired location. The selection of the one or more devices may include selecting one or more second devices from a list of second devices. The list of second devices may be provided in a webpage designed to enable a game creator to create a quest, and the game creator may select the one or more second devices using one or more graphical control elements, such as buttons, radio buttons, check boxes, text fields, and/or any other know graphical control elements. In other embodiments, the selection of the one or more devices may include the game creator physically visiting an area where one or more second devices are deployed and performing one or more gestures using a wand 125 to indicate a selected second device.

Once the computing device 105 selects one or more second devices at a desired location, the computing device may proceed to process 1500 to define a spell to be performed to activate each selected one or more second devices at the desired location. Process 1500 is described in detail below with regard to FIG. 11. At operation 1425, the computing device 105 may define a third instruction to be associated with the defined spell. The third instruction may be an instruction to an accounting server to indicate that a second device has been accessed or activated in accordance with the various game-play rules and criteria defined by the game creator. The third instruction may also indicate various virtual property, points, etc., to be attributed to a wand user or team of wand users when the wand user or the team of wand users casts the defined spell and/or accesses the one or more second devices at the desired location. Such virtual property, points, etc., may be used to determine spell output intensities, ROE sizes/shapes, etc., for the user during a next quest or for accessing a next second device. The third instruction may also indicate other various geocaching or game-play criteria, such as a time that the wand user or team of wand users accessed the one or more second devices, virtual property/points/etc. associated with accessing or activating the one or more second devices, and/or any other like information. During a quest, the third instruction may be sent to the accounting server 120 by the computing device 105 or by the activated second device. In some embodiments, both the computing device 105 and the activated second device may send separate third instructions to the accounting server 120, wherein the third instruction sent by the second device may act as a confirmation of the third instruction sent by the computing device 105. Information contained in the third instructions may be posted to a website, such as a geocaching listing site, or some other third-party communication platform, such as a social networking service.

Once the third instruction is defined for the defined spell, the computing device 105 may proceed to operation 1430 to determine whether the game creator has finished defining the order. If at operation 1430 the computing device 105 determines that the game creator is not finished defining the order, then the computing device may proceed to operation 1420 to a next one or more second devices at a next desired location. If at operation 1430 the computing device 105 determines that the game creator is finished defining the order, then the computing device may proceed to operation 1410 to store the order.

Figure 15:
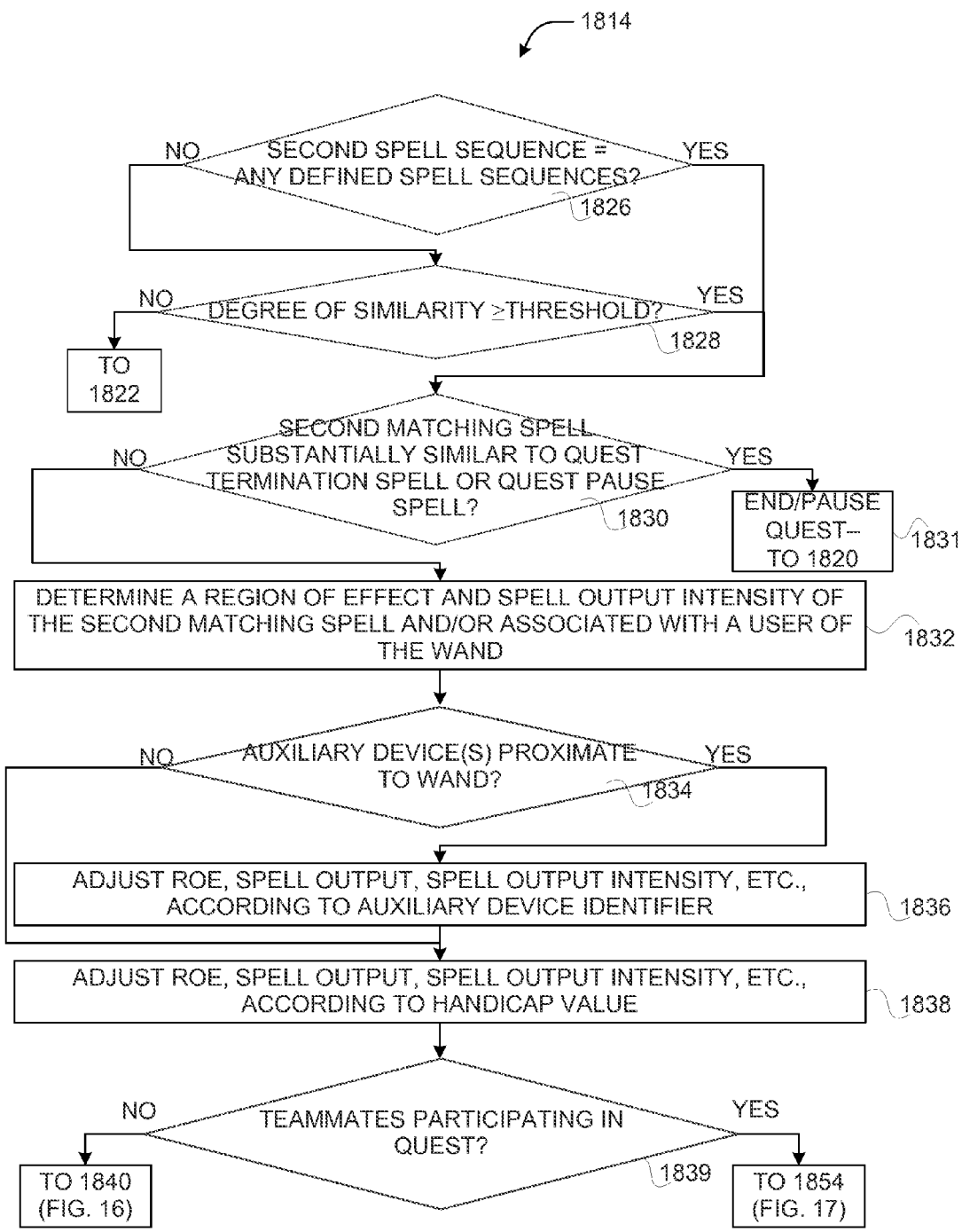

Referring now to operation 1500 shown by FIG. 15, at operation 1505, the computing device 105 may define a number of wand users that are to perform the spell in order to access or activate the one or more second devices. In some embodiments, the game creator may define that only a single user is to perform the spell, while in other embodiments, the game creator may define that two or more users are to perform the defined spell. Spells that are to be performed by more than one wand user may be referred to as a "team participation spell," "teammate spells," and the like.

At operation 1510, the computing device 105 may define one or more gestures to be performed to activate each of the one or more second devices at the desired location. As noted previously, the one or more gestures may include one or more bodily movements, one or more physical inputs (e.g., button presses, biometric data, etc.), one or more voice commands, completion of one or more tasks, and the like. Defining the one or more gestures may also include defining a sequence in which the one or more gestures are required to be performed. For team participation spells, the computing device 105 may define or specify the number and order that the one or more gestures are to be performed by each wand user and the specific wand devices that are to be used to perform the one or more gestures. For example, the game creator may specify that the first user is to perform a first set of gestures using a first wand 125A, a second user is to perform a second set of gestures using a second wand 125B, etc. Additionally, the game creator may define that each user is to perform one or more gestures using a same wand. For example, the game creator may specify that a first user is to perform a first set of gestures using the first wand 125A, a second user is to perform a second set of gestures using the first wand 125A, etc. The game creator may define that any combination gestures are to be performed using any combination of devices.

At operation 1515, the computing device 105 may define a position of the wand relative to each of the one or more second devices for activation of each of the one or more second devices. Defining a spell output intensity may be based on a position of the wand relative to the one or more second devices that is required for the spell to have an effect. Defining the position of the wand relative to the one or more second devices may include defining an ROE 130 for the defined spell output to be applied. Defining the ROE 130 may include defining a size and/or shape of the ROE 130 as described herein. It should be noted that, although the computing device 105 may define a ROE 130 for the spell output, in various embodiments, the defined ROE 130 may be adjusted based on a user profile, an auxiliary device identifier, and/or handicap value (see e.g., operation 1540 described below), the computing device 105 may define one or more ROE adjustment factors that may be used for adjusting the ROE 130 and/or the spell output intensity.

At operation 1520, the computing device 105 may define a spell output to be associated with the one or more gestures and the wand position relative to each of the one or more second devices. The defined spell output may include one or more first instructions for activating one or more first devices and/or one or more second instructions for activating or accessing the one or more second devices. In some embodiments, the first instructions and/or the second instructions may provide a riddle, puzzle, challenge, or clue indicating a location of a next cache or item to be discovered, a time limit (e.g., a first time period) for discovering the next cache or item, for activating or accessing the next cache or item, and the like. For example, upon performance of a defined spell, a first instruction may activate an audio device to play a prerecorded message including the riddle/puzzle/challenge/etc. for finding/activating a next second device indicated by the order. By way of another example, upon performance of a defined spell, a second instruction may activate a display device to display a desired image or text including the riddle/puzzle/challenge/etc. for finding/activating the next second device indicated by the order.

In some embodiments, the computing device 105 may define a secondary spell output to be associated with the defined one or more gestures, which may include one or more secondary first instructions for activating one or more first devices and/or one or more secondary second instructions for activating one or more second devices, wherein the one or more first instructions are different than the one or more secondary first instructions and/or the one or more second instructions are different than the one or more secondary second instructions. The secondary spell output may to create a dynamic quest, wherein the order of second device to activate is altered based on various criteria. In some embodiments, the order of second devices may change based on a user's actions, such as performing a spell incorrectly or below a threshold degree of similarity, reaching a cache at a specific time of day, taking more than a first period of time to activate a second device, and the like. In some embodiments, the order of second devices may change based on external events, such as another user or team of users reaching a specific cache first and/or activating one or more second devices at that cache, etc.

Optionally, the computing device 105 may define another spell output to be associated with the defined one or more gestures, which may include one or more other first instructions for activating one or more first devices and/or one or more other second instructions for activating one or more second devices, wherein the one or more first instructions are different than the one or more other first instructions and/or the one or more second instructions are different than the one or more other second instructions. The other spell output may be used to indicate to a user of the wand 125 that the one or more defined gestures have not been performed properly and/or that a degree of similarity between the defined gestures and the performed gestures is below a threshold.

At operation 1525, the computing device 105 may define a threshold degree of similarity for the defined spell output. The degree of similarity may indicate a number and/or order of operations of the spell sequence that matches a number and order of operations of the defined spell sequence. For example, if the defined spell requires a user to perform a number of gestures in a specific sequence, and the user performs one or fewer (or one or more) of the defined gestures, the degree of similarity may be represented as a character or integer indicating the amount of the gestures that were performed. In some embodiments, the degree of similarity may be represented as a ratio of the number of performed gestures to the number of defined gestures. In some embodiments, the degree of similarity may indicate whether one or more gestures were performed out of order. Furthermore, it should be noted that the degree of similarity may be used to provide first instructions and/or second instructions, which may indicate a missing gesture in the spell, insufficient authorization to perform the spell, the performance of the spell was done at an unauthorized location and/or spatial coordinates, and the like. At operation 1525, the computing device 105 may specify a minimum number and/or order of operations of the spell sequence that are required to be performed to obtain a spell output associated with the defined spell.

At operation 1530, the computing device 105 may define a first time period for activating each of the one or more second devices. The first time period may be a time in which the one or more defined gestures are required to be performed (within a certain margin of error) to access or activate the one or more second devices. For example, the first period of time may specify that a second device must be activated within 20 minutes of reaching the wand position defined at operation 1515. Additionally, the first time period may be dependent on a time at which a previous second device is accessed. For example, the first time period may specify that each second device at each cache is to be accessed or activated within one hour of each other, such as, if a second device at a first cache is accessed at 2:00 PM then one or more second devices at a second cache may have to be accessed by or before 3:00 PM. In some embodiments, a first period defined for at least one second device may be different than another first time period defined for another second device. For example, if a second device at a first cache is accessed at 2:00 PM then one or more second devices at a second cache may have to be accessed by or before 3:00 PM, and if the one or more second devices at the second cache are accessed at 2:59 PM, then one or more second devices at a third cache may have to be accessed by or before 3:49 PM. In some embodiments, the first time period may be dynamic such that the value of a first time period for accessing one or more second devices at a second cache is a function or otherwise based on an amount of time that it took for a wand user to access or activate one or more second devices at a first cache. It should also be noted that in some embodiments, the first time period may take into account a time required for a second device to perform one or more operations. For example, when the second device to be activated is a display device, the first time period may take into account an amount of time required to receive a second instruction, transition from a sleep/idle mode to an active mode (if necessary), and display a defined image or text. By way of another example, when the second device to be activated is drone, the first time period may take into account an amount of time required to receive a second instruction, transition from a sleep/idle mode to an active mode (if necessary), engage or activate one or more electromechanical components, and move to a predefined location or position (if necessary).

At operation 1535, the computing device 105 may define an adjustment value to be applied to the defined spell output. The adjustment value may be one or more values to alter an ROE 130, a spell output intensity value, a first time period, a second time period, a threshold degree of similarity, and/or other like game play or wand usage factors. The adjustment value may be based on a handicap value associated with a user, an auxiliary device identifier, etc. In some embodiments, the adjustment value may be equal to the handicap values and/or auxiliary device identifier value, while in other embodiments, the adjustment value may be limited such that the ROE 130, spell output intensity, etc. cannot be increased/decreased by more than the adjustment value regardless of a handicap value associated with a user.

At operation 1540, the computing device 105 may generate a defined spell sequence for each of the one or more second devices at the desired location. The computing device 105 may generate a defined spell sequence based on the defined one or more gestures. In various embodiments, generating the defined spell sequence may include converting the one or more defined gestures into a markup language, a hypertext language, a text file, firmware, middleware, microcode, hardware description languages, or any combination thereof that may be executed or otherwise interpreted by the computing device 105A. At operation 1545, the computing device 105 may store the defined spell sequence for each of the one or more second devices in association with the defined spell output. In some embodiments, the computing device 105 may store the defined spell sequence in a database associated with the accounting server 120. In such embodiments, the gaming service may provide a web application or webpage to the computing device 105 for defining the quest according to the various example embodiments disclosed herein. Such a web application or webpage may include one or more graphical control elements that allow a user of the computing device 105 to define the quest. The graphical control elements may include radio boxes, check boxes, text fields, and in some embodiments, markers to be placed on an interactive map. In other embodiments, the computing device 105 may transmit or otherwise provide the defined spell sequence to the accounting server 120. For example, in some embodiments, a wand user may physically move to a geolocation and perform the one or more gestures using the wand 125 to define the one or more gestures at operation 1510, define the wand position relative to the one or more second devices at operation 1515, perform operations 1520-1535 by performing one or more other gestures to indicate a desired spell output, desired threshold degree of similarity, and define an adjustment value. In some embodiments, to define the desired spell output, the user may activate a second device after or before performance of the one or more gestures, such as by pressing one or more buttons on the second device.

At operation 1550, the computing device 105 may determine whether the defined spell is to be a team participation spell as defined at operation 1505. If at operation 1550 the computing device 105 determines that the defined spell is to be a team participation spell, then the computing device may proceed to operation 1425 to define the third instruction as discussed above. If at operation 1550 the computing device 105 determines that the defined spell is to be a team participation spell, then the computing device 105 may proceed to operation 1560, to define team participation criteria.

Referring now to FIG. 12, at operation 1560, the computing device 105 may define various term participation criteria. Such team participation criteria may include a number of users that are required to perform the defined spell to activate the one or more second devices, a number of wands to be used for performing the defined spell, and the like. For example, the team participation criteria may indicate that at least one of the defined gestures of the defined spell is to be performed by the user using the wand 125A and another defined gesture of the defined spell is to be performed by the another user using the another wand 125B. In this case, the defined spell may be one of a set of spells wherein each spell of the set of spells is defined by repeatedly performing operations 1510-1545. By way of another example, the team participation criteria may indicate that at least one of the gestures of the defined spell is to be performed by the user using the wand 125A and another defined gesture of the defined spell is to be performed by the another user using a same wand (i.e., the wand 125A). In this case, all of the gestures performed by both users may be considered to be a part of the same spell. In some embodiments, the team participation criteria may include user-based restrictions, such as requiring users that are over or under a certain age to perform one or more of the defined gestures, requiring users having a game-related ranking/level/virtual property amount/etc. to perform the spell or certain gestures, and the like.

At operation 1565, the computing device 105 may define a placement of the defined spell within a set of spells. In embodiments, the computing device 105 may place the spell defined according to operations 1510-1535 before or after other spells defined according to operations 1510-1535. In this way, game creator may define a spell order for the set of spells. Defining the spell order may include giving the defined spell a rank, grade, level, etc., such as when the spell is defined using a web application. In some embodiments, the game creator may perform the gestures for each spell of a set of spells in order and rearrange the order as desired at a later point in time using a web application. In some embodiments, the game creator may define that multiple spells of the set of spells are required to be performed simultaneously (within some margin of error). In such embodiments, the game creator may give each spell of the set of spells a same rank, grade, level, etc.

At operation 1570, the computing device 105 may define second time period for performing the one or more defined gestures. The second time period may be an amount of time in which one or more users are to perform the one or more defined gestures. For example, a user may be required to perform three different bodily movements and recite a voice command within 20 seconds. It should be noted that each defined spell may have a different second time period. For example, in a set of spells, a first spell may require a user to perform three different bodily movements and recite a voice command within 20 seconds, while a second spell of the set of spells may require another user to perform five bodily movements within 15 seconds. In various embodiments, a sum of the second time periods for a set of spells may be substantially equal to the first time period defined at operation 1530. In other embodiments, at operation 1570, the game creator may define a time gap between each second time period (also referred to as "third time periods") such that a sum of the second time periods and the third time periods for a set of spells may be equal to the first time period defined at operation 1530. For example, in a set of spells, a first spell may require a user to perform three different bodily movements and recite a voice command within 20 seconds, a second spell of the set of spells may require another user to perform five bodily movements within 15 seconds, and the other user may be required to perform a first gesture of the second spell within 5 seconds of completion of a last gesture of the first spell. It should also be noted that each time gap or third time period may be different from one another. Additionally, when multiple spells are required to be performed simultaneously, the game creator may define the third time periods to be zero.

At operation 1575, the computing device 105 may define a position of the wand relative to at least one other wand. In some embodiments, operation 1575 may involve defining a distance between various wands, for example, defining that a first wand 125A perform a first spell 5 feet from a second wand 125B. In other embodiments, operation 1575 may involve defining spatial coordinates for multiple wands, such as by defining various spatial coordinates within a gaming arena, defining spatial coordinates relative to one another or relative to another device (e.g., a second device, a beacon 110, etc.). Defining the position of the wand relative to other teammate wands may be accomplished in a same or similar manner as discussed with regard to operation 1515.

At operation 1580, the computing device 105 may add the defined spell to a set of spells. The set of spells may then be stored by the computing device 105 or provided to the accounting server 120 for storage. At operation 1585, the computing device 105 may determine whether the defined spell is to be a last spell for the set of spells. If at operation 1585 the computing device 105 determines that the defined spell is the last spell for the set of spells, then the computing device 105 may proceed to operation 1425 to define the third instruction. Otherwise, the computing device 105 may proceed to operation 1510 thereby repeating operations 1510-1550 to add another spell to the set of spells.

Figure 13:
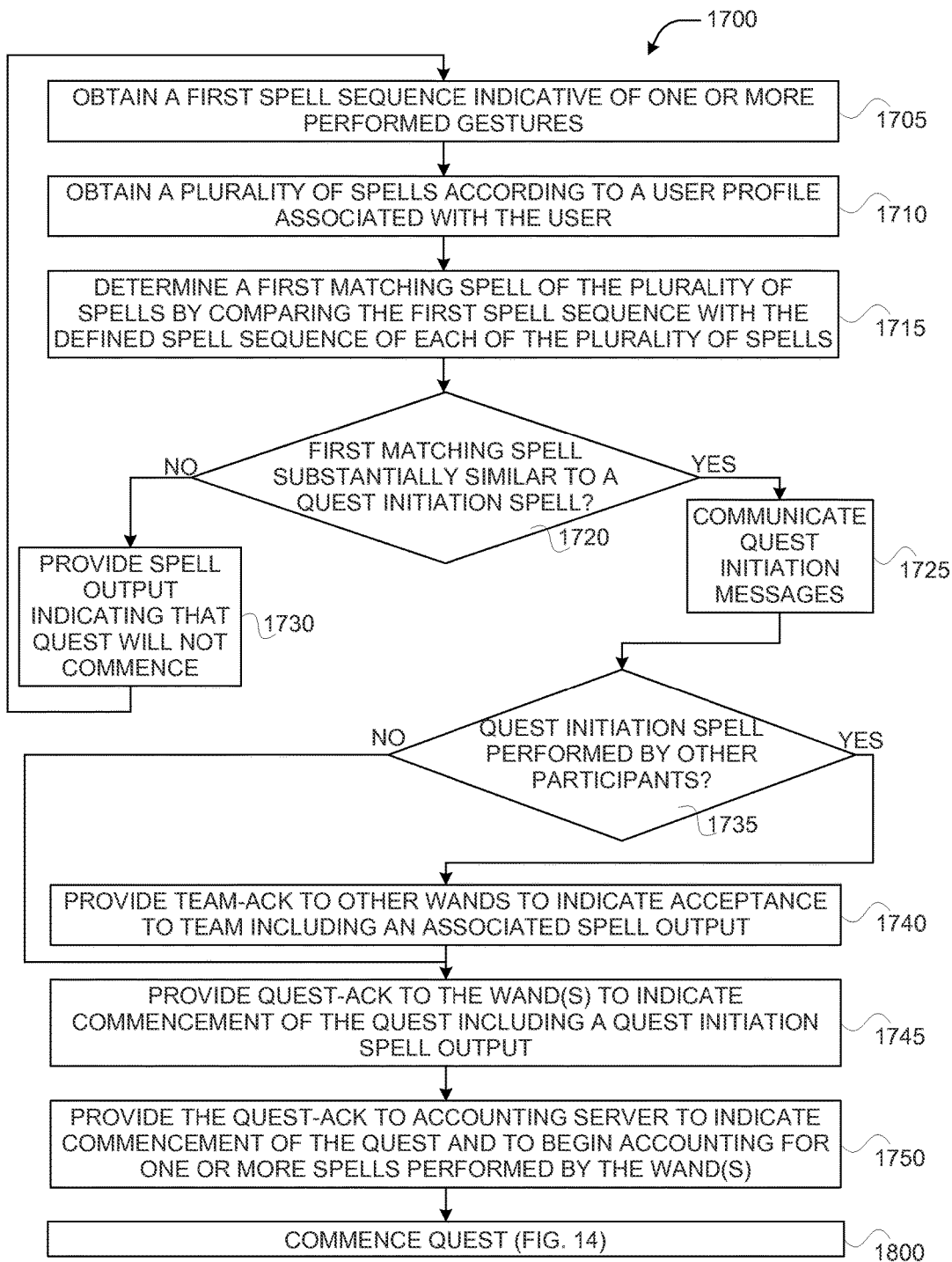
FIG. 13 illustrates a process for quest initiation, in accordance with various embodiments.

FIG. 13 illustrates a process 1700 for initiating a quest in accordance with various example embodiments. FIGS. 14-17 illustrate a process 1800 for initiating a quest in accordance with various example embodiments. The processes 1700-1800 may be implemented as one or more applications including software modules or program code, which may be executed by a processor of computing device 105 and/or wand module 200. For illustrative purposes, the operations of processes 1700-1800 will be described as being performed by the computing device 105A in conjunction with the wand 125A (e.g., the example embodiments shown and discussed with regard to FIGS. 7-8) when the wand 125A is to initiate and commence a quest, which may be with one or more teammate wands (e.g., wand 125B and the like) that are associated with teammate computing devices (e.g., computing device 105B and the like). However, it should be noted that any wand 125 (e.g., the example embodiments shown and discussed with regard to FIG. 9) and/or any other similar devices may operate the processes 1700-1800 as described below. While particular examples and orders of operations are illustrated in FIGS. 10-17, in various embodiments, these operations may be re-ordered, broken into additional operations, combined, and/or omitted altogether.

Referring to FIG. 13, at operation 1705, the computing device 105A may obtain a first spell sequence indicative of one or more performed gestures wherein the one or more performed gestures are movements performed by a user using the wand 125A. The computing device 105A may obtain or otherwise determine the spell sequence indicative of one or more performed gestures according the various methods described herein.

At operation 1710, the computing device 105A may obtain a plurality of spells according to a user profile associated with the user, wherein each of the plurality of spells includes a defined spell sequence and an associated spell output. The computing device 105 may obtain or otherwise determine a plurality of spells wherein each of the plurality of spells includes a defined spell sequence and a defined spell output. The plurality of spells may be provided by a game operator, which operates the accounting server 120 or by another like entity. The plurality of spells may be stored in a memory device and/or cloud storage space associated with the user of wand 125A. In some embodiments, the computing device 105 may query a database associated with a game operator to obtain the plurality of spells. In such embodiments, the computing device 105 may query the database using a user profile (or information contained within the user profile), which may indicate various game play parameters, subscription information, and/or other like user contexts, and the database may provide one or more spells to the computing device 105A based on the provided information.

At operation 1715, the computing device 105A may determine a first matching spell of the plurality of spells by comparing the first spell sequence with the defined spell sequence of each of the plurality of spells. The computing device 105A may determine a matching spell according the various methods described herein.

At operation 1720, the computing device 105A may determine whether the first matching spell is substantially similar to a quest initiation spell. If at operation 1720 the computing device 105A determines that the first matching spell is not substantially similar to the quest initiation spell, the computing device 105A may proceed to operation 1730 to provide a spell output indicating that the quest will not commence. If at operation 1720 the computing device 105 determines that the first matching spell is substantially similar to the quest initiation spell, then the computing device 105A may proceed to operation 1725 to communicate a quest initiation message to accounting server 120 and/or potential team participants, such as wand 125B and/or computing device 105B. Such messages may be communicated between the computing devices 105 according to the various example embodiments described herein.

In various embodiments, the quest initiation spell may be any combination of gestures used to indicate that a user desires to begin a quest. Such a quest initiation spell may be a predefined gesture, or may be defined by a game creator using a process that is the same or similar to processes 1400-1500. When the computing device 105A receives a spell sequence indicative of one or more gestures, the computing device 105A may track timing information (e.g., a time of day, a period of time in which the spell was performed, and the like) of the spell sequence. Once the computing device 105A at operation 1720 determines that received spell sequence is a quest initiation spell, the computing device 105A at operation 1725 may include the quest initiation spell and the associated timing information in a quest initiation message to be sent to the other devices, such as wand 125B and/or the computing device 1105B. Similarly, the wand 125A and/or the computing device 105A may receive a quest initiation message from the computing device 105B, which may include another quest initiation spell performed by the wand 125B and associated timing information. In some embodiments, the quest initiation messages may include agreement information. Such agreement information may include various quest parameters, rules, and/or terms for forming a team to engage in a quest. For example, an acceptable handicap value of other quest participants; number of teammate participants allowed per quest; time limits for the quest; maximum/minimum points/damage/health/virtual property to be applied to a user profile after a spell is cast; maximum/minimum allowable adjustments to ROEs, spell output intensities, etc.; and/or any other like rules. Such agreement information may be set or defined by each wand user prior to engaging in a quest. In some embodiments, the agreement information may be defined using a user interface displayed on a display device associated with the computing device 105. The user interface may include one or more graphical control elements (e.g., radio boxes, text boxes/fields, etc.) within a webpage. In some embodiments, the agreement information may be set of defined by performing one or more gestures using a wand 125, such as by using voice commands, bodily movements, button presses, and/or the like.

Once the quest initiation messages are communicated, the computing device 105A may proceed to operation 1735 to determine whether a quest initiation has been performed by other potential teammate participants. In various embodiments, a potential teammate participant may be required to perform the same or similar quest initiation spell that was performed by the user at operation 1715. In some embodiments, operation 1735 may include a determination as to whether the same or similar quest initiation spells were performed by both users at a same or similar time. In such embodiments, at operation 1735, the computing device 105A may compare the quest initiation spell, the associated timing information, and agreement information with the information contained in the other quest initiation message which was received at operation 1725. In other embodiments, the potential teammate participants may be required to perform a defined team forming spell and/or a defined team joining spell, which may be different than the quest initiation spell. In such embodiments, at operation 1735, the computing device 105A may determine whether the spell information contained in the messages received at operation 1725 are substantially similar to a team forming spell and/or a team joining spell.

For example, the quest initiation spell may include the quest participants holding their wands 125 at their sides and bowing at each other at a same or similar time. In such embodiments, the computing device 105A may receive a spell sequence indicative of the bowing gesture and may determine timing information of the spell sequence indicative of the bowing gesture. At operation 1720, the computing device 105A may determine that the bowing gesture is indicative of a quest initiation spell, and at operation 1725, the computing device 105A may obtain a quest invitation message from the other wand 125B. The quest initiation message received from the other wand 125B may indicate another quest initiation spell performed using the other wand 125B and timing information associated with the other quest initiation spell. At operation 1735, the computing device 105A may determine whether the other quest initiation spell is indicative of a bowing gesture that was performed at a same or similar time as the bowing gesture performed using the wand 125A, and the computing device 105A may determine whether the agreement information of both participants is at least somewhat similar. Such a determination may be based on various game parameters and/or game design choices.

By way of another example, the quest initiation spell may include clanking the wands 125A and 125B together, wherein vibrations generated by the contact of the wand 125A and 125B may be interpreted as quest initiation messages. In such embodiments, wand 125A may contact or touch wand 125B, and the wands 125A and 125B may register a same or similar vibration (operations 1720 and 1725) at a same or similar time (operation 1735).

It should also be noted that when a team is to include more than two participants, the computing device 105A may receive a quest initiation messages from each potential teammate participant in a same or similar fashion as described previously. In such embodiments, at operation 1735, the computing device 105A may compare the quest initiation spell and the associated timing information with the quest initiation spell and associated timing information contained in each received quest initiation message. In some embodiments, each quest initiation message may be required to be obtained at or within a predetermined time period. For example, a game operator may require that each quest initiation message be received within 2 minutes of each other in order for a participant to join a team. In other embodiments, potential teammate participants may join an on-going quest at any time. For example, an additional user associated with an additional wand 125 (not shown) may join a quest an hour after the user of the wand 125A and the user of the other wand 125B perform a same quest initiation spell as described above. In order to provide a perception seamless operation to the quest participants, in various embodiments, each quest participant may be notified of another participant's entry into a team within a relatively short time, such as within approximately 30 milliseconds of a user performing a quest initiation spell.

Referring back to FIG. 13, if at operation 1735 the computing device 105A determines that the quest initiation spells were not performed by one or more other participants, the computing device 105A may proceed to operation 1745 to provide a quest-acknowledgment (ACK), including a quest initiation spell output, to indicate that the quest will commence. If at operation 1735 the computing device 105A determines that the quest initiation spells were performed by one or more other participants, the computing device 105A may proceed to operation 1740 to provide a team-ACK, including an associated spell output, to the other wands 125 (e.g., wand 125B) to indicate acceptance to a team or formation of a team.

At operation 1740, the computing device 105 may provide a team-ACK to the other wands 125B to indicate acceptance or formation of a quest team including outputting an associated spell output. The associated spell output may be any type of indication that a user of the other wand 125B is joined to a team of other wands including at least the wand 125A. Such an indication may be made by way of one or more first instructions (also referred to as "team-ACK-first instructions") and/or one or more second instructions (also referred to as "team-ACK-second instructions"). For example, the team-ACK-first instructions may include emitting a tone or tones from a first device of the wand 125A, and/or the team-ACK-second instructions may include emitting a tone or tones from a second device associated with the wand 125A (e.g., a Bluetooth earpiece communicatively connected with the wand 125A and/or the computing device 105A). In most embodiments, the indication may also be provided to the other wand 125B and/or the other computing device 105B to indicate that the user of the wand 125A has agreed to form a team with the other wand 125B or that the other wand 125B is joined to an already existing team. Each computing device 105 (e.g., computing device 105A and the other computing device 105B) may send a third instruction to the accounting server 120 to indicate that the two wands 125 will commence a quest together and to account for one or more spells performed by the wand 125A and the other wand 125B once a quest has commenced. Such third instructions may include a device identifier associated with each wand 125, the quest initiation spell performed to join/form a team, associated timing information, and/or any other suitable information. At operation 1745, the computing device 105 may provide a quest-ack to an accounting server to indicate commencement of the quest and to begin accounting for one or more spells performed by the wand 125A, and other teammate participants, during the quest. At process 1800, the computing device may commence the quest according to process 1800, which is described with regard to FIGS. 14-17.

Figure 14:
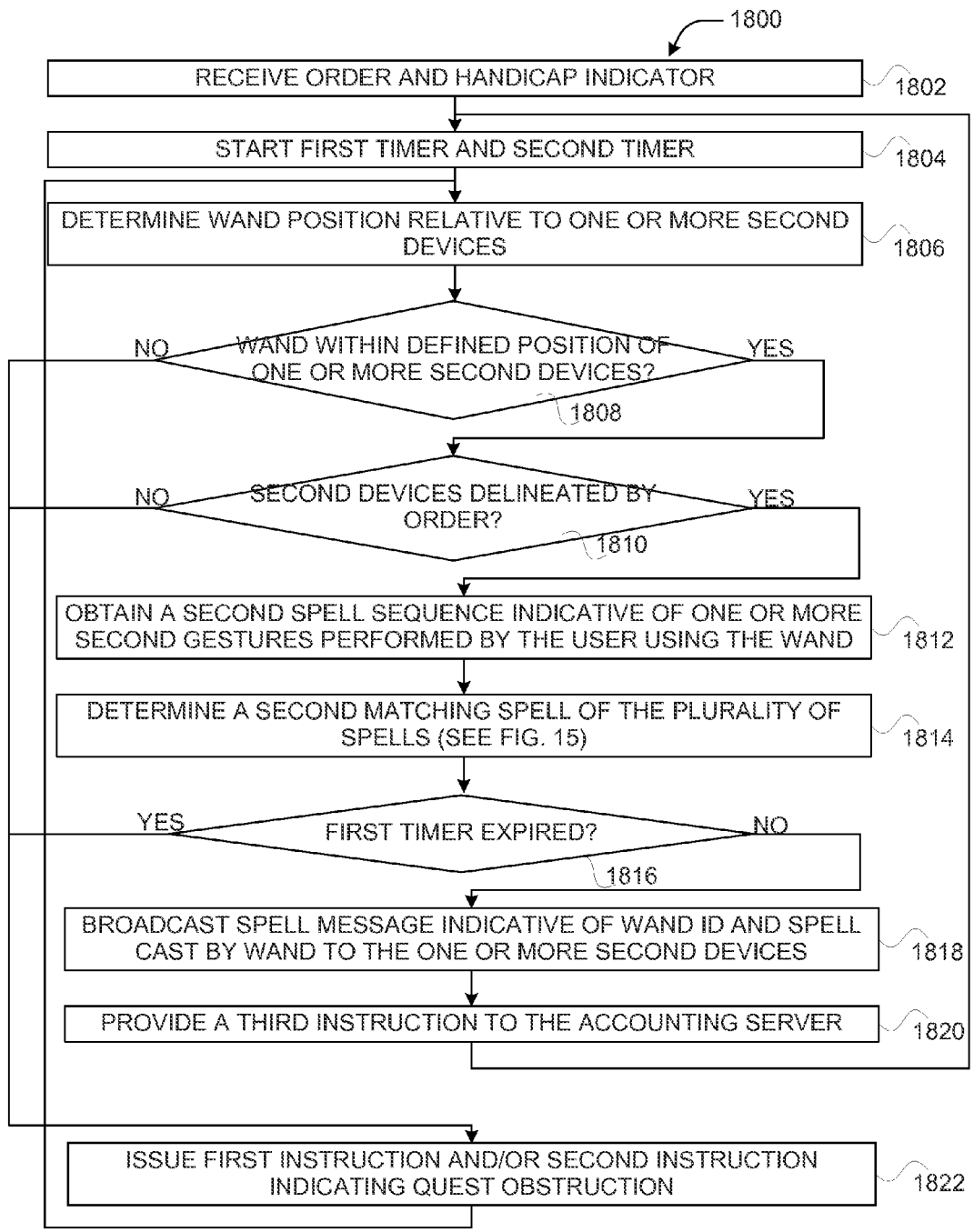
FIGS. 14-17 illustrate a process for quest commencement, in accordance with various example embodiments.

Referring now to FIG. 14, at operation 1802, the computing device 105A may receive an order in which one or more second devices are to be activated and one or more spells to activate each of the one or more second devices, and optionally, a handicap indicator. The order may be defined according to process 1400 as described with regard to FIGS. 10-12. The order may be a list of one or more second devices, a geolocation or cache at which each second device is located, and one or more spells that are to be performed to activate each second device. Additionally, when a second device requires a team participation spell or a set of spells to be performed in order to access that second device, the order may also specify the various gestures of the team participation spell or an order that each spell of the set of spells is to be performed.

The handicap indicator may indicate a handicap value to be applied to the user of wand 125A. As described previously, the user profiles may indicate various in-game criteria associated with a user, demographic information, and the like. In various embodiments, the accounting server 120 may determine based on the information contained in the user profiles of the quest participants and determine a handicap value to be applied to at least one of the quest participants. For example, if a user profile of the user of the wand 125A indicates that the user of the wand 125A is 20 years old and a user profile of the user of the other wand 125B indicates that the user of the other wand 125B is 10 years old, the accounting server 120 may calculate a handicap value to be applied to the user of the other wand 125B to increase a time period to perform one or more gestures for casting spells, increase an ROE 130B associated with the other wand 125B, increase a spell output intensity for spells cast using the other wand 125B, decrease a threshold degree of similarity for the other wand 125B, and/or the like. Additionally or alternatively, the accounting server 120 may calculate a handicap value to be applied to the user of the wand 125A to decrease a time period to perform one or more gestures for casting spells, decrease an ROE 130A associated with the wand 125A, decrease a spell output intensity for spells cast using the wand 125A, and/or the like. By way of another example, if a user profile of the user of the wand 125A indicates that the user of the wand 125A has an in-game ranking of 10th place and a user profile of the user of the other wand 125B indicates that the user of the other wand 125B has an in-game ranking of 100th place, the accounting server 120 may calculate a handicap value to be applied to the user of the other wand 125B to increase a time period to perform one or more gestures for casting spells, increase an ROE 130B associated with the other wand 125B, increase a spell output intensity for spells cast using the other wand 125B, decrease a threshold degree of similarity for the other wand 125B, and/or the like. By way of yet another example, if a user profile of the user of the wand 125A indicates that the user of the wand 125A has one thousand (1000) in-game points/virtual property/etc. and a user profile of the user of the other wand 125B indicates that the user of the other wand 125B has zero (0) in-game points/virtual property/etc., the accounting server 120 may calculate a handicap value to be applied to the user of the other wand 125B to increase/decrease a time period to perform one or more gestures for casting spells, increase/decrease an ROE 130B associated with the other wand 125B, increase/decrease a spell output intensity for spells cast using the other wand 125B, increase/decrease a threshold degree of similarity for the other wand 125B, and/or the like. The handicap values and the methods for calculating the handicap values are not limited to the aforementioned examples, and may be based on various user profile information, various game design choices, and/or various gameplay related rules/criteria.

Referring back to FIG. 14, at operation 1804, the computing device 105A may start a first timer and/or a second timer. The first timer may be a timer used to track the first time period for activating one or more second device as defined at operation 1530 and the second timer may be a timer used to track the second time period for performing one or more gestures of a spell as defined at operation 1570.

Any suitable methods for implementing a timer may be used to implement the first timer and the second timer.

At operation 1806, the computing device 105A may determine a position of the wand 125A relative to one or more second devices according to the various example embodiments described herein. At operation 1808, the computing device 105A may determine whether the position of the wand 125A relative to one or more second devices proximate to or otherwise within a defined position of one or more of the second devices delineated by the order received at operation 1802. If at operation 1808 the computing device 105A determines that the wand 125A is not within the defined position of one or more second devices, then the computing device 105A may proceed to operation 1824 to issue first instructions and/or second instructions indicating a quest obstruction, which is described in detail below. In other embodiments, instead of proceeding to operation 1824, the computing device 105A may proceed to operation 1806 to determine a new position of the wand 125A and then determine if the new position of the wand is within a defined position relative to one or more second devices. If at operation 1808 the computing device 105 determines that the wand 125A is within the defined position of one or more second devices, then the computing device 105A may proceed to operation 1810 to determine whether the one or more second devices proximate to the wand 125A correspond to any of the second devices delineated by the order.

At operation 1810, the computing device 105A may determine whether the one or more second devices proximate to the wand 125A correspond to any of the second devices delineated by the order. If at operation 1810, the computing device 105A determines that the one or more second devices proximate to the wand 125A do not correspond to any of the second devices delineated by the order, then the computing device 105A may proceed to operation 1824 to issue first instructions and/or second instructions indicating a quest obstruction, which is described in detail below. If at operation 1810, the computing device 105A determines that the one or more second devices proximate to the wand 125A correspond to the second devices delineated by the order, then the computing device 105A may proceed to operation 1812 to obtain a second spell sequence indicative of one or more second gestures performed by the user using the wand 125A.

At operation 1812, the computing device 105A may obtain a second spell sequence indicative of one or more second gestures performed by the user using the wand 125A according to the various embodiments disclosed herein. At operation 1814, the computing device 105A may determine a second matching spell of the plurality of spells, which is described with regard to FIGS. 15-17. The second matching spell may include any spell that is cast upon one or more second devices and/or the other wand 125B during the quest. It should be noted that the term "second matching spell" used herein may refer to any one or more spells that are cast after the quest initiation spell. Thus, the second matching spell may include any number of spells that are cast during a quest, and such spells may be labeled according to an order in which they are cast, such as a third matching spell, fourth matching spell, etc. The term second matching spell should not be interpreted as being limited to a single spell or a single spell that is to be cast directly after the first matching spell. Furthermore, the second matching spell may include a quest termination spell used to terminate the quest or a quest pause spell used to pause the quest.

Figure 16:
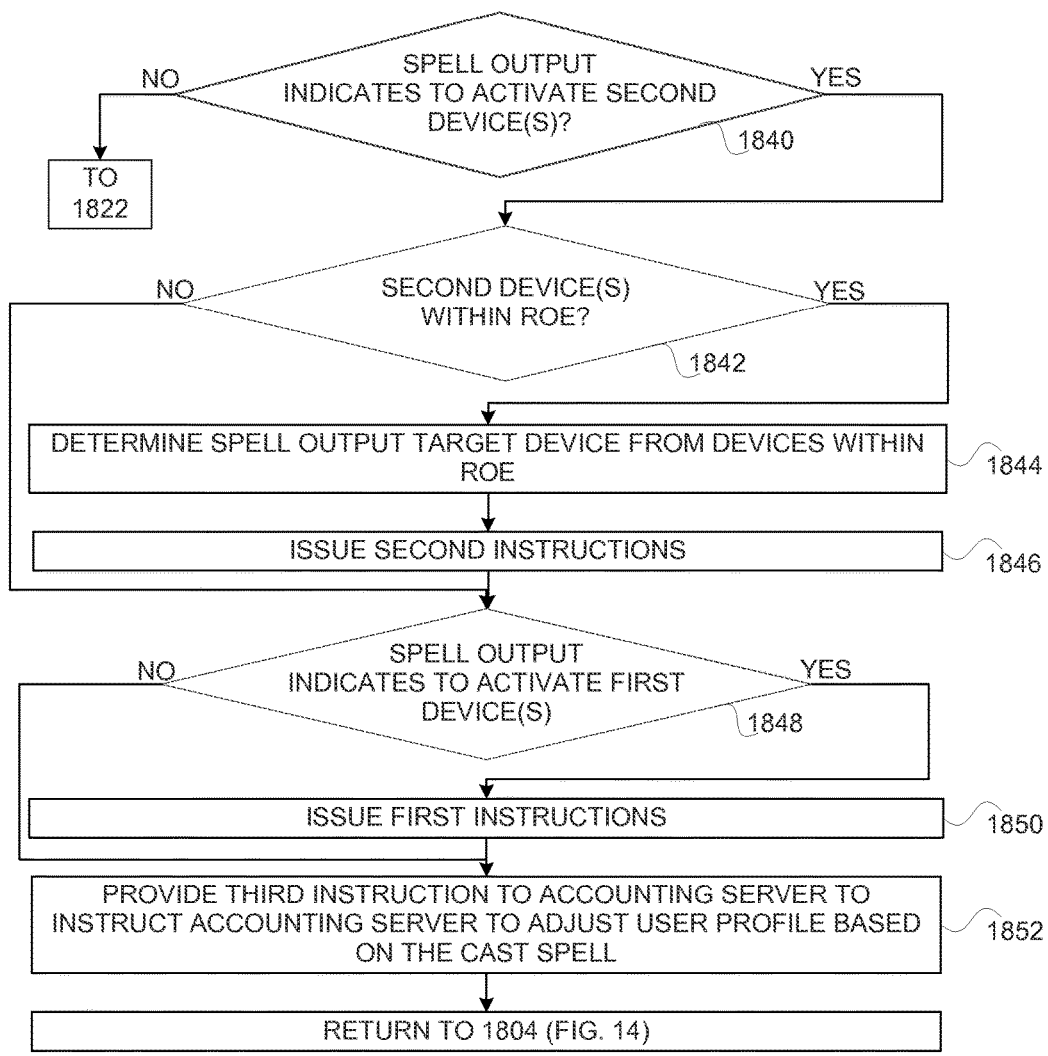
Figure 17:
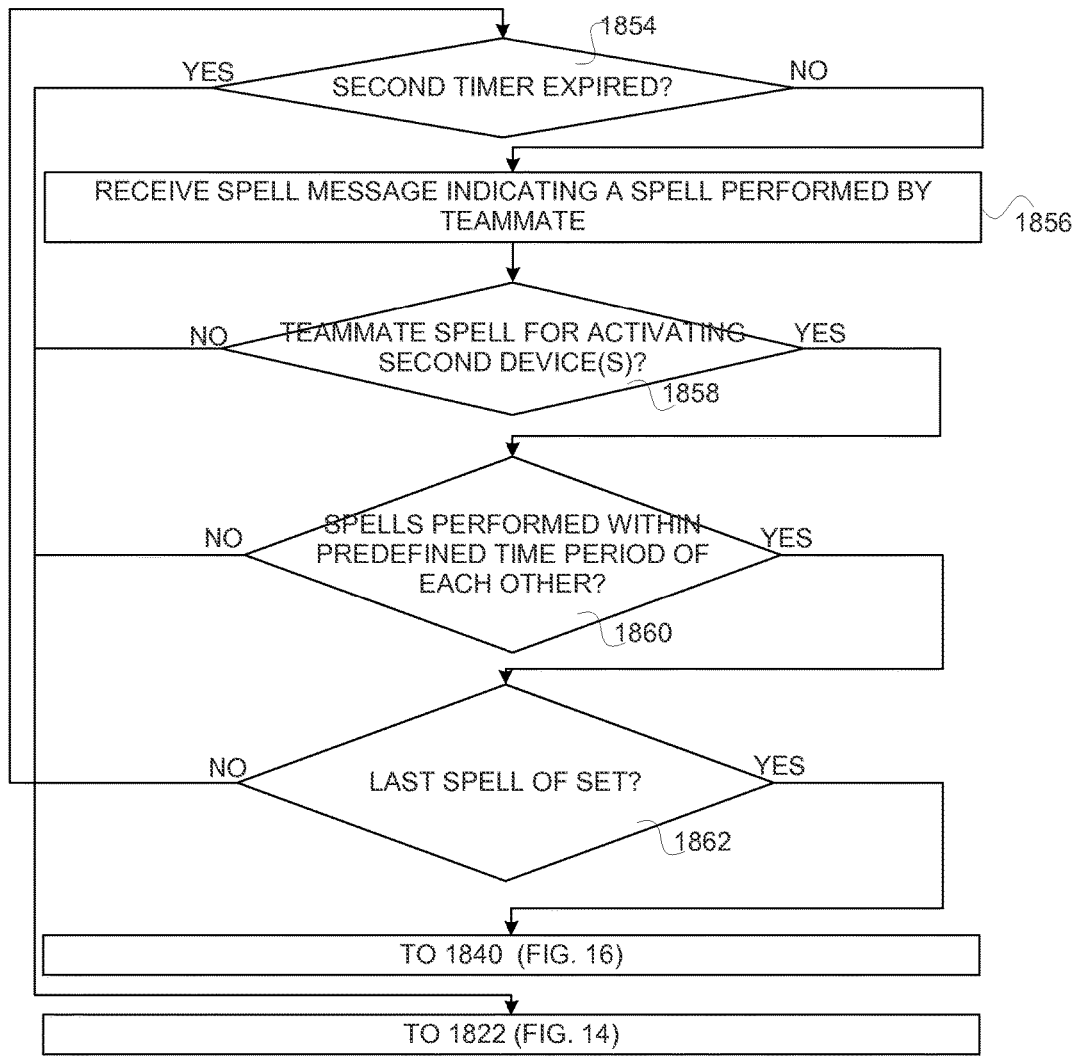

After the performance of the various operations discussed with regard to FIGS. 15-17, the computing device 105A may proceed to operation 1816 to determine if the first timer has expired. If at operation 1816 the computing device 105A determines that the first timer has expired, then the computing device 105A may proceed to operation 1824 to issue first instructions and/or second instructions indicating a quest obstruction, which is described in detail below. If at operation 1816 the computing device 105A determines that the first timer has not expired, then the computing device 105A may proceed to operation 1818 to broadcast a spell message indicative of a wand identifier (ID) and the spell cast by the wand 125A to the one or more proximate second devices. The spell message may be broadcast according to the various example embodiments discussed herein. Such a spell message may include spell information, such as the spell performed by the wand 125A, a spell output of the spell, timing information associated with the spell, a spell type, and/or spell output type, point/health/virtual property values attributable to the spell, handicap information associated with the wand user, and/or other like information.

At operation 1818, the computing device 105A may broadcast a spell message indicative of a wand identifier (ID) and the spell cast by the wand 125A to the one or more proximate second devices. The spell message may be broadcast or transmitted to the one or more proximate second devices according to the various example embodiments discussed herein. Such a spell message may include spell information, such as the spell performed by the wand 125A, a spell output of the spell, timing information associated with the spell, a spell type, and/or spell output type, point/health/virtual property values attributable to the spell, handicap information associated with the wand user, and/or other like information. The each proximate second device may receive the spell message, extract the information from the spell message, and provide the information from the spell message to the accounting server 120 to indicate whether the proximate second device was accessed or activated.

In embodiments where the spell to activate the proximate second device(s) is a teammate participation spell, the computing device 105A may transmit the spell message to one or more teammate wands prior to broadcasting the spell message to the proximate second device(s), and receive spell messages from the one or more teammate wands. The spell messages received from the one or more teammate wands may include the same or similar information as the broadcast spell message. The computing device 105A may then extract information from the received spell messages and include that information in the spell message to be broadcast. Accordingly, in some embodiments, the spell message may also include spell information associated with teammate participants, such as a wand ID of a wand 125 used by the teammate participant, a spell performed by a teammate wand (e.g., other wand 125B) (also referred to as an "teammate spell"), a spell output of the teammate spell, timing information associated with the teammate spell, spell type and/or spell output type of the teammate spell, point/health/virtual property values attributable to the teammate spell, handicap information associated with the teammate participant or teammate spell, and/or other like information. In such embodiments, the wand 125A may be considered a "team leader," which aggregates all of the spell information of each teammate participant and transmits that information to the second devices and/or the accounting server 120. In other embodiments, instead of have a team leader, each wand 125 may broadcast their own spell message to a second device, which may aggregate the spell information associated with each teammate wand for transmission to the accounting server 120.

At operation 1820, the computing device 105A may provide a third instruction to the accounting server 120. The third instruction may include the spell information included with the spell message discussed with regard to operation 1818. In response to receiving the third instruction, the accounting server 120 may alter the user profile associated with the user of wand 125A. In addition, the accounting server 120 may also receive some or all of the spell information from the proximate second device(s) and/or teammate participants based on the spell messages communicated at operation 1818. Thus, in some embodiments, the accounting server 120 may alter the user profile associated with the user of wand 125A only after the accounting server 120 receives an indication from the proximate second device(s) and/or any teammate computing devices regarding the spell output applied to the proximate second device(s). In this way, the spell information provided by the proximate second device(s) and/or teammate participants may act as a confirmation of the information contained in the third instruction.

At operation 1822, the computing device 105A may issue first instructions and/or second instructions indicating a quest obstruction. A quest obstruction may indicate any type of obstruction or obstacle in continuing with a quest. Such obstructions may be based on a user actions or external factors, such as failure to perform gestures properly or gestures missing from a spell sequence, the user having insufficient authorization to perform a spell (e.g., a wand 125 is not authorized to perform the spell or obtain the spell output), the performance of a spell was done at an unauthorized location and/or spatial coordinates, the performance of a spell was done at a location and/or spatial coordinates outside of a define position specified by the order, the user has insufficient game play property/points for performing the spell or obtaining the spell output, the performance of the spell is impossible due to environmental interference, a game play parameter item in the gaming environment 100 is interfering with the spell, expiration of the first timer or the second timer, the user attempting to activate a second device that is not defined by the order or out of turn, and the like. In some embodiments, such first instructions and/or second instructions may simply indicate the obstruction by emitting a tone, light sequence, etc., while in other embodiments, such first instructions and/or second instructions may include an audio, text-based, or image-based message indicating the specific obstruction.

Referring now to FIG. 15 which describes operation 1814 in accordance with various embodiments. At operation 1826, the computing device 105A may determine whether the second spell sequence matches any of the defined spell sequences of the plurality of spell sequences. If at operation 1826, the computing device 105A determines that the spell sequence matches at least one of the defined spell sequences of the plurality of spell sequences, then the computing device 105A may proceed to operation 1830 to determine whether the second matching spell is similar to a quest termination spell or a quest pause spell. If at operation 1826, the computing device 105A determines that the spell sequence does not match at least one of the defined spell sequences of the plurality of spell sequences, then the computing device 105A may proceed to operation 1828 to determine whether a degree of similarity is greater than or equal to a threshold.

At operation 1828, the computing device 105A may determine whether a degree of similarity is greater than or equal to a threshold. The degree of similarity may indicate a number and/or order of operations of the spell sequence that matches a number and order of operations of the defined spell sequence. For example, if a defined spell sequence requires a user to perform desired number of gestures in a specific sequence, and the user performs one or fewer (or one or more) of the defined gestures, the degree of similarity may be represented as a character or integer indicating the amount of the gestures that were performed. In some embodiments, the degree of similarity may be represented as a ratio of the number of performed gestures to the number of defined gestures. In some embodiments, the degree of similarity may indicate whether one or more gestures were performed out of order. In various embodiments, the threshold may be a desired or predetermined number and/or sequence of gestures set according to one or more game design choices. If at operation 1828, the computing device 105A determines that the degree of similarity is less than the threshold, then the computing device 105A may proceed to operation 1822 to issue first instructions and/or second instructions indicating a quest obstruction. If at operation 1828, the computing device 105A determines that the degree of similarity is greater than or equal to a threshold, which indicates a second matching spell of the plurality of spells, then the computing device 105A may proceed to operation 1830 to determine whether the second matching spell is substantially similar to a quest termination spell or a quest pause spell. Such a determination may be performed in a same or similar manner as described with regard to operation 1720. If at operation 1830 the computing device 105A determines that the second matching spell is substantially similar to the quest terminal spell, then the computing device 105A may proceed to operation 1831 to end the quest. In various embodiments, the computing device 105A may then proceed to operation 1820 to provide a third instruction to the accounting server 120 to terminate its accounting of the quest. If at operation 1830 the computing device 105A determines that the second matching spell is substantially similar to the quest pause spell, then the computing device 105A may proceed to operation 1831 to pause the quest. In various embodiments, the computing device 105A may then proceed to operation 1820 to provide a third instruction to the accounting server 120 to pause accounting for the quest. In various embodiments, the user of the wand 125A may perform a quest initiation spell to resume the quest at a point in which the quest was paused. If at operation 1830 the computing device 105A determines that the second matching spell is not substantially similar to the quest terminal spell or the quest pause spell, then the computing device 105A may proceed to operation 1832 to determine the ROE 130A and a spell output intensity of the second matching spell and/or associated with a user of the wand 125A.

At operation 1832, the computing device 105A may determine a ROE 130 and a spell output intensity of the matching spell and/or associated with a user of the wand. As described herein, a spell output may be associated with a defined ROE, and in some embodiments, the ROE 130A may be based on a user profile associated with a user of the wand 125A and/or various game play parameters. Thus, at operation 1832, the computing device 105A may determine the ROE 130A based on the defined ROE and the information contained in the user profile. The ROE 130A may be set according to various calculations and/or game play parameters. For example, in some embodiments, the ROE 130A defined by the user profile may be weighted or more heavily favored than the defined spell output ROE 130A, or vice versa. In some embodiments, the ROE 130A may be adjusted or altered according to a handicapping value as described previously. Additionally, in some embodiments, at operation 1832, the ROE 130A may be increased or decreased according to various device parameters (e.g., battery usage, memory fragmentation, processor speeds, and the like) as described herein.

At operation 1834, the computing device 105A may determine whether one or more auxiliary devices 101 are proximate to the wand 125A. The computing device 105A may determine whether one or more auxiliary devices are proximate to the wand 125A according to the position determination and/or triangulation methods discussed herein. If at operation 1834, the computing device 105A determines that one or more auxiliary devices 101 are proximate to the wand 125A, the computing device 105A may proceed to operation 1836 to adjust the ROE 130A, spell output, spell output intensity, etc., based on the auxiliary device identifier(s) of the one or more auxiliary devices 101 that are proximate to the wand 125A. If at operation 1834, the computing device 105A determines that one or more auxiliary devices 101 are not proximate to the wand 125A, the computing device 105A may proceed to operation 1838 to adjust the ROE 130A, spell output, spell output intensity, etc., based on the handicap value associated with the wand 125A.

Once the ROE 130A, spell output, spell output intensity, etc., are adjusted, at operation 1839, the computing device 105A may determine whether any teammates are participating in the quest. This determination may be based on whether any quest initiation messages where received from any teammate participants at operation 1725 and the determination described with regard to operation 1735. If at operation 1839 the computing device 105A determines that teammates are participating in the quest, the computing device may proceed to operation 1854, which is discussed with regard to FIG. 17. If at operation 1839 the computing device 105A determines that no teammates are participating in the quest, the computing device may proceed to operation 1840, which is discussed with regard to FIG. 16.

Referring to FIG. 16, at operation 1840, the computing device 105A may determine whether the spell output of the second matching spell indicates to activate the one or more proximate second devices. If at operation 1840, the computing device 105A determines that the spell output of the matching spell does not indicate to activate the one or more proximate second devices, then the computing device 105A may proceed to operation 1822 to issue first instructions and/or second instructions indicating a quest obstruction. If at operation 1840, the computing device 105A determines that the spell output of the second matching spell indicates to activate the one of the one or more proximate second devices, then the computing device 105A may proceed to operation 1842 to determine whether the one or more second devices indicated by the spell output are within the ROE 130A.

At operation 1842, the computing device 105A may determine whether one or more proximate second devices are within the ROE 130A. The computing device 105A may determine whether the one or more proximate second devices are within the ROE 130A according to the various example embodiments discussed previously. If at operation 1842, the computing device 105A determines that one or more proximate second devices are not within the ROE 130A, the computing device 105A may proceed to operation 1848 to determine whether the spell output of the matching spell indicates to activate the one or more first devices 215 of the wand 125A. If at operation 1842, the computing device 105A determines that one or more proximate second devices are within the ROE 130A, the computing device 105A may proceed to operation 1844 to determine a spell output target device from among the one or more proximate second devices within the ROE 130A (if necessary).

At operation 1844, the computing device 105A may determine a spell output target device from among the one or more proximate second devices within the ROE 130A according to the position determination methods and/or triangulation methods described herein. At operation 1846, the computing device 105A may cast the second matching spell by issuing one or more second instructions to the one or more proximate second devices according to the various example embodiments disclosed herein.

At operation 1848, the computing device 105A may determine whether the spell output indicates to activate one or more first devices 215 of the wand 125A. If at operation 1848, the computing device 105A determines that the spell output of the matching spell indicates to activate one or more first devices 215, the computing device 105A may proceed to operation 1850 to cast the matching spell by issuing one or more first instructions to the one or more first devices 215 indicated by the spell output of the second matching spell. If at operation 1848, the computing device 105A determines that the spell output of the matching spell does not indicate to activate one or more first devices 215, the computing device 105A may proceed to operation 1852 to instruct the accounting server 120 to adjust a user profile of the user of the wand 125A to reflect the casting of the spell.

At operation 1852, the computing device 105A may instruct the accounting server 120 to adjust a user profile of the user of the wand 125A to reflect the casting of the spell, such that the user profile reflects the issuance of the first instructions and/or the second instructions. In various embodiments, the accounting server 120 may reduce/increase a user's game play points/property according to the cast spell, record the timing information associated with the access or activation of the one or more proximate second devices, post the aforementioned information to a geocaching listing site, provide the aforementioned information to a third-part communication platform for broadcasting, and the like. In some embodiments, the computing device 105A may adjust the user profile and provide the updated/adjust user profile to the accounting server 120. After the computing device 105A performs operation 1852, the computing device 105A may return back to operation 1804 to restart the first timer for accessing a next second device according to the order.

Referring back to FIG. 15, if at operation 1839, the computing device 105A determines that there are teammates participating in the quest, the computing device 105A may proceed to operation 1854, which is described with regard to FIG. 17. Referring now to FIG. 17, at operation 1854, the computing device may determine whether the second timer has expired. If at operation 1854 the computing device determines that the second timer has expired, then the computing device 105A may proceed to operation 1822 to issue first instructions and/or second instructions indicating a quest obstruction. If at operation 1854 the computing device determines that the second timer has not expired, then the computing device 105A may proceed to operation 1856 to issue first instructions and/or second instructions indicating a quest obstruction.

At operation 1856, the computing device 105A may receive a spell message (also referred to as a "spell indication") indicating a spell performed by a participating teammate (herein referred to as a "teammate spell"). Such a participating teammate may be a user that operates a wand 125 and/or a computing device 105 according to the example embodiments disclosed herein. The spell message may be received according to the various example embodiments discussed herein, such as by receiving a signal broadcast by a teammate's wand and/or computing device, which includes the spell message. Such a spell message may include spell information, such as the spell performed by the teammate, a spell output of the teammate spell, timing information associated with the teammate spell, spell type and/or spell output type of the teammate spell, whether the spell type of the teammate spell is combinable with other spell types, point/health/virtual property values attributable to the teammate spell, handicap information associated with the teammate or teammate spell, and/or other like information.

At operation 1858, the computing device 105A may determine whether the teammate spell is for activating the one or more proximate second devices as delineated by the order. Such a determination may include a comparison of the spell information of the teammate spell with the spell information of the second matching spell, and determining whether both spells were performed according to the defined spell for activating the one or more proximate second devices. If at operation 1858, the computing device 105A determines that the teammate spell is not for activating the one or more proximate second devices, then the computing device 105A may proceed to operation 1822 to issue first instructions and/or second instructions indicating a quest obstruction. If at operation 1858, the computing device 105A determines that the teammate spell is for activating the one or more proximate second devices, then the computing device 105A may proceed to operation 1860 to determine whether the spell performed by the participating teammate(s) were performed within a predefined period of time of the second matching spell.

At operation 1860, the computing device 105A may determine whether the spell performed by the participating teammate(s) was performed within a predefined period of time of the second matching spell. Such a timer period may refer to the third time period as discussed above. The determination of whether the spells are performed within the third period of time may be based on a comparison of the timing information associated with the teammate spell with the timing information of the second matching spell, as discussed previously. If at operation 1860, the computing device 105A determines that the spell performed by the participating teammate(s) was not performed within a predefined period of time of the second matching spell, the computing device 105 may proceed to operation 1822 to issue first instructions and/or second instructions indicating a quest obstruction. If at operation 1860, the computing device 105A determines that the spell performed by the participating teammate(s) was performed within a predefined period of time of the second matching spell, the computing device 105 may proceed to operation 1862 to determine whether the second matching spell and/or the teammate spell are the last spells to be performed for accessing and/or activating the one or more proximate second devices. If at operation 1862, the computing device 105A determines that the second matching spell and/or the teammate spell are not the last spells to be performed for accessing and/or activating the one or more proximate second devices, then the computing device 105 may proceed to operation 1854 to determine whether the second timer has expired. If at operation 1862, the computing device 105A determines that the second matching spell and/or the teammate spell are the last spells to be performed for accessing and/or activating the one or more proximate second devices, then the computing device 105 may proceed to operation 1840 to determine whether the spell output associated with the second matching spell and the teammate spell indicates to activate the one or more proximate second devices.

As described herein, the example embodiments provide apparatuses, systems, and methods for providing immersive interactive gaming experiences using a handheld user interface device. Example embodiments provide that the handheld user interface devices may utilize already existing/deployed output devices and/or already existing gaming platforms to provide gaming feedback to a user. Thus, the described embodiments are not tied to a specific proprietary platform and/or a specific physical/virtual environment.

Some non-limiting Examples are provided below.

Example 1 may include a wand comprising one or more sensors, communicatively coupled with at least one processor, to detect one or more gestures wherein the one or more gestures are movements performed using the wand by a user of the wand, and generate sensor data representative of the one or more gestures; a device interface module to operate on the at least one processor to obtain, from the one or more sensors, the sensor data representative of the one or more gestures; a spell module to operate on the at least one processor to receive, from the device interface module, the sensor data representative of the one or more gestures, and convert the sensor data representative of the one or more gestures into a spell sequence; and a wand communication module, communicatively coupled with the at least one processor, to transmit the spell sequence to a computing device, and receive, from the computing device, a spell output based on the spell sequence, a wand position, and a quest, wherein the quest indicates an order in which one or more second devices are to be activated and one or more spells to activate each of the one or more second devices.

Example 2 may include the wand of example 1 and/or any other one or more examples disclosed herein, wherein the spell module is to record the sensor data representative of the one or more gestures during a period of time, and convert the sensor data representative of the one or more gestures performed during the period of time into the spell sequence, and the sensor data representative of the one or more gestures performed outside of the period of time are excluded from the spell sequence or included in another spell sequence.

Example 3 may include the wand of example 1 and/or any other one or more examples disclosed herein, wherein the receipt of the spell output is based on a determination of a spell from a plurality of spells based on the spell sequence wherein each of the plurality of spells is associated with a defined spell sequence; a determination, based on the quest, as to whether the determined spell is to be used for activation of a second device of the one or more second devices; a determination of a spell output associated with the determined spell based on whether the determined spell is to be used for activation of the second device or not; wherein receipt of the spell output includes receipt of a message that indicates the determined spell output, and wherein the computing device is to provide a third instruction to an accounting server for alteration of a user profile associated with the user wherein the third instruction is based on the determined spell output or the spell sequence.

Example 4 may include the wand of example 3 and/or any other one or more examples disclosed herein, wherein the determination of the spell is based on a comparison of the spell sequence with the defined spell sequence for each of the plurality of spells; a determination of a degree of similarity between the spell sequence and the defined spell sequence of each of the plurality of spells, wherein the degree of similarity indicates a number and order of operations of the spell sequence that matches a number and order of operations of the defined spell sequence; and a selection of the spell wherein the selected spell has a greatest degree of similarity among the plurality of spells.

Example 5 may include the wand of example 4 and/or any other one or more examples disclosed herein, the wherein receipt of the spell output is further based on a wand position relative to the one or more second devices, and a determination of the wand position relative to the one or more second devises, a determination of a spell output target device based on the wand position and a wand orientation wherein the spell output target device is at least one of the one or more second devices to which the wand is directed by the user; and a determination of a spell output intensity based on a distance between the wand position and a position of the spell output target device, wherein the spell output intensity indicates an intensity at which the one or more second devices are to be activated.

Example 6 may include the wand of example 5 and/or any other one or more examples disclosed herein, wherein the determination of the distance between the wand position and the position of the spell output target device is based on an obtained a signal broadcast by the spell output target device; at least one data packet extracted from the obtained signal wherein the data packet includes an identifier that indicates at least a device position of the one or more second devices; and a determination of the distance between the wand position and the position of the spell output target device is based on the device position from the extracted data packet.

Example 7 may include the wand of example 6 and/or any other one or more examples disclosed herein, wherein the one or more sensors includes an infrared (IR) signal generator to generate and emit an IR signal and an IR capture device to capture the IR signal when the IR signal is reflected off the one or more second devices, and the sensor data includes a round trip time (RTT) including a time the IR signal is emitted from the IR signal generator and captured by the IR capture device, and wherein the RTT is to be used to determine the distance between the wand position and the position of the spell output target device using the RTT, and wherein the spell output indicates to activate one or more first devices of the wand.

Example 8 may include the wand of any one of examples 6 or 7 and/or any other one or more examples disclosed herein, wherein the one or more sensors include at least an accelerometer, a geomagnetic sensor, and a gyroscope, to provide spatial coordinates of the wand and the sensor data further includes the spatial coordinates of the wand to be used for a determination of the wand orientation, and wherein one of the one or more second devices to which the wand is directed is to determined based on the wand orientation.

Example 9 may include the wand of example 5 and/or any other one or more examples disclosed herein, wherein the spell output intensity is also based on the degree of similarity such that an increase in the degree of similarity is to provide an increase in the spell output intensity and a decrease in the degree of similarity is to provide a decrease in the spell output intensity, and wherein the quest defines, for each of the one or more second devices, a threshold degree of similarity for each of the plurality of spells such that the determined spell is cast when the degree of similarity greater than or equal to the threshold degree of similarity.

Example 10 may include the wand of example 9 and/or any other one or more examples disclosed herein, wherein the order in which the one or more second devices are to be activated is to be altered when the degree of similarity is less than the threshold degree of similarity or a spell of the one or more spells to activate a next one of the one or more second devices is to be altered when the degree of similarity is less than the threshold degree of similarity, wherein to alter the order includes at least one of a rearrangement of the order or an addition of another second device to the one or more second devices, and wherein to alter the spell includes a rearrangement of the order of operations of a spell sequence of the spell to activate the next second device or an addition of another gesture to the spell sequence of the spell to activate the next second device.

Example 11 may include the wand of any one of examples 9 or 10 and/or any other one or more examples disclosed herein, wherein the quest further defines a first time period, wherein the first time period is an amount of time the user is to activate each of the one or more second devices, a set of spells to be performed for activation of each of the one or more second devices, and a spell order wherein the spell order indicates an order in which each of the set of spells is to be performed.

Example 12 may include the wand of example 11 and/or any other one or more examples disclosed herein, wherein the quest further defines that a plurality of wands are to perform the set of spells wherein the wand is one of the plurality of wands and, for each of the one or more second devices, the quest defines that at least one of the set of spells is to be performed by the user using the wand and another one of the set of spells is to be performed by another user using another wand of the plurality of wands, at least one of the set of spells is to be performed by the user using the wand and another one of the set of spells is to be performed by the other user using the wand, or at least one of the set of spells is to be performed by the user using the other wand and another one of the set of spells is to be performed by the other user using the other wand.

Example 13 may include the wand of example 12 and/or any other one or more examples disclosed herein, wherein the quest further defines a plurality of second time periods corresponding to each of the set of spells wherein each of the plurality of second time periods defines an amount of time in which to perform each of the set of spells such that a sum of the plurality of time periods is equal to the first time period, wherein at least one of the plurality of second time periods is different from another one of the plurality of second time periods or each of the plurality of second time periods are equal.

Example 14 may include the wand of example 13 and/or any other one or more examples disclosed herein, wherein at least one of the plurality of wands is associated with a handicap value, and one of the plurality of second time periods is adjusted based on the handicap value or the threshold degree of similarity is adjusted based on the handicap value.

Example 15 may include a computer-implemented method for creating a quest, the method comprising defining, by a computing device, the quest indicating an order in which one or more second devices are to be activated and one or more spells to cast to activate each of the one or more second devices; and providing, by the computing device, the quest to a wand for commencement of the quest, wherein the defining the quest comprises selecting, by the computing device, each of the one or more second devices to define the order; defining, by the computing device, one or more gestures to be performed to activate each of the one or more second devices, wherein the one or more gestures are movements performed by a user using the wand; defining, by the computing device, a spell output to be associated with the one or more gestures and a wand position relative to each of the one or more second devices, wherein the spell output indicates at least one of a first instruction for activating one or more first devices and a second instruction for activating each of the one or more second devices; generating, by the computing device, a defined spell sequence for each of the one or more second devices based on the defined one or more gestures; and storing, by the computing device, the defined spell sequence for each of the one or more second devices in association with the defined spell output.

Example 16 may include the method of example 15 and/or any other one or more examples disclosed herein, further comprising defining a third instruction based on the defined spell output or the defined spell sequence wherein the third instruction instructs an accounting server to alter a user profile associated with the user according to the defined spell output or the defined spell sequence.

Example 17 may include the method of example 15 and/or any other one or more examples disclosed herein, further comprising defining a region of effect for the defined spell output for each of the one or more second devices, wherein the region of effect defines an area in which the spell output is to be applied to the one or more second devices within the area wherein a spell output intensity is based on a position of the one or more second devices within the region of effect wherein the spell output intensity indicates an intensity at which the one or more first devices and the one or more second device are to be activated; and defining a threshold degree of similarity for the generated spell sequence or the defined spell output, wherein the threshold degree of similarity indicates a minimum number and order of operations of the generated spell sequence required to be performed to obtain the defined spell output wherein the threshold degree of similarity is less than or equal to a maximum number and order of operations of the generated spell sequence.

Example 18 may include the method of example 17 and/or any other one or more examples disclosed herein, wherein a size and shape of the region of effect is adjusted according to a handicap value associated with a user profile associated with the user.

Example 19 may include the method of example 15 and/or any other one or more examples disclosed herein, wherein the defining the quest further comprises defining, by the computing device, a first time period for activating each of the one or more second devices, and the generating the defined spell sequence for each of the one or more second devices is further based on the defined first time period.

Example 20 may include the method of example 19 and/or any other one or more examples disclosed herein, wherein the defining the quest further comprises defining a plurality of wands that are permitted to perform the one or more gestures to activate the one or more second devices, wherein the wand is one of the plurality of wands.

Example 21 may include the method of example 19 and/or any other one or more examples disclosed herein, wherein the defining the quest further comprises defining, for at least one second device of the one or more second devices, a set of spells to be performed to activate the at least one second device; and defining a spell order wherein the spell order indicates an order in which each of the set of spells is to be performed.

Example 22 may include the method of example 20 and/or any other one or more examples disclosed herein, wherein the defining the quest further comprises defining a plurality of wands that are permitted to perform the set of spells, wherein the wand is one of the plurality of wands, and wherein defining the spell order includes defining an order for performance of each spell of the set of spells and a corresponding wand of the plurality of wands to perform each spell of the set of spells.

Example 23 may include the method of example 22 and/or any other one or more examples disclosed herein, wherein the defining the quest further comprises defining a plurality of second time periods corresponding to each spell of the set of spells wherein each of the plurality of second time periods defines an amount of time in which to perform each spell of the set of spells, wherein at least one of the plurality of second time periods is different from another one of the plurality of second time periods or each of the plurality of second time periods are equal; defining a plurality of threshold degrees of similarity corresponding to each spell of the set of spells wherein at least one of the plurality of threshold degrees of similarity is different from another one of the plurality of threshold degrees of similarity or each of the plurality of threshold degrees of similarity are equal; and defining a plurality of wand positions corresponding to each of spell of the set of spells wherein at least one of the plurality of wand positions is different from another one of the plurality of wand positions or each of the plurality of positions are equal.

Example 24 may include the method of example 23 and/or any other one or more examples disclosed herein, wherein each of the plurality of second time periods includes a defined start time wherein at least one of the defined start times is different than another one of the defined start times or at least one of the defined start times is a same time as another one of the defined start times.

Example 25 may include the method of example 23 and/or any other one or more examples disclosed herein, wherein at least one wand of the plurality of wands is associated with a handicap value, and the defining the quest further comprises defining an adjustment value based on the handicap value wherein a second time period of the plurality of second time periods corresponding to the at least one wand is adjusted by the adjustment value or the threshold degree of similarity associated with the at least one wand is adjusted by the adjustment value.

Example 26 may include the method of example 15 and/or any other one or more examples disclosed herein, wherein the defining the quest further comprises defining a handicap value to be associated with the user based on a user profile associated with the user, wherein the user profile comprises demographic information associated with the user, subscription information associated with the user, virtual property associated with the user.

Example 27 may include the method of example 15 and/or any other one or more examples disclosed herein, wherein the computing device resides within a client computing device, and the quest is defined using one or more graphical control elements within a webpage.

Example 28 may include the method of example 15 and/or any other one or more examples disclosed herein, wherein the computing device resides in the wand, and wherein the one or more gestures to be performed are defined by performing the one or more gestures using the wand at each wand position relative to each of the one or more second devices, and the spell output to be associated with the one or more gestures is defined by at least activating the one or more second devices after or before performance of the one or more gestures.

Example 29 may include at least one non-transitory, computer-readable medium including instructions to cause a computing device, in response to execution of the instructions by the computing device, to perform the method of examples 15-28 and/or any other one or more examples disclosed herein.

Example 30 may include a wand comprising one or more sensors, communicatively coupled with at least one processor, to detect one or more gestures wherein the one or more gestures are movements performed using the wand by a user of the wand, and generate sensor data representative of the one or more gestures; a device interface module to operate on the at least one processor to obtain, from the one or more sensors, the sensor data representative of the one or more gestures; a spell module to operate on the at least one processor to receive, from the device interface module, the sensor data representative of the one or more gestures, and convert the sensor data representative of the one or more gestures into a spell sequence, wherein the spell module includes a spell determination module to determine a spell from a plurality of spells based on the spell sequence wherein each of the plurality of spells is associated with a defined spell sequence, determine a spell output associated with the determined spell and based on a wand position, and provide the spell output by way of at least one of a first instruction to the device interface module to activate one or more first devices and a second instruction to a wand communication module to activate one or more second devices; and a wand communication module, communicatively coupled with the at least one processor, to receive, from a computing device, a quest that indicates an order in which one or more second devices are to be activated and one or more spells to activate each of the one or more second devices, and receive, from the spell determination module, a spell output based on the spell sequence, a wand position, and the quest.

Example 31 may include the wand of example 30 and/or any other one or more examples disclosed herein, wherein the spell module is to record the sensor data representative of the one or more gestures during a period of time, and convert the sensor data representative of the one or more gestures performed during the period of time into the spell sequence, and the sensor data representative of the one or more gestures performed outside of the period of time are excluded from the spell sequence or included in another spell sequence.

Example 32 may include the wand of example 30 and/or any other one or more examples disclosed herein, wherein the spell determination module is to determine a spell from a plurality of spells based on the spell sequence wherein each of the plurality of spells is associated with a defined spell sequence; determine, based on the quest, whether the determined spell is to be used for activation of a second device of the one or more second devices; determine a spell output associated with the determined spell based on whether the determined spell is to be used for activation of the second device or not; provide a message that indicates the determined spell output; and provide a third instruction to an accounting server for alteration of a user profile associated with the user wherein the third instruction is based on the determined spell output or the spell sequence.

Example 33 may include the wand of example 32 and/or any other one or more examples disclosed herein, wherein to determine the spell, the spell determination module is to compare the spell sequence with the defined spell sequence for each of the plurality of spells; determine a degree of similarity between the spell sequence and the defined spell sequence of each of the plurality of spells, wherein the degree of similarity indicates a number and order of operations of the spell sequence that matches a number and order of operations of the defined spell sequence; and select the spell wherein the selected spell has a greatest degree of similarity among the plurality of spells.

Example 34 may include the wand of example 33 and/or any other one or more examples disclosed herein, wherein the spell determination module is to determine a wand position relative to the one or more second devices, and to determine the wand position relative to the one or more second devise, the spell determination module is to determine a spell output target device based on the wand position and a wand orientation wherein the spell output target device is at least one of the one or more second devices to which the wand is directed by the user; and determine a spell output intensity based on a distance between the wand position and a position of the spell output target device, wherein the spell output intensity indicates an intensity at which the one or more second devices are to be activated.

Example 35 may include the wand of example 34 and/or any other one or more examples disclosed herein, wherein to determine the distance between the wand position and the position of the spell output target device, the spell determination module is to obtain a signal broadcast by the spell output target device; extract at least one data packet from the obtained signal wherein the data packet includes an identifier that indicates at least a device position of the one or more second devices; and determine the distance between the wand position and the position of the spell output target device using the device position from the extracted data packet.

Example 36 may include the wand of example 35 and/or any other one or more examples disclosed herein, wherein the one or more sensors includes an infrared (IR) signal generator to generate and emit an IR signal and an IR capture device to capture the IR signal when the IR signal is reflected off the one or more second devices, and the sensor data includes a round trip time (RTT) including a time the IR signal is emitted from the IR signal generator and captured by the IR capture device, and wherein the spell determination module is to use the RTT to determine the distance between the wand position and the position of the spell output target device using the RTT, and wherein the spell output indicates to activate one or more first devices of the wand.

Example 37 may include the wand of any of examples 35 or 36 and/or any other one or more examples disclosed herein, wherein the one or more sensors include at least an accelerometer, a geomagnetic sensor, and a gyroscope, to provide spatial coordinates of the wand and the sensor data further includes the spatial coordinates of the wand, wherein the spell determination module is to determine the wand orientation using the spatial coordinates, and wherein to determine the spell output target device, the spell determination module is to determine, based on the wand orientation, one of the one or more second devices to which the wand is directed.

Example 38 may include the wand of example 34 and/or any other one or more examples disclosed herein, wherein the spell output intensity is also based on the degree of similarity such that an increase in the degree of similarity is to provide an increase in the spell output intensity and a decrease in the degree of similarity is to provide a decrease in the spell output intensity, and wherein the quest defines, for each of the one or more second devices, a threshold degree of similarity for each of the plurality of spells such that the determined spell is cast when the degree of similarity greater than or equal to the threshold degree of similarity.

Example 39 may include the wand of example 38 and/or any other one or more examples disclosed herein, wherein the order in which the one or more second devices are to be activated is to be altered when the degree of similarity is less than the threshold degree of similarity or a spell of the one or more spells to activate a next one of the one or more second devices is to be altered when the degree of similarity is less than the threshold degree of similarity, wherein to alter the order includes at least one of a rearrangement of the order or an addition of another second device to the one or more second devices, and wherein to alter the spell includes a rearrangement of the order of operations of a spell sequence of the spell to activate the next second device or an addition of another gesture to the spell sequence of the spell to activate the next second device.

Example 40 may include the wand of any one of examples 38 or 39 and/or any other one or more examples disclosed herein, wherein the quest further defines a first time period, wherein the first time period is an amount of time the user is to activate each of the one or more second devices, a set of spells to be performed for activation of each of the one or more second devices, and a spell order wherein the spell order indicates an order in which each of the set of spells is to be performed.

Example 41 may include the wand of example 40 and/or any other one or more examples disclosed herein, wherein the quest further defines that a plurality of wands are to perform the set of spells wherein the wand is one of the plurality of wands and, for each of the one or more second devices, the quest defines that at least one of the set of spells is to be performed by the user using the wand and another one of the set of spells is to be performed by another user using another wand of the plurality of wands, at least one of the set of spells is to be performed by the user using the wand and another one of the set of spells is to be performed by the other user using the wand, or at least one of the set of spells is to be performed by the user using the other wand and another one of the set of spells is to be performed by the other user using the other wand.

Example 42 may include the wand of example 41 and/or any other one or more examples disclosed herein, wherein the quest further defines a plurality of second time periods corresponding to each of the set of spells wherein each of the plurality of second time periods defines an amount of time in which to perform each of the set of spells such that a sum of the plurality of time periods is equal to the first time period, wherein at least one of the plurality of second time periods is different from another one of the plurality of second time periods or each of the plurality of second time periods are equal.

Example 43 may include the wand of example 42 and/or any other one or more examples disclosed herein, wherein at least one of the plurality of wands is associated with a handicap value, and one of the plurality of second time periods is adjusted based on the handicap value or the threshold degree of similarity is adjusted based on the handicap value.

Example 44 may include a computer-implemented method for initiating a quest, the method comprising obtaining, by a computing device, a first spell sequence indicative of one or more gestures performed by a user; obtaining, by the computing device, a plurality of spells according to a user profile associated with the user; determining, by the computing device, a first matching spell of the plurality of spells by comparing the first spell sequence with the defined spell sequence of each of the plurality of spells; determining, by the computing device, whether the first matching spell is substantially similar to a quest initiation spell; providing, by the computing device, an indication that the quest is to be initiated when the first matching spell is determined to be substantially similar to a quest initiation spell.

Example 45 may include the method of example 44 and/or any other one or more examples disclosed herein, the providing the indication comprises providing a quest acknowledgement to a wand associated with the user and providing the quest acknowledgement to an accounting server.

Example 46 may include the method of example 44 and/or any other one or more examples disclosed herein, wherein, when the first matching spell is determined not to be substantially similar to a quest initiation spell, the method further comprises providing a spell output indicating that the spell will not commence.

Example 47 may include the method of example 44 and/or any other one or more examples disclosed herein, wherein when the first matching spell is determined to be substantially similar to a quest initiation spell, the method further comprises providing a quest initiation message to another wand or another computing devices associated with another user; receiving another quest initiation messages from the other wands or the other computing devices; determining whether another quest initiation spell included in the other quest initiation message is substantially similar to the quest initiation spell; and providing a team-acknowledgement to the other computing device or the other wand indicating that the other wand is part of a team for commencing the quest when the other quest initiation spell is determined to be substantially similar to the quest initiation spell.

Example 48 may include at least one non-transitory, computer-readable medium including instructions to cause a computing device, in response to execution of the instructions by the computing device, to perform the method of examples 44-47 and/or any other one or more examples disclosed herein.

Example 49 may include a computer-implemented method for commencement of a quest, the method comprising obtaining, by a computing device, a quest indicating an order in which one or more second devices are to be activated and one or more defined spells to cast to activate each of the one or more second devices; and starting, by the computing device, a first timer, wherein the first timer is based on a first time period for activating a first-listed second device of the one or more second devices defined by the order; determining, by the computing device, a wand position relative to the first-listed second device; determining, by the computing device, whether the wand position relative to the first-listed second device is within a predefined position for activating the first-listed second device; obtaining, by the computing device, a spell sequence indicative of one or more gestures performed by a user of the wand; determining, by the computing device, a spell based on the spell sequence; determining, by the computing device, whether the determined spell is substantially similar to one of the one or more spells obtained with the quest; and when the first-listed second device is determined to be within the predefined position for activating the first-listed second device, providing, by the computing device, a spell message to the first-listed second device based on the wand position relative to the first-listed second device, wherein the spell message includes a wand identifier associated with the wand and spell information indicative of the determined spell.

Example 50 may include the method of example 49 and/or any other one or more examples disclosed herein, wherein, when the first-listed second device is determined to not be within the predefined position for activating the first-listed second device, the method further comprises: providing a first instruction to activate one or more first devices of the wand, wherein the first instruction is to indicate, by activation of the one or more first devices, that the first-listed second device is determined to not be within the predefined position; or providing a second instruction to activate one or more second devices communicatively coupled with the wand, wherein the second instruction is to indicate, by activation of the one or more communicatively coupled second devices, that the first-listed second device is determined to not be within the predefined position.

Example 51 may include the method of example 49 and/or any other one or more examples disclosed herein, further comprising determining whether the first timer has expired, and wherein, when the first timer is determined to be expired, the method further comprises providing a first instruction to activate one or more first devices of the wand, wherein the first instruction is to indicate, by activation of the one or more first devices, that the first timer has expired; or providing a second instruction to activate one or more second devices communicatively coupled with the wand, wherein the second instruction is to indicate, by activation of the one or more communicatively coupled second devices, that the first timer has expired.

Example 52 may include the method of example 49 and/or any other one or more examples disclosed herein, wherein determining the spell further comprises determining whether the spell sequence matches a defined spell sequence of at least one of the one or more defined spells obtained with the quest; determining a region of effect and spell output intensity associated with the spell sequence when the spell sequence matches a defined spell sequence of at least one of the one or more defined spells obtained with the quest; determining whether the spell output indicates to activate the first-listed second device; determining whether the first-listed second device is within the region of effect; and providing a second instruction to activate the first-listed second device when the spell output indicates to activate the first-listed second device and the first-listed second device is within the region of effect.

Example 53 may include the method of example 52 and/or any other one or more examples disclosed herein, wherein, when the spell sequence does not match a defined spell sequence of at least one of the one or more defined spells obtained with the quest, the method comprises determining a degree of similarity of the spell sequence is greater than a threshold degree of similarity when the spell sequence is not equivalent to a defined spell sequence of at least one of the one or more defined spells obtained with the quest; selecting a spell having a greatest degree of similarity among the one or more defined spells obtained with the quest as the matching spell.

Example 54 may include the method of example 52 and/or any other one or more examples disclosed herein, further comprising determining whether an auxiliary device is proximate to the wand by obtaining an auxiliary device identifier included in a signal broadcast by the auxiliary device; determining a handicap value associated with a user of the wand, wherein the handicap value is based on a handicap indicator included with the quest; and adjusting, based on the handicap value and the auxiliary device iden-
tifier, the region of effect, the spell output intensity, the threshold degree of similarity, the first timer period, or a second time period for performing the one or more gestures to activate the first-listed second device.

Example 55 may include the method of example 52 and/or any other one or more examples disclosed herein, wherein determining the spell further comprises determining whether a defined spell for activating the first-listed second device is a teammate participation spell, wherein the teammate participation spell includes a set of spells to be performed by a plurality of wands to activate the first-listed second device; determining whether the spell sequence matches a spell sequence of a spell of the set of spells; receiving a spell message from a teammate device indicating another spell performed by a teammate user using another wand, wherein the teammate device is the other wand or another computing device communicatively coupled with the other wand; determining whether the other spell matches a spell of the set of spells; determining whether the matching spell and the other matching spell are performed in a predefined order based on timing information associated with the spell sequence and other timing information associated with the other spell, wherein the other timing information is included in the spell message received from the teammate device; determining whether the matching spell and the other matching spell were performed within a second time period for performing the spells of the set of spells to activate the first-listed second device; and determining whether the matching spell and the other matching spell were performed within a third time period, wherein the third time period is a predefined period of time between performing each spell of the set of spells.

Example 56 may include the method of example 49 and/or any other one or more examples disclosed herein, wherein determining the spell further comprises determining whether the spell sequence matches a defined spell sequence of a quest termination spell, or whether the spell sequence matches a defined spell sequence of a quest pause spell, wherein the quest termination spell and the quest pause spell are ones of the one or more defined spells obtained with the quest; and one of pausing the quest when the spell sequence matches the defined spell sequence of the quest pause spell, wherein the pausing includes transmitting a third instruction for pausing the quest to an accounting server, or terminating the quest when spell sequence matches the defined spell sequence of the quest termination spell, wherein the terminating includes transmitting a third instruction for ending the quest to an accounting server.

Example 57 may include the method of example 49-57 and/or any other one or more examples disclosed herein, wherein the computing device is separate from the wand and is communicatively coupled with the wand; or the computing device is contained within the wand.

Example 58 may include at least one non-transitory, computer-readable medium including instructions to cause a computing device, in response to execution of the instructions by the computing device, to perform the method of examples 49-57 and/or any other one or more examples disclosed herein.

Example 59 may include an apparatus to be employed by an accounting server, the apparatus comprising one or more computer-readable storage media having instructions; and one or more processors coupled with the one or more computer-readable storage media to execute the instructions to store a defined quest indicating an order in which one or more second devices are to be activated by a user using a wand; provide an indication that the defined quest is to commence in response to receiving a quest initiation message from the wand or a computing device associated with the wand; and account for activation of the one or more second devices delineated by the order when ones of the one or more second devices are activated by the computing device or the wand, wherein the accounting includes altering a user profile associated with the user.

Example 60 may include the apparatus of example 59 and/or any other one or more examples disclosed herein, wherein to account for the activation of the one or more second devices, the one or more processors are to execute the instructions to receive an instruction from the computing device or the wand indicating a spell cast using the wand and a wand identifier associated with the wand; receive a message from an activated one of the one or more second devices indicating a spell cast upon the activated second device and a wand identifier associated with a wand of that cast the spell on the activated second device; and alter the user profile when the spell of the instruction matches the spell of the message and the wand identifier of the instruction matches the wand identifier of the message.

Example 61 may include the apparatus of example 59 and/or any other one or more examples disclosed herein, wherein to account for the activation of the one or more second devices, the one or more processors are to execute the instructions to receive a pause instruction from the computing device or the wand indicating to pause the quest; receive a termination instruction from the computing device or the wand indicating to terminate the quest; pause accounting for the activation of the one or more second devices when the pause instruction is received, or terminate accounting for the activation of the one or more second devices when the termination instruction is received.

Example 62 may include the apparatus of example 59 and/or any other one or more examples disclosed herein, wherein accounting server comprises a position information database to store position information associated with each of the one or more second devices of the defined quest.

Example 63 may include the apparatus of example 61 and/or any other one or more examples disclosed herein, wherein, to store the defined quest, the one or more processors are to execute the instructions to provide a user interface for defining the quest, wherein the user interface includes a plurality of graphical control elements for selecting one or more second devices to be activated during a quest and wherein the user interface indicates position information associated with each of the selected one or more second devices based on the stored position information.

Example 64 may include the apparatus of example 62 and/or any other one or more examples disclosed herein, wherein, to store the defined quest, the one or more processors are to execute the instructions to receive the defined quest for storage, wherein the quest is defined by a game creator using a wand by performing one or more gestures to activate the one or more second devices proximate to each of the one or more second devices.

Example 65 may include a computer-implemented method comprising storing, by a server, a defined quest indicating an order in which one or more second devices are to be activated by a user using a wand; providing, by the server, an indication that the defined quest is to commence in response to receiving a quest initiation message from the wand or a computing device associated with the wand; and accounting, by the server, for activation of the one or more second devices delineated by the order when ones of the one or more second devices are activated by the computing device or the wand, wherein the accounting includes altering a user profile associated with the user.

Example 66 may include the method of example 65 and/or any other one or more examples disclosed herein, further comprising receiving an instruction from the computing device or the wand indicating a spell cast using the wand and a wand identifier associated with the wand; receiving a message from an activated one of the one or more second devices indicating a spell cast upon the activated second device and a wand identifier associated with a wand of that cast the spell on the activated second device; and altering the user profile when the spell of the instruction matches the spell of the message and the wand identifier of the instruction matches the wand identifier of the message.

Example 67 may include the method of example 65 and/or any other one or more examples disclosed herein, further comprising receiving a pause instruction from the computing device or the wand indicating to pause the quest; receiving a termination instruction from the computing device or the wand indicating to terminate the quest; pausing accounting for the activation of the one or more second devices when the pause instruction is received, or terminating accounting for the activation of the one or more second devices when the termination instruction is received.

Example 68 may include the method of example 65 and/or any other one or more examples disclosed herein, wherein accounting server comprises a position information database to store position information associated with each of the one or more second devices of the defined quest.

Example 69 may include the method of example 68 and/or any other one or more examples disclosed herein, wherein storing the defined quest comprises providing a user interface for defining the quest, wherein the user interface includes a plurality of graphical control elements for selecting one or more second devices to be activated during a quest and wherein the user interface indicates position information associated with each of the selected one or more second devices based on the stored position information.

Example 70 may include the method of example 68 and/or any other one or more examples disclosed herein, wherein storing the defined quest comprises receiving the defined quest for storage, wherein the quest is defined by a game creator using a wand by performing one or more gestures to activate the one or more second devices proximate to each of the one or more second devices.

Example 71 may include at least one computer-readable medium including instructions to cause a computing device, in response to execution of the instructions by the computing device, to perform the method of examples 65-70 and/or any other one or more examples disclosed herein. The at least one computer readable medium may be a non-transitory computer readable medium.

Example 71.5 may include a system comprising the wand of examples 1-14 and/or the wand of examples 30-43; a computing device including the at least one computer-readable medium of examples 29 and/or 48; and/or the apparatus of examples 59-64 and/or including the at least one computer-readable medium of example 71.

Example 72 may include at least one computer readable medium, including instructions to cause, a computing device, in response to execution of the instructions by the computing device, to: define the quest indicating an order in which one or more second devices are to be activated and one or more spells to cast to activate each of the one or more second devices; and provide the quest to a wand for commencement of the quest, wherein to define the quest, the instructions cause the computing device to: select each of the one or more second devices to define the order; define one or more gestures to be performed to activate each of the one or more second devices, wherein the one or more gestures are movements performed by a user using the wand; define a spell output to be associated with the one or more gestures and a wand position relative to each of the one or more second devices, wherein the spell output indicates at least one of a first instruction for activating one or more first devices and a second instruction for activating each of the one or more second devices; generate a defined spell sequence for each of the one or more second devices based on the defined one or more gestures; and store the defined spell sequence for each of the one or more second devices in association with the defined spell output. The at least one computer readable medium may be a non-transitory computer readable medium.

Example 73 may include the at least one computer readable medium of example 72 and/or any other one or more examples disclosed herein, wherein the instructions cause the computing device to: define a third instruction based on the defined spell output or the defined spell sequence wherein the third instruction instructs an accounting server to alter a user profile associated with the user according to the defined spell output or the defined spell sequence.

Example 74 may include the at least one computer readable medium of example 72 and/or any other one or more examples disclosed herein, wherein the instructions cause the computing device to: define a region of effect for the defined spell output for each of the one or more second devices, wherein the region of effect defines an area in which the spell output is to be applied to the one or more second devices within the area wherein a spell output intensity is based on a position of the one or more second devices within the region of effect wherein the spell output intensity indicates an intensity at which the one or more first devices and the one or more second device are to be activated; and define a threshold degree of similarity for the generated spell sequence or the defined spell output, wherein the threshold degree of similarity indicates a minimum number and order of operations of the generated spell sequence required to be performed to obtain the defined spell output wherein the threshold degree of similarity is less than or equal to a maximum number and order of operations of the generated spell sequence.

Example 75 may include the at least one computer readable medium of example 74 and/or any other one or more examples disclosed herein, wherein a size and shape of the region of effect is adjusted according to a handicap value associated with a user profile associated with the user.

Example 76 may include the at least one computer readable medium of example 72 and/or any other one or more examples disclosed herein, wherein the defining the quest further comprises: define a first time period for activating each of the one or more second devices, and generation of the defined spell sequence for each of the one or more second devices is further based on the defined first time period.

Example 77 may include the at least one computer readable medium of example 76 and/or any other one or more examples disclosed herein, wherein to define the quest the instructions cause the computing device to: define a plurality of wands that are permitted to perform the one or more gestures to activate the one or more second devices, wherein the wand is one of the plurality of wands.

Example 78 may include the at least one computer readable medium of example 76 and/or any other one or more examples disclosed herein, wherein to define the quest the instructions cause the computing device to: define, for at least one second device of the one or more second devices, a set of spells to be performed to activate the at least one second device; and define a spell order wherein the spell order indicates an order in which each of the set of spells is to be performed.

Example 79 may include the at least one computer readable medium of example 78 and/or any other one or more examples disclosed herein, wherein to define the quest the instructions cause the computing device to: define a plurality of wands that are permitted to perform the set of spells, wherein the wand is one of the plurality of wands, and wherein to define the spell order the instructions cause the computing device to define an order for performance of each spell of the set of spells and a corresponding wand of the plurality of wands to perform each spell of the set of spells.

Example 80 may include the at least one computer readable medium of example 79 and/or any other one or more examples disclosed herein, wherein to define the quest wherein the instructions cause the computing device to: define a plurality of second time periods corresponding to each spell of the set of spells wherein each of the plurality of second time periods defines an amount of time in which to perform each spell of the set of spells, wherein at least one of the plurality of second time periods is different from another one of the plurality of second time periods or each of the plurality of second time periods are equal; define a plurality of threshold degrees of similarity corresponding to each spell of the set of spells wherein at least one of the plurality of threshold degrees of similarity is different from another one of the plurality of threshold degrees of similarity or each of the plurality of threshold degrees of similarity are equal; and define a plurality of wand positions corresponding to each of spell of the set of spells wherein at least one of the plurality of wand positions is different from another one of the plurality of wand positions or each of the plurality of positions are equal.

Example 81 may include the at least one computer readable medium of example 80 and/or any other one or more examples disclosed herein, wherein each of the plurality of second time periods includes a defined start time wherein at least one of the defined start times is different than another one of the defined start times or at least one of the defined start times is a same time as another one of the defined start times.

Example 82 may include the at least one computer readable medium of example 80 and/or any other one or more examples disclosed herein, wherein at least one wand of the plurality of wands is associated with a handicap value, and to define the quest the instructions cause the computing device to: define an adjustment value based on the handicap value wherein a second time period of the plurality of second time periods corresponding to the at least one wand is adjusted by the adjustment value or the threshold degree of similarity associated with the at least one wand is adjusted by the adjustment value.

Example 83 may include the at least one computer readable medium of example 72 and/or any other one or more examples disclosed herein, wherein to define the quest the instructions cause the computing device to: defining a handicap value to be associated with the user based on a user profile associated with the user, wherein the user profile comprises demographic information associated with the user, subscription information associated with the user, virtual property associated with the user.

Example 84 may include the at least one computer readable medium of example 72 and/or any other one or more examples disclosed herein, wherein the computing device resides within a client computing device, and the quest is defined using one or more graphical control elements within a webpage.

Example 85 may include the at least one computer readable medium of example 72 and/or any other one or more examples disclosed herein, wherein the computing device resides in the wand, and wherein the one or more gestures to be performed are defined by performing the one or more gestures using the wand at each wand position relative to each of the one or more second devices, and the spell output to be associated with the one or more gestures is defined by at least activating the one or more second devices after or before performance of the one or more gestures.

Example 86 may include at least one computer readable medium, including instructions to cause, a computing device, in response to execution of the instructions by the computing device, to: obtain a first spell sequence indicative of one or more gestures performed by a user; obtain a plurality of spells according to a user profile associated with the user; determine a first matching spell of the plurality of spells by comparing the first spell sequence with the defined spell sequence of each of the plurality of spells; determine whether the first matching spell is substantially similar to a quest initiation spell; provide an indication that the quest is to be initiated when the first matching spell is determined to be substantially similar to a quest initiation spell. The at least one computer-readable medium may be a non-transitory computer-readable medium.

Example 87 may include the at least one computer readable medium of example 86 and/or any other one or more examples disclosed herein, the providing the indication comprises: provide a quest acknowledgement to a wand associated with the user and providing the quest acknowledgement to an accounting server.

Example 88 may include the at least one computer readable medium of example 86 and/or any other one or more examples disclosed herein, wherein, when the first matching spell is determined not to be substantially similar to a quest initiation spell, the method further comprises providing a spell output indicating that the spell will not commence.

Example 89 may include the at least one computer readable medium of example 86 and/or any other one or more examples disclosed herein, wherein when the first matching spell is determined to be substantially similar to a quest initiation spell, the instructions cause the computing device to: provide a quest initiation message to another wand or another computing devices associated with another user; receive another quest initiation messages from the other wands or the other computing devices; determine whether another quest initiation spell included in the other quest initiation message is substantially similar to the quest initiation spell; and provide a team-acknowledgement to the other computing device or the other wand indicating that the other wand is part of a team for commencing the quest when the other quest initiation spell is determined to be substantially similar to the quest initiation spell.

Example 90 may include at least one computer readable medium, including instructions to cause, a computing device, in response to execution of the instructions by the computing device, to: obtain a quest indicating an order in which one or more second devices are to be activated and one or more defined spells to cast to activate each of the one or more second devices; and initiate a first timer, wherein the first timer is based on a first time period for activating a first-listed second device of the one or more second devices defined by the order; determine a wand position relative to the first-listed second device; determine whether the wand position relative to the first-listed second device is within a predefined position for activating the first-listed second device; obtain a spell sequence indicative of one or more gestures performed by a user of the wand; determine a spell based on the spell sequence; determine whether the determined spell is substantially similar to one of the one or more spells obtained with the quest; and when the first-listed second device is determined to be within the predefined position for activating the first-listed second device, providing, by the computing device, a spell message to the first-listed second device based on the wand position relative to the first-listed second device, wherein the spell message includes a wand identifier associated with the wand and spell information indicative of the determined spell. The at least one computer-readable medium may be a non-transitory computer-readable medium.

Example 91 may include the at least one computer readable medium of example 90 and/or any other one or more examples disclosed herein, wherein, when the first-listed second device is determined to not be within the predefined position for activating the first-listed second device, the instructions cause the computing device to: provide a first instruction to activate one or more first devices of the wand, wherein the first instruction is to indicate, by activation of the one or more first devices, that the first-listed second device is determined to not be within the predefined position; or provide a second instruction to activate one or more second devices communicatively coupled with the wand, wherein the second instruction is to indicate, by activation of the one or more communicatively coupled second devices, that the first-listed second device is determined to not be within the predefined position.

Example 92 may include the at least one computer readable medium of example 90 and/or any other one or more examples disclosed herein, wherein the instructions cause the computing device to: determine whether the first timer has expired, and wherein, when the first timer is determined to be expired, the method further comprises: provide a first instruction to activate one or more first devices of the wand, wherein the first instruction is to indicate, by activation of the one or more first devices, that the first timer has expired; or provide a second instruction to activate one or more second devices communicatively coupled with the wand, wherein the second instruction is to indicate, by activation of the one or more communicatively coupled second devices, that the first timer has expired.

Example 93 may include the at least one computer readable medium of example 90 and/or any other one or more examples disclosed herein, wherein to determine the spell the instructions cause the computing device to: determine whether the spell sequence matches a defined spell sequence of at least one of the one or more defined spells obtained with the quest; determine a region of effect and spell output intensity associated with the spell sequence when the spell sequence matches a defined spell sequence of at least one of the one or more defined spells obtained with the quest; determine whether the spell output indicates to activate the first-listed second device; determine whether the first-listed second device is within the region of effect; and provide a second instruction to activate the first-listed second device when the spell output indicates to activate the first-listed second device and the first-listed second device is within the region of effect.

Example 94 may include the at least one computer readable medium of example 93 and/or any other one or more examples disclosed herein, wherein, when the spell sequence does not match a defined spell sequence of at least one of the one or more defined spells obtained with the quest, the instructions cause the computing device to: determine a degree of similarity of the spell sequence is greater than a threshold degree of similarity when the spell sequence is not equivalent to a defined spell sequence of at least one of the one or more defined spells obtained with the quest; select a spell having a greatest degree of similarity among the one or more defined spells obtained with the quest as the matching spell.

Example 95 may include the at least one computer readable medium of example 93 and/or any other one or more examples disclosed herein, wherein the instructions cause the computing device to: determine whether an auxiliary device is proximate to the wand by obtaining an auxiliary device identifier included in a signal broadcast by the auxiliary device; determine a handicap value associated with a user of the wand, wherein the handicap value is based on a handicap indicator included with the quest; and adjust, based on the handicap value and the auxiliary device identifier, the region of effect, the spell output intensity, the threshold degree of similarity, the first timer period, or a second time period for performing the one or more gestures to activate the first-listed second device.

Example 96 may include the at least one computer readable medium of example 93 and/or any other one or more examples disclosed herein, wherein to determine the spell the instructions cause the computing device to: determine whether a defined spell for activating the first-listed second device is a teammate participation spell, wherein the teammate participation spell includes a set of spells to be performed by a plurality of wands to activate the first-listed second device; determine whether the spell sequence matches a spell sequence of a spell of the set of spells; receive a spell message from a teammate device indicating another spell performed by a teammate user using another wand, wherein the teammate device is the other wand or another computing device communicatively coupled with the other wand; determine whether the other spell matches a spell of the set of spells; determine whether the matching spell and the other matching spell are performed in a predefined order based on timing information associated with the spell sequence and other timing information associated with the other spell, wherein the other timing information is included in the spell message received from the teammate device; determine whether the matching spell and the other matching spell were performed within a second time period for performing the spells of the set of spells to activate the first-listed second device; and determine whether the matching spell and the other matching spell were performed within a third time period, wherein the third time period is a predefined period of time between performing each spell of the set of spells.

Example 97 may include the at least one computer readable medium of example 90 and/or any other one or more examples disclosed herein, wherein to determine the spell the instructions cause the computing device to: determine whether the spell sequence matches a defined spell sequence of a quest termination spell, or whether the spell sequence matches a defined spell sequence of a quest pause spell, wherein the quest termination spell and the quest pause spell are ones of the one or more defined spells obtained with the quest; and one of: pause the quest when the spell sequence matches the defined spell sequence of the quest pause spell, wherein the pausing includes transmitting a third instruction for pausing the quest to an accounting server, or terminate the quest when spell sequence matches the defined spell sequence of the quest termination spell, wherein the terminating includes transmitting a third instruction for ending the quest to an accounting server.

Example 98 may include a wand comprising: sensing means for detecting one or more gestures wherein the one or more gestures are movements performed using the wand by a user of the wand, and generate sensor data representative of the one or more gestures; device interface means for obtaining, from the one or more sensors, the sensor data representative of the one or more gestures; spell means for receiving, from the device interface module, the sensor data representative of the one or more gestures, and converting the sensor data representative of the one or more gestures into a spell sequence; and wand communication means for transmitting the spell sequence to a computing device, and receiving, from the computing device, a spell output based on the spell sequence, a wand position, and a quest, wherein the quest indicates an order in which one or more second devices are to be activated and one or more spells to activate each of the one or more second devices.

Example 99 may include the wand of example 98 and/or any other one or more examples disclosed herein, wherein the spell means is for recording the sensor data representative of the one or more gestures during a period of time, and convert the sensor data representative of the one or more gestures performed during the period of time into the spell sequence, and the sensor data representative of the one or more gestures performed outside of the period of time are excluded from the spell sequence or included in another spell sequence.

Example 100 may include the wand of example 98 and/or any other one or more examples disclosed herein, wherein the receipt of the spell output is based on a determination of a spell from a plurality of spells based on the spell sequence wherein each of the plurality of spells is associated with a defined spell sequence; a determination, based on the quest, as to whether the determined spell is to be used for activation of a second device of the one or more second devices; a determination of a spell output associated with the determined spell based on whether the determined spell is to be used for activation of the second device or not; wherein receipt of the spell output includes receipt of a message that indicates the determined spell output, and wherein the computing device is to provide a third instruction to an accounting server for alteration of a user profile associated with the user wherein the third instruction is based on the determined spell output or the spell sequence.

Example 101 may include the wand of example 100 and/or any other one or more examples disclosed herein, wherein the determination of the spell is based on a comparison of the spell sequence with the defined spell sequence for each of the plurality of spells; a determination of a degree of similarity between the spell sequence and the defined spell sequence of each of the plurality of spells, wherein the degree of similarity indicates a number and order of operations of the spell sequence that matches a number and order of operations of the defined spell sequence; and a selection of the spell wherein the selected spell has a greatest degree of similarity among the plurality of spells.

Example 102 may include the wand of example 101 and/or any other one or more examples disclosed herein, wherein receipt of the spell output is further based on a wand position relative to the one or more second devices, and a determination of the wand position relative to the one or more second devises, a determination of a spell output target device based on the wand position and a wand orientation wherein the spell output target device is at least one of the one or more second devices to which the wand is directed by the user; and a determination of a spell output intensity based on a distance between the wand position and a position of the spell output target device, wherein the spell output intensity indicates an intensity at which the one or more second devices are to be activated.

Example 103 may include the wand of example 102 and/or any other one or more examples disclosed herein, wherein the determination of the distance between the wand position and the position of the spell output target device is based on an obtained a signal broadcast by the spell output target device; at least one data packet extracted from the obtained signal wherein the data packet includes an identifier that indicates at least a device position of the one or more second devices; and a determination of the distance between the wand position and the position of the spell output target device is based on the device position from the extracted data packet.

Example 104 may include the wand of example 103 and/or any other one or more examples disclosed herein, wherein the sensing means includes an infrared (IR) signal generation means for generation and emissions of an IR signal and an IR capture means for capturing the IR signal when the IR signal is reflected off the one or more second devices, and the sensor data includes a round trip time (RTT) including a time the IR signal is emitted from the IR signal generator and captured by the IR capture device, and wherein the RTT is to be used to determine the distance between the wand position and the position of the spell output target device using the RTT, and wherein the spell output indicates to activate one or more first devices of the wand.

Example 105 may include the wand of any one of examples 103 or 104, wherein the sensing means includes at least an accelerometer detection means, a geomagnetic detection means, and an orientation detection means, for providing spatial coordinates of the wand and the sensor data further includes the spatial coordinates of the wand to be used for a determination of the wand orientation, and wherein one of the one or more second devices to which the wand is directed is to determined based on the wand orientation.

Example 106 may include the wand of example 102 and/or any other one or more examples disclosed herein, wherein the spell output intensity is also based on the degree of similarity such that an increase in the degree of similarity is to provide an increase in the spell output intensity and a decrease in the degree of similarity is to provide a decrease in the spell output intensity, and wherein the quest defines, for each of the one or more second devices, a threshold degree of similarity for each of the plurality of spells such that the determined spell is cast when the degree of similarity greater than or equal to the threshold degree of similarity.

Example 107 may include the wand of example 106 and/or any other one or more examples disclosed herein, wherein the order in which the one or more second devices are to be activated is to be altered when the degree of similarity is less than the threshold degree of similarity or a spell of the one or more spells to activate a next one of the one or more second devices is to be altered when the degree of similarity is less than the threshold degree of similarity, wherein to alter the order includes at least one of a rearrangement of the order or an addition of another second device to the one or more second devices, and wherein to alter the spell includes a rearrangement of the order of operations of a spell sequence of the spell to activate the next second device or an addition of another gesture to the spell sequence of the spell to activate the next second device.

Example 108 may include the wand of any one of examples 106 or 107 and/or any other one or more examples disclosed herein, wherein the quest further defines a first time period, wherein the first time period is an amount of time the user is to activate each of the one or more second devices, a set of spells to be performed for activation of each of the one or more second devices, and a spell order wherein the spell order indicates an order in which each of the set of spells is to be performed.

Example 109 may include the wand of example 108 and/or any other one or more examples disclosed herein, wherein the quest further defines that a plurality of wands are to perform the set of spells wherein the wand is one of the plurality of wands and, for each of the one or more second devices, the quest defines that at least one of the set of spells is to be performed by the user using the wand and another one of the set of spells is to be performed by another user using another wand of the plurality of wands, at least one of the set of spells is to be performed by the user using the wand and another one of the set of spells is to be performed by the other user using the wand, or at least one of the set of spells is to be performed by the user using the other wand and another one of the set of spells is to be performed by the other user using the other wand.

Example 110 may include the wand of example 109 and/or any other one or more examples disclosed herein, wherein the quest further defines a plurality of second time periods corresponding to each of the set of spells wherein each of the plurality of second time periods defines an amount of time in which to perform each of the set of spells such that a sum of the plurality of time periods is equal to the first time period, wherein at least one of the plurality of second time periods is different from another one of the plurality of second time periods or each of the plurality of second time periods are equal.

Example 111 may include the wand of example 110 and/or any other one or more examples disclosed herein, wherein at least one of the plurality of wands is associated with a handicap value, and one of the plurality of second time periods is adjusted based on the handicap value or the threshold degree of similarity is adjusted based on the handicap value.

Example 112 may include the wand of example 98 and/or any other one or more examples disclosed herein, wherein the spell means further comprises: spell determination means for determining a spell from a plurality of spells based on the spell sequence wherein each of the plurality of spells is associated with a defined spell sequence, determining a spell output associated with the determined spell and based on a wand position, and providing the spell output by way of at least one of a first instruction to the device interface means to activate one or more first devices and a second instruction to a wand communication means to activate one or more second devices, and wherein the wand communication means is for receiving the quest and the one or more spells to activate each of the one or more second devices, and for receiving, from the spell determination means, the spell output based on the spell sequence, a wand position, and the quest.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

We claim:

1. A wand comprising:
one or more sensors, communicatively coupled with at least one processor, to detect one or more gestures wherein the one or more gestures are movements performed using the wand by a user of the wand, and generate sensor data representative of the one or more gestures;
a device interface module to operate on the at least one processor to obtain, from the one or more sensors, the sensor data representative of the one or more gestures;
a spell module to operate on the at least one processor to receive, from the device interface module, the sensor data representative of the one or more gestures, and convert the sensor data representative of the one or more gestures into a spell sequence; and
a wand communication module, communicatively coupled with the at least one processor, to transmit the spell sequence to a computing device, and receive, from the computing device, a spell output based on the spell sequence, a wand position, and a quest, wherein the quest indicates an order in which one or more second devices are to be activated and one or more spells to activate each of the one or more second devices.

2. The wand of claim 1, wherein the receipt of the spell output is based on a determination of a spell from a plurality of spells based on the spell sequence wherein each of the plurality of spells is associated with a defined spell sequence; a determination, based on the quest, as to whether the determined spell is to be used for activation of a second device of the one or more second devices; a determination of a spell output associated with the determined spell based on whether the determined spell is to be used for activation of the second device or not; wherein receipt of the spell output includes receipt of a message that indicates the determined spell output, and wherein the computing device is to provide a third instruction to an accounting server for alteration of a user profile associated with the user wherein the third instruction is based on the determined spell output or the spell sequence.

3. The wand of claim 2, wherein the determination of the spell is based on a comparison of the spell sequence with the defined spell sequence for each of the plurality of spells; a determination of a degree of similarity between the spell sequence and the defined spell sequence of each of the plurality of spells, wherein the degree of similarity indicates a number and order of operations of the spell sequence that matches a number and order of operations of the defined spell sequence; and a selection of the spell wherein the selected spell has a greatest degree of similarity among the plurality of spells.

4. The wand of claim 3, wherein receipt of the spell output is further based on a wand position relative to the one or more second devices, and a determination of the wand position relative to the one or more second devises, a determination of a spell output target device based on the wand position and a wand orientation wherein the spell output target device is at least one of the one or more second devices to which the wand is directed by the user; and a determination of a spell output intensity based on a distance between the wand position and a position of the spell output target device, wherein the spell output intensity indicates an intensity at which the one or more second devices are to be activated.

5. The wand of claim 4, wherein the determination of the distance between the wand position and the position of the spell output target device is based on an obtained signal broadcast by the spell output target device; at least one data packet extracted from the obtained signal wherein the data packet includes an identifier that indicates at least a device position of the one or more second devices; and a determination of the distance between the wand position and the position of the spell output target device is based on the device position from the extracted data packet.

6. The wand of claim 5, wherein the one or more sensors include at least an accelerometer, a geomagnetic sensor, and a gyroscope, to provide spatial coordinates of the wand, and the sensor data further includes the spatial coordinates of the wand to be used for a determination of the wand orientation, and wherein one of the one or more second devices to which the wand is directed is to be determined based on the wand orientation.

7. The wand of claim 4, wherein the spell output intensity is also based on the degree of similarity such that an increase in the degree of similarity is to provide an increase in the spell output intensity and a decrease in the degree of similarity is to provide a decrease in the spell output intensity, and wherein the quest defines, for each of the one or more second devices, a threshold degree of similarity for each of the plurality of spells such that the determined spell is cast when the degree of similarity is greater than or equal to the threshold degree of similarity.

8. The wand of claim 7, wherein the order in which the one or more second devices are to be activated is to be altered when the degree of similarity is less than the threshold degree of similarity or a spell of the one or more spells to activate a next one of the one or more second devices is to be altered when the degree of similarity is less than the threshold degree of similarity, wherein to alter the order includes at least one of a rearrangement of the order or an addition of another second device to the one or more second devices, and wherein to alter the spell includes a rearrangement of the order of operations of a spell sequence of the spell to activate the next second device or an addition of another gesture to the spell sequence of the spell to activate the next second device.

9. The wand of claim 7, wherein the quest further defines a first time period, wherein the first time period is an amount of time the user is to activate each of the one or more second devices, a set of spells to be performed for activation of each of the one or more second devices, and a spell order wherein the spell order indicates an order in which each of the set of spells is to be performed.

10. The wand of claim 9, wherein the quest further defines that a plurality of wands are to perform the set of spells wherein the wand is one of the plurality of wands and, for each of the one or more second devices, the quest defines that at least one of the set of spells is to be performed by the user using the wand and another one of the set of spells is to be performed by another user using another wand of the plurality of wands, at least one of the set of spells is to be performed by the user using the wand and another one of the set of spells is to be performed by the other user using the wand, or at least one of the set of spells is to be performed by the user using the other wand and another one of the set of spells is to be performed by the other user using the other wand.

11. The wand of claim 10, wherein the quest further defines a plurality of second time periods corresponding to each of the set of spells wherein each of the plurality of second time periods defines an amount of time in which to perform each of the set of spells such that a sum of the plurality of time periods is equal to the first time period, wherein at least one of the plurality of second time periods is different from another one of the plurality of second time periods or each of the plurality of second time periods are equal.

12. The wand of claim 11, wherein at least one of the plurality of wands is associated with a handicap value, and one of the plurality of second time periods is adjusted based on the handicap value or the threshold degree of similarity is adjusted based on the handicap value.

13. One or more non-transitory computer-readable media (NTCRM) comprising instructions for creating a quest, wherein execution of the instructions is to cause a computing device to:
define the quest indicating an order in which one or more second devices are to be activated and one or more spells to cast to activate each of the one or more second devices; and
provide the quest to a wand for commencement of the quest,
wherein, to define the quest, execution of the instructions is to cause to the computing device to:
select each of the one or more second devices to define the order;
define one or more gestures to be performed to activate each of the one or more second devices, wherein the one or more gestures are movements performed by a user using the wand;
define a spell output to be associated with the one or more gestures and a wand position relative to each of the one or more second devices, wherein the spell output indicates at least one of a first instruction for activating one or more first devices and a second instruction for activating each of the one or more second devices;
generate a defined spell sequence for each of the one or more second devices based on the defined one or more gestures; and
store the defined spell sequence for each of the one or more second devices in association with the defined spell output.

14. The one or more NTCRM of claim 13, wherein execution of the instructions is to cause the computing device to:
define a third instruction based on the defined spell output or the defined spell sequence wherein the third instruction instructs an accounting server to alter a user profile associated with the user according to the defined spell output or the defined spell sequence.

15. The one or more NTCRM of claim 13, wherein execution of the instructions is to cause the computing device to:
define a region of effect for the defined spell output for each of the one or more second devices, wherein the region of effect defines an area in which the spell output is to be applied to the one or more second devices within the area wherein a spell output intensity is based on a position of the one or more second devices within the region of effect wherein the spell output intensity indicates an intensity at which the one or more first devices and the one or more second device are to be activated; and
define a threshold degree of similarity for the generated spell sequence or the defined spell output, wherein the threshold degree of similarity indicates a minimum number and order of operations of the generated spell sequence required to be performed to obtain the defined spell output wherein the threshold degree of similarity is less than or equal to a maximum number and order of operations of the generated spell sequence.

16. The one or more NTCRM of claim 15, wherein a size and shape of the region of effect is adjusted according to a handicap value associated with a user profile associated with the user.

17. The one or more NTCRM of claim 13, wherein, to define the quest, execution of the instructions is to cause the computing device to:
define a first time period for activating each of the one or more second devices, and
generation of the defined spell sequence for each of the one or more second devices is further based on the defined first time period.

18. The one or more NTCRM of claim 17, wherein, to define the quest, execution of the instructions is to cause the computing device to:
define a plurality of wands that are permitted to perform the one or more gestures to activate the one or more second devices, wherein the wand is one of the plurality of wands.

19. The one or more NTCRM of claim 17, wherein, to define the quest, execution of the instructions is to cause the computing device to:
define, for at least one second device of the one or more second devices, a set of spells to be performed to activate the at least one second device; and
define a spell order wherein the spell order indicates an order in which each of the set of spells is to be performed.

20. The one or more NTCRM of claim 19, wherein, to define the quest, execution of the instructions is to cause the computing device to:
define a plurality of wands that are permitted to perform the set of spells, wherein the wand is one of the plurality of wands, and
wherein, to define the spell order, execution of the instructions is to cause the computing device to define an order for performance of each spell of the set of spells and a corresponding wand of the plurality of wands to perform each spell of the set of spells.

21. The one or more NTCRM of claim 20, wherein, to define the quest, execution of the instructions is to cause the computing device to:
define a plurality of second time periods corresponding to each spell of the set of spells wherein each of the plurality of second time periods defines an amount of time in which to perform each spell of the set of spells, wherein at least one of the plurality of second time periods is different from another one of the plurality of second time periods or each of the plurality of second time periods are equal;
define a plurality of threshold degrees of similarity corresponding to each spell of the set of spells wherein at least one of the plurality of threshold degrees of similarity is different from another one of the plurality of threshold degrees of similarity or each of the plurality of threshold degrees of similarity are equal; and define a plurality of wand positions corresponding to each spell of the set of spells wherein at least one of the plurality of wand positions is different from another one of the plurality of wand positions or each of the plurality of positions are equal.

* * * * *